(12) United States Patent
Yang

(10) Patent No.: US 11,604,393 B2
(45) Date of Patent: Mar. 14, 2023

(54) ELECTRONIC APPARATUS AND ELECTROCHROMIC DEVICE

(71) Applicant: GUANGDONG OPPO MOBILE TELECOMMUNICATIONS CORP., LTD., Guangdong (CN)

(72) Inventor: Xin Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 208 days.

(21) Appl. No.: 16/887,562

(22) Filed: May 29, 2020

(65) Prior Publication Data

US 2020/0379308 A1    Dec. 3, 2020

(30) Foreign Application Priority Data

May 30, 2019 (CN) .......................... 201910464864.1
May 30, 2019 (CN) .......................... 201910465513.2
May 30, 2019 (CN) .......................... 201920802996.6
May 30, 2019 (CN) .......................... 201920810445.4

(51) Int. Cl.
*G02F 1/15* (2019.01)
*G02F 1/155* (2006.01)
*G02F 1/161* (2006.01)

(52) U.S. Cl.
CPC .............. *G02F 1/155* (2013.01); *G02F 1/161* (2013.01)

(58) Field of Classification Search
CPC .......... G02F 1/161; G02F 1/155; G02F 1/163; G02F 1/153; G02F 1/15; G02F 1/157; G02F 2001/1536

USPC ......................................... 359/265, 266, 273
See application file for complete search history.

(56) References Cited

U.S. PATENT DOCUMENTS

| | | | |
|---|---|---|---|
| 2003/0011304 A1* | 1/2003 | Duineveld | H01L 27/3246 428/917 |
| 2003/0214695 A1* | 11/2003 | Abramson | G02F 1/1516 359/265 |
| 2003/0227663 A1 | 12/2003 | Agrawal et al. | |
| 2004/0061920 A1 | 4/2004 | Tonar et al. | |
| 2010/0294335 A1* | 11/2010 | Huang | H01L 31/1804 438/57 |
| 2011/0299170 A1 | 12/2011 | Harlow et al. | |

(Continued)

FOREIGN PATENT DOCUMENTS

| | | |
|---|---|---|
| CN | 1462477 A | 12/2003 |
| CN | 1510494 A | 7/2004 |

(Continued)

OTHER PUBLICATIONS

International Search Report,International application No. PCT/CN2020/093283 dated Sep. 4, 2020 (11 pages).

(Continued)

*Primary Examiner* — Mahidere S Sahle
(74) *Attorney, Agent, or Firm* — Young Basile Hanlon & MacFarlane, P.C.

(57) ABSTRACT

An electrochromic device includes a first substrate, a second substrate, and a plurality of electrochromic material units. The plurality of electrochromic material units are disposed between the first substrate and the second substrate. Each of the plurality of electrochromic material units is switchable between a colored state and a transparent state. An electronic apparatus is further disclosed.

17 Claims, 22 Drawing Sheets

(56) References Cited

U.S. PATENT DOCUMENTS

| | | |
|---|---|---|
| 2015/0323849 A1 | 11/2015 | Han |
| 2015/0355519 A1 | 12/2015 | Vasiliev et al. |
| 2017/0123575 A1 | 5/2017 | Evans, V et al. |
| 2017/0336693 A1 | 11/2017 | Stephenson et al. |

FOREIGN PATENT DOCUMENTS

| | | |
|---|---|---|
| CN | 102576177 A | 7/2012 |
| CN | 106916099 A | 7/2017 |
| CN | 107045242 A | 8/2017 |
| CN | 206627735 U | 11/2017 |
| CN | 107835958 A | 3/2018 |
| CN | 108020974 A | 5/2018 |
| CN | 108251100 A | 7/2018 |
| CN | 105372898 B | 8/2018 |
| CN | 108600465 A | 9/2018 |
| CN | 208015865 U | 10/2018 |
| CN | 109375446 A | 2/2019 |
| CN | 109495622 A | 3/2019 |
| CN | 109613780 A | 4/2019 |
| CN | 110196523 A | 9/2019 |
| EP | 3674790 A1 | 7/2020 |
| WO | 2019039121 A1 | 2/2019 |

OTHER PUBLICATIONS

European partial search report EP20177481.7 dated Oct. 30, 2020 (20 pages).
Extended European Search Report for EP Application 20177481.7 dated Mar. 31, 2021. (19 pages).
Indian Examination Report for IN Application 202014022298 dated Jun. 30, 2021. (6 pages).

\* cited by examiner

ELECTRONIC APPARATUS AND ELECTROCHROMIC DEVICE

CROSS-REFERENCE TO RELATED APPLICATION(S)

This application claims priorities to Chinese Patent Application No. 201910465513.2, filed on May 30, 2019, Chinese Patent Application No. 201920810445.4, filed on May 30, 2019, Chinese Patent Application No. 201910464864.1, filed on May 30, 2019, and Chinese Patent Application No. 201920802996.6, filed on May 30, 2019, the content of all of which are herein incorporated by reference in their entireties.

TECHNICAL FIELD

The described embodiments relates to the field of electrochromic materials, and in particular, to an electronic apparatus and an electrochromic device.

BACKGROUND

Electrochromic devices have been widely used in various products such as smart reflectors, smart dimming windows, display devices, and camera devices, and the like. However, a response speed and a light transmittance of an existing electrochromic device are unable to meet requirements of applications.

SUMMARY

In some aspects of the present disclosure, an electrochromic device may be disclosed. The electrochromic device includes: a first substrate; a second substrate; a plurality of electrochromic material units, disposed between the first substrate and the second substrate and spaced apart from each other. Each of the plurality of electrochromic material units is switchable between a colored state and a transparent state.

In some aspects of the present disclosure, an electronic apparatus may be disclosed. The electronic apparatus may include: a front cover, a rear cover, an electrochromic device, and a plurality of optical devices. The rear cover cooperatively defines a mounting space with the front cover. One of the front cover and the rear cover defines a light-transmission region. The electrochromic device is disposed in the mounting space and covers the light-transmission region. The electrochromic device may include: a first substrate; a second substrate; and a plurality of electrochromic material units, disposed between the first substrate and the second substrate and spaced apart from each other. Each of the plurality of electrochromic material units is switchable between a colored state and a transparent state. The plurality of optical devices is received in the mounting space. At least one of plurality of optical devices is disposed to a corresponding one of the plurality of electrochromic material units, such that the at least one of plurality of optical devices is visible from the light-transmission region in response to the corresponding one of the plurality of electrochromic material units being in the transparent state, and capable of being shielded by the corresponding one of the plurality of electrochromic material units in response to the corresponding one of the plurality of electrochromic material units being in the colored state.

BRIEF DESCRIPTION OF DRAWINGS

In order to describe the technical solutions in the embodiments of the present disclosure more clearly, the drawings required to be used in descriptions of the embodiments will be briefly described below. Obviously, the drawings described below are only some embodiments of the present disclosure, and those skilled in the art may obtain other drawings according to the drawings without creative efforts.

DETAILED DESCRIPTION

Figure 1:
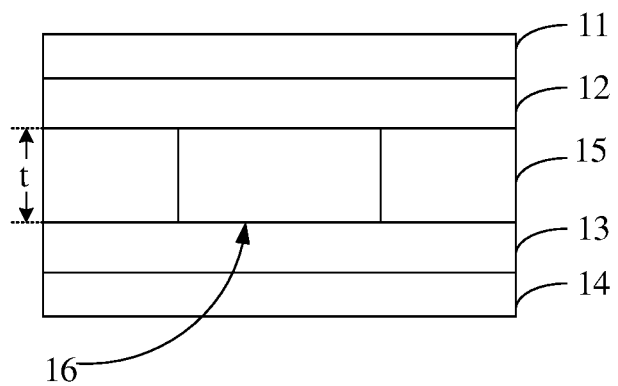
FIG. 1 is a schematic structural view of an electrochromic device according to some embodiments of the present disclosure.

It should be noted that, an "electronic apparatus" in the present disclosure may include, but be not limited to, an apparatus receiving/transmitting communication signals via wired connection (for example, a public switched telephone network (PSTN), a digital subscriber line (DSL), a digital cable, direct cable connection and/or another data connection/network), and/or via wireless interface (such as a cellular network, a Wireless Area Networks (WLAN), a digital television network such as a Digital Video Broadcasting Handheld (DVB-H) network, a satellite network, an AM-FM broadcast transmitter and/or another communication terminal). Examples of the electronic apparatus may include a smart phone, a tablet, a laptop, a palmtop game player, a wearable device, and the like.

As functions of an electronic apparatus become more and more powerful, more and more optical devices (such as cameras, sensors, flashlights, and the like) are installed in the electronic apparatuses, which makes a consistency or integrity of an appearance of a housing of the electronic apparatus gets worse. In some embodiments of the present disclosure, the optical devices may be shielded by using the electrochromic technology to improve the consistency or integrity of the appearance of the housing of the electronic apparatus.

In some aspects of the present disclosure, an electrochromic device may be disclosed. The electrochromic device includes: a first substrate; a second substrate; a plurality of electrochromic material units, disposed between the first substrate and the second substrate and spaced apart from each other. Each of the plurality of electrochromic material units is switchable between a colored state and a transparent state.

In some embodiments, the electrochromic device further includes: a first conductive structure, disposed on a surface of the first substrate adjacent to the second substrate, wherein the first conductive structure comprises a first conductive layer and a first wiring which are stacked on one another and electrically connected to each other; a second conductive structure, disposed on a surface of the second substrate adjacent to the first substrate, wherein the second conductive structure comprises a second conductive layer and a second wiring which are stacked on one another and electrically connected to each other; and a frame, disposed between the first conductive structure and the second conductive structure. The frame, the first conductive structure, and the second conductive structure cooperatively define a plurality of receiving spaces, and each of the plurality of electrochromic material units are disposed in a corresponding one of the plurality of receiving spaces.

In some embodiments, the first conductive layer comprises a plurality of first conductive sub-layers spaced apart from each other, and the plurality of first conductive sub-layers have a one-to-one correspondence with the plurality of electrochromic material units. The first wiring comprises a plurality of first sub-wirings spaced apart from each other. The second conductive layer comprises a plurality of second conductive sub-layers spaced apart from each other, and the plurality of second conductive sub-layers have a one-to-one correspondence with the plurality of electrochromic material units; the plurality of first conductive sub-layers or the second conductive sub-layers are configured to independently control the plurality of electrochromic material units to switch between the colored state and the transparent state. The second wiring comprises a plurality of second sub-wirings spaced apart from each other.

In some embodiments, a projection of the frame projected on the first substrate or the second substrate, a projection of the plurality of first sub-wirings projected on the first substrate or the second substrate, and a projection of the plurality of second sub-wirings projected on the first substrate or the second substrate are at least partially overlapped with each other.

In some embodiments, the electrochromic device further includes a third wiring, wherein the third wiring is disposed on the second conductive layer, spaced apart from the second wiring, and electrically connected to the first wiring.

In some embodiments, the first wiring comprises a first driving portion and a first lead-out portion, the first driving portion is disposed around the plurality of receiving spaces, and the first lead-out portion is connected to the first driving portion. The second wiring comprises a second driving portion and a second lead-out portion, the second driving portion is disposed around the plurality of receiving spaces, and the second lead-out portion is connected to the second driving portion and configured as a connection terminal of the second conductive structure. The third wiring is spaced apart from the second driving portion and communicates with the first lead-out portion, and the third wiring is configured as a connection terminal of the first conductive structure.

In some embodiments, the frame covers at least one of an edge of the first conductive layer and an edge of the second conductive layer.

In some embodiments, the electrochromic device further includes a mark identifier disposed on the second substrate and adjacent to the third wiring and the second lead-out portion.

In some embodiments, a transmittance of the electrochromic device in the transparent state is greater than or equal to 80%, and a transmittance of the electrochromic device in the colored state is less than or equal to 20%; or a width of the first wiring is less than or equal to 1.5 mm, and an impedance of the first wiring is less than or equal to 5Ω; or a width of the second wiring is less than or equal to 1.5 mm, and an impedance of the second wiring is less than or equal to 5Ω.

In some embodiments, the first wiring is disposed between the first conductive layer and the first substrate, the second wiring is disposed between the second conductive layer and the second substrate, and the frame is disposed between the first conductive layer and the second conductive layer. Or, the first conductive layer is disposed between the first wiring and the first substrate, the second conductive layer is disposed between the second wiring and the second substrate, the frame is disposed between the first conductive layer and the second conductive layer, and the first wiring and the second wiring are both embedded in the frame.

In some embodiments, at least one of the first wiring and the second wiring is closed.

In some embodiments, the frame defines a plurality of filling inlets, and the plurality of filling inlets have a one-to-one correspondence with the plurality of receiving spaces; the first wiring, the second wiring, and the frame are disconnected at the plurality of filling inlets, and the plurality of filling inlets are sealed by a sealing member.

In some embodiments, the filling inlets corresponding to two adjacent receiving spaces communicate with each other.

In some embodiments, the electrochromic device further includes an encapsulant, wherein the encapsulant is coated between the first substrate and the second substrate and along edges of the first substrate and the second substrate, and the encapsulant further covers a periphery of a side edge of the first conductive layer and a periphery of a side edge of the second conductive layer.

In some embodiments, a supporting spacer is disposed in at least one of the plurality of receiving spaces.

In some embodiments, the electrochromic device further includes a heating layer. The heating layer is disposed in at least one position selected from the group consisting of: between the first substrate and the first conductive structure; between the second substrate and the second conductive structure; on a surface of the first substrate facing away from the first conductive structure; and on a surface of the second substrate facing away from the second conductive structure.

In some embodiments, the electrochromic device is applicable to an electronic apparatus having a screen or a shell, an area of the first substrate is larger than an area of the second substrate, and the first substrate is configured to engage with the screen or the shell.

In some aspects of the present disclosure, a housing assembly may be disclosed. The housing assembly may include: a cover plate, defining a visible region for light transmission of an optical device and having an inner face and an outer face opposite to the inner face; wherein the inner face is closer to the optical device than the outer face; and an electrochromic device, attached to the inner face of the cover plate and covering the visible region. The electrochromic device may include: a first substrate; a second substrate; and a plurality of electrochromic material units, disposed between the first substrate and the second substrate and spaced apart from each other. Each of the plurality of electrochromic material units is configured to be independently switchable between a colored state and a transparent state. The visible region is shielded by the electrochromic device when the plurality of electrochromic material units are in the colored state, and is visible via the electrochromic device when the plurality of electrochromic material units are in the transparent state.

In some embodiments, the housing assembly may include: a film layer sandwiched between the cover plate and the electrochromic device. The film layer defines a through hole corresponding to the visible region, and the electrochromic device is arranged to cover the through hole.

In some embodiments, the film layer may include an optical coating layer, an ink layer, and an anti-explosion film layer that are stacked on the cover plate. The optical coating layer comprises at least one of anti-reflection film layer, a non-conductive vacuum metalizing layer, a resin film layer, or an ultraviolet transfer layer.

In some aspects of the present disclosure, an electronic apparatus may be disclosed. The electronic apparatus may include: a front cover, a rear cover, an electrochromic device, and a plurality of optical devices. The rear cover cooperatively defines a mounting space with the front cover. One of the front cover and the rear cover defines a light-transmission region. The electrochromic device is disposed in the mounting space and covers the light-transmission region. The electrochromic device may include: a first substrate; a second substrate; and a plurality of electrochromic material units, disposed between the first substrate and the second substrate and spaced apart from each other. Each of the plurality of electrochromic material units is switchable between a colored state and a transparent state. The plurality of optical devices is received in the mounting space. At least one of plurality of optical devices is disposed to a corresponding one of the plurality of electrochromic material units, such that the at least one of plurality of optical devices is visible from the light-transmission region in response to the corresponding one of the plurality of electrochromic material units being in the transparent state, and capable of being shielded by the corresponding one of the plurality of electrochromic material units in response to the corresponding one of the plurality of electrochromic material units being in the colored state.

In some embodiments, the electrochromic device may include: a plurality of first conductive sub-layers spaced apart from each other, wherein the plurality of first conductive sub-layers have a one-to-one correspondence with the plurality of electrochromic material units; and a plurality of second conductive sub-layers spaced apart from each other; wherein the plurality of second conductive sub-layers have a one-to-one correspondence with the plurality of electrochromic material units; the plurality of first conductive sub-layers or the second conductive sub-layers are configured to independently control the plurality of electrochromic material units to switch between the colored state and the transparent state.

In some embodiments, the electronic apparatus may further include: a first wiring, stacked on the plurality of first conductive sub-layers and electrically connected to the plurality of first conductive sub-layers; a second wiring, stacked on the plurality of second conductive sub-layers and electrically connected to the plurality of second conductive sub-layers; and a third wiring, wherein the third wiring is disposed on the second conductive sub-layers, spaced apart from the second wiring, and electrically connected to the first wiring.

In some embodiments, the first wiring may include a first driving portion and a first lead-out portion, the first driving portion is disposed around the plurality of receiving spaces, and the first lead-out portion is connected to the first driving portion. The second wiring may include a second driving portion and a second lead-out portion, the second driving portion is disposed around the plurality of receiving spaces, and the second lead-out portion is connected to the second driving portion. The third wiring is spaced apart from the second driving portion and communicates with the first lead-out portion.

In some embodiments, the electronic apparatus may further include: a frame disposed between the first substrate and the second substrate; wherein the frame, the first substrate, and the second substrate cooperatively define a plurality of receiving spaces, and the plurality of electrochromic material units are received in the plurality of receiving spaces. The frame defines a plurality of filling inlets, and the plurality of filling inlets have a one-to-one correspondence with the plurality of receiving spaces; the first wiring, the second wiring, and the frame are disconnected at the plurality of filling inlets, and the plurality of filling inlets are sealed by a sealing member.

In some embodiments, the electronic apparatus may further include: a screen. An area of the first substrate is larger than an area of the second substrate, and the first substrate is configured to engage with the screen.

In the followings, a mobile phone may be taken as an example for description. In the related art, the number of cameras arranged in the mobile phone is increasing, especially the number of the rear cameras is increasing, for example, arranging three, four, five rear cameras, and the like in the mobile phone has gradually become a new trend. Besides, the mobile phone may further include other optical devices (such as sensors, flashlights, and the like, and the sensors may include a flasher, a fill light, an ambient light sensor, a focusing sensor, a face recognition module, a structure light module, and the like), which may seriously affect the consistency or integrity of the appearance of the rear cover of the mobile phone. In some embodiments of the present disclosure, optical devices such as a camera, a flash, and the like, may be shielded or blocked by using the electrochromic technology, thereby improving the consistency of the appearance of the rear cover of the mobile phone.

More specifically, a camera may be used as an example of the optical device for description. An electrochromic device may be arranged in a region of the rear cover corresponding to the camera. When the camera is not in use, the electrochromic device may be controlled to be in a colored state, such that the camera may be shielded or blocked, and the rear cover may exhibit an integrated appearance. When the camera is in use, the electrochromic device may be controlled to be in a transparent state, which allows light to pass through the electrochromic device, and the camera may be turned on.

It should be noted that, the electrochromic device should have a response speed fast enough, such that the electrochromic device may quickly change from the colored state to the transparent state when the camera needs to be turned on. In case that the response speed of the electrochromic device is too slow, the camera cannot work normally during a long period of time, which affects user experience. Besides, the electrochromic device in the colored state should have a light transmittance low enough to block or shield the camera. Furthermore, the electrochromic device in the transparent state should have a light transmittance high enough to allow the light to pass therethrough to enable the camera to work normally.

In the following, several aspects including such as the response speed of the electrochromic device, a light transmittance of the electrochromic device in the transparent state, a design of wirings of the electrochromic device, a zoning control of the electrochromic device, a design of a structure of a housing of the electronic apparatus, and the like, will be described in detail in some embodiments of the present disclosure with reference to the drawings and embodiments of the present disclosure. It is particularly pointed out that the following embodiments are only used to illustrate the present disclosure, but are not intent to limit the scope of the present disclosure. Likewise, the following embodiments are only some embodiments of the present disclosure, not all the embodiments. All other embodiments obtained by those skilled in the art without creative efforts shall fall within the protection scope of the present disclosure.

"Embodiment" herein means that a particular feature, structure, or characteristic described with reference to embodiments may be included in at least one embodiment of the present disclosure. The term used in various places in the specification are not necessarily as shown in the same embodiment, and are not exclusive or alternative embodiments that are mutually exclusive with other embodiments. Those skilled in the art will understand explicitly and implicitly that the embodiments described herein may be combined with other embodiments.

Firstly, the response speed of the electrochromic device may be described in detail. A switching speed of the electrochromic device from the colored state to the transparent state (also referred as "discoloring speed") is slower than a switching speed of the electrochromic device from the transparent state to the colored state (also referred as "coloring speed"), and it generally requires a shorter response time switching from the shielding state (that is, the colored state) to the transparent state when shielding the optical device. Therefore, the response speed of the electrochromic device may mainly depend on the discoloring speed. In some embodiments of the present disclosure, the discoloring speed of the electrochromic device may be improved. A color-changing speed in some embodiments of the application may also refer to the discoloring speed of the electrochromic device.

The color changing of the electrochromism may be achieved by ion conduction. Unlike electron conduction, a transmission speed of the ion is much less than a transmission speed of an electron. Therefore, the transmission speed of the ion forms a bottleneck of the response speed of the electrochromism. The transmission speed of ion in electrolyte determines the response speed of the entire electrochromic device. The main factors affecting the response speed of electrochromic device may include the following.

1. Moving distance of the ion (cell thickness t): the thinner the cell thickness t, the faster the speed.

2. Concentration E of the electrochromic medium: the higher a content of a donor group, the faster the color-changing speed, but the worse a stability of the color changing.

3. Temperature T: the higher a temperature, the faster the ions move, and the faster the color-changing speed. On the contrary, the lower the temperature, the slower the color-changing speed.

4. Conductivity C of electrolyte: the electrolyte system determines the conductivity. The higher the conductivity, the faster the ions move, and the faster the color-changing speed.

5. Color-changing area S: in order to increase the color-changing speed, the region of the electrochromic device needs to be divided into a minimum unit region, the wirings may be routed around the minimum unit region, and the electric field should be ensured to be as uniform as possible.

In some embodiments of the present disclosure, the response speed of the electrochromic device may be improved from the above several aspects. The above factors may have an influence on the color-changing speed of the electrochromic device. The influence may satisfy the following formula: $V=E*t*C/S$. In some embodiments, the moving distance of the ion (the cell thickness t), the concentration E of the electrochromic medium, and the conductivity C of the electrolyte not only affect the color-changing speed of the electrochromic device, but also affect the light transmittance of the electrochromic device in the transparent state, the light transmittance of the electrochromic device in the colored state, and a contrast (a difference between the light transmittance in the transparent state and the light transmittance in the colored state). The influence may be shown in the following table.

| | Light transmittance in transparent state | Light transmittance in colored state | Contrast | Color-changing speed | Defects |
|---|---|---|---|---|---|
| Cell thickness t↓ | ↑ | ↑ | ↓ | ↑ | Color depth is not enough |
| Concentration E of Electrochromic Medium ↓ | ↑ | ↑ | ↓ | ↑ | Color depth is not enough |
| Conductivity C of electrolyte ↑ | — | ↓ | ↑ | ↑ | Stability of the electrolyte system greatly affects the service life |

The influence of the concentration E of the electrochromic medium on the electrochromic device may be described firstly. In some embodiments of the present disclosure, an electrochromic medium material may be provided. The electrochromic medium may include a solvent and a solute. The solute may include an anodic electroactive compound and a cathodic electrochromic compound. A ratio of an amount-of-substance concentration (also called as "molarity") of the anodic electroactive compound to an amount-of-substance concentration of the cathodic electrochromic compound may range from 3:1 to 1:2. It should be noted that, the terms "include" and "have" and any other variations thereof are meant to cover non-exclusive including.

The electrochromic medium material provided in some embodiments of the present disclosure may improve the performance of the electrochromic device to a certain extent, and may take into account the color-changing speed, the transmittance in the transparent state, the light transmittance in the colored state, and the contrast.

Under the action of an external electrical signal, the electrochromic medium material may exhibit different colors due to the gain and loss of electrons, such that the electrochromic device may have two different color states, that is, the colored state and the transparent state. In response to a change in the external electrical signal, a color of the electrochromic device may change between the colored state and the transparent state. The light transmittance in the colored state, the light transmittance in the transparent state, the contrast, and the color-changing speed are all important indexes for evaluating the performance of the electrochromic device. More specifically, the electrochromic device may have a better performance, if the light transmittance in the colored state is lower, and/or the light transmittance in the transparent state is higher, and/or the contrast is higher, and/or the color-changing speed is faster. The light transmittance in the colored state, the light transmittance in the transparent state, the contrast, and the color-changing speed of the electrochromic device may be closely associated with the amount-of-substance concentration of the solute, and the ratio of the amount-of-substance concentration of the anodic electroactive compound to the amount-of-substance concentration of the cathodic electrochromic compound.

More specifically, in some embodiments of the present disclosure, the specific type of the solvent may not be limited herein. The solvent may be selected according to actual needs. For example, the solvent may be at least one selected from the group consisting of propylene carbonate, butyrolactone, 2-acetyl butyrolactone, γ-valerolactone, ethylene carbonate, sulfolane, 3-methyl sulfolane, dimethylacetamide, dimethyl carboxamide, acetonitrile, glutaronitrile, 2-methylglutaronitrile, 3-hydroxypropionitrile, tetraethylene glycol dimethyl ether, dimethylsulfoxide, ethoxyethanol, cyclopentanone, and the like.

In some embodiments, the anodic electroactive compound may or may not be electrochromic. The anodic electroactive compound may include at least one of an aniline compound, a ferrocene compound, a phenothiazine compound, a thienyl compound, and a phenazine compound. In some embodiments, the anodic electroactive compound may be the aniline compound. In some embodiments of the present disclosure, a concentration of the aniline compound should not be too high. The aniline compound may absorb ultraviolet light and is easily deteriorated, which further affects the performance of the electrochromic medium material. It should be noted that, the term "electroactive" in some embodiments of the present disclosure may be defined as a change in oxidation state when exposed to a specific potential difference.

In some embodiments, the cathodic electrochromic compound may include an organic electrochromic medium. The organic electrochromic medium may include at least one of a viologen compound, an anthraquinone compound, a phenazine compound, a polypyrrole compound, a polythiophene compound, and a polyaniline compound. In some embodiments, the cathodic electrochromic compound may also be an inorganic electrochromic medium, such as a transitional metal oxide. In some embodiments, the cathodic electrochromic compound may include the organic electrochromic medium, and more specifically the cathodic electrochromic compound may be the viologen compound.

In some embodiments, the amount-of-substance concentration (also called as "molarity") of the solute may range from 150 mmol/L to 500 mmol/L. In some embodiments, the amount-of-substance concentration of the solute may be 150 mmol/L, 200 mmol/L, 250 mmol/L, 300 mmol/L, 500 mmol/L, and the like.

In some embodiments, the ratio of the amount-of-substance concentration of the anodic electroactive compound to the amount-of-substance concentration of the cathodic electrochromic compound may range from 3:1 to 1:2. In some embodiments, the ratio of the amount-of-substance concentration of the anodic electroactive compound to the amount-of-substance concentration of the cathodic electrochromic compound may be 3:1, 3:2, 1:1, 1:2, and the like.

When the solvent is dimethylacetamide, the anodic electroactive compound is the aniline compound, and the cathodic electrochromic compound is the viologen compound, the influence of the amount-of-substance concentration of the solute and the ratio of the amount-of-substance concentration of the anodic electroactive compound to the amount-of-substance concentration of the cathodic electrochromic compound on the performance of the electrochromic device may be shown in the following table.

| Example | Amount-of-substance concentration of the solute (anode:cathode) mmol/L | Light transmittance in transparent state | Light transmittance in colored state | Contrast | Color-changing time (room temperature) s |
|---|---|---|---|---|---|
| 1 | 150(3:1) | 88.43 | 54.51 | 33.92 | 0.61 |
| 2 | 150(3:2) | 88.27 | 32.39 | 55.87 | 0.74 |
| 3 | 200(3:2) | 87.61 | 19.82 | 67.79 | 0.74 |
| 4 | 250(3:2) | 87.62 | 17.57 | 70.05 | 0.87 |
| 5 | 300(3:2) | 86.63 | 12.54 | 74.09 | 1.02 |
| 6 | 300(1:1) | 87.08 | 11.63 | 75.45 | 0.85 |
| 7 | 500(3:2) | 84.55 | 4.07 | 80.48 | — |

As can be seen from the above table, Example 4 and Example 6 may be a better solution.

In the Example 4, the amount-of-substance concentration of the solute is 250 mmol/L and the ratio of the amount-of-substance concentration of the anodic electroactive compound to the amount-of-substance concentration of the cathodic electrochromic compound is 3:2. In this case, the electrochromic device 10 may have a high light transmittance in the transparent state, a low light transmittance in the colored state, a high contrast, and a short color-changing time. Thus, the electrochromic device may have a good performance.

In the following, some embodiments of the present disclosure will be described in combination with a usage scenario. In some embodiments of the present disclosure, the electrochromic device may be generally configured to block or shield a camera, a flash, a sensor, and the like. In order to block or shield the camera, the electrochromic devices may generally meet the following indexes. 1. The light transmittance in the transparent state (visible light with a wavelength of 450 nm-650 nm) should be above 86% (requirements for the electrochromic device); if the electrochromic device fails to meet the transmittance requirement, a working state of the camera, that is, the shooting state, will be greatly impacted. 2. The light transmittance in the colored state (visible light with a wavelength of 450 nm-650 nm in average) should be less than 15%; low light transmittance in the colored state may better shield and hide the camera when the camera is in a non-working state. 3. The contrast ΔT % should be greater than 63%. 4. The color-changing speed (coloring/discoloring) should be within substantially 0.8 s, that is, the color changing should be finished within substantially 0.8 s; this parameter (color-changing speed) mainly considers the response time required for camera shooting. If the color-changing speed is too long, there will be a delay in the camera shooting, which may affect the user experience.

It is to be understood that the use of the term "substantially" herein, unless otherwise defined with respect to a specific context, with respect to a numeric quantity or otherwise quantifiable relationship, e.g., perpendicularity or parallelism, is to be understood as indicating that quantity ±10%.

With reference to the above indexes, the Example 4 in the above table (the amount-of-substance concentration of the solute is 250 mmol/L, and the ratio of the amount-of-substance concentration of the anodic electroactive compound to the amount-of-substance concentration of the cathodic electrochromic compound is 3:2) may meet all the parameter indexes for shielding the camera, and may have the parameters greater than the parameter requirements of various indexes.

In the following, the camera may be taken as an example. When the camera is in the non-working state, the camera needs to be blocked or shielded. At this time, the rear cover (which may include a glass cover, an electrochromic device, and the like) should have a low light transmittance in the colored state (generally less than 15%). When the camera needs to start working, the electrochromic device needs a faster response speed (generally the changing from the colored state to the completely transparent state should be finished within 0.8 seconds) and a higher transmittance (generally greater than 86%). Of course, there may be slightly different performance requirements for optical devices such as flashlights, sensors, and the like, which are not listed and detailed here.

Combining with the above usage scenarios and performance index requirements, the examples in the above table may be continued to analyze. In the Example 6, the amount-of-substance concentration of the solute is 300 mmol/L and the ratio of the amount-of-substance concentration of the anodic electroactive compound to the amount-of-substance concentration of the cathodic electrochromic compound is 1:1. Compared with the electrochromic medium material in the Example 5, the electrochromic medium material acquired in the Example 6 may have a lower light transmittance in the colored state. However, the light transmittance in the transparent state is also low, and the performance of the electrochromic medium is slightly worse than that acquired in the example 4.

The electrochromic medium materials acquired in the Examples 1, 2, and 3 have greater light transmittance in the colored state, less contrast, and poorer performance than those of the electrochromic medium material acquired in the Examples 4 and 6.

The electrochromic medium materials acquired in the Examples 5 and 7 have longer color-changing time and poorer performance than those of the electrochromic mediums acquired in the Examples 4 and 6.

By comparing with the Examples 1-7, it may be seen that, the higher the amount-of-substance concentration of the solute, the lower the light transmittance in the transparent state, the lower the light transmittance of the colored state, the higher the contrast, and the slower the color-changing speed. When the amount-of-substance concentration of the solute ranges between 150 mmol/L to 300 mmol/L, the electrochromic medium material may have a better performance. The color-changing speed, the light transmittance in the transparent state, the light transmittance in the colored state, and the contrast may be taken into consideration to a certain extent. When the amount-of-substance concentration of the solute is 250 mmol/L, the electrochromic medium may have the optimum performance. In this case, the color-changing speed, the light transmittance in the transparent state, the light transmittance in the colored state, and the contrast may be better taken into account.

By comparing with the Examples 1-7, it may be known that, when the ratio of the amount-of-substance concentration of the anodic electroactive compound to the amount-of-substance concentration of the cathodic electrochromic compound ranges between 3:1 and 1:1, the electrochromic medium material may have a better performance. The color-changing speed, the light transmittance in the transparent state, the light transmittance in the colored state, and the contrast may be taken into consideration to a certain extent. When the ratio of the amount-of-substance concentration of the anodic electroactive compound to the amount-of-substance concentration of the cathodic electrochromic compound is 3:2, the electrochromic medium may have the optimum performance, which may better take into account the color-changing speed, the light transmittance in the transparent state, the light transmittance in the colored state, and the contrast.

The influence of the conductivity C of the electrolyte on the electrochromic device may be further described. In some embodiments, the electrochromic medium material may further include conductive nano-particles added in the solvent, in order to increase the conductivity of the electrochromic medium material, reduce the light transmittance in the colored state of t the electrochromic medium, improve the contrast of the electrochromic medium material and increase the color-changing speed of the electrochromic medium material. In this way, the electrochromic medium material may have a better performance. The conductive nano-particles may be organic nano-particles, such as polypyrrole nano-particles, polyaniline nano-particles, and the like. The conductive nano-particles may also be inorganic nano-particles, such as nano conductive zinc oxide, nano conductive graphite, and the like.

The influence of the moving distance (cell thickness t) of the ion on the electrochromic device may be further described. FIG. 1 is a schematic structural view of an electrochromic device 10 according to some embodiments of the present disclosure. As shown in FIG. 1, in some embodiments of the present disclosure, an electrochromic device 10 may be further provided. The electrochromic device 10 may include a receiving space 16 defined by two substrates coated with a conductive material and a frame 15. The electrochromic device 10 may further include any of the electrochromic medium material as described above. The electrochromic medium material may be filled in the receiving space 16. In some embodiments, the substrates may be transparent, and the frame 15 may be made of an insulating material such as plastic, silicone, rubber, or other organic polymer materials.

Under the action of the external electrical signal, the electrochromic medium may exhibit different colors due to changes in the gain and loss of the electrons. Since the substrates are transparent, the color of the electrochromic device 10 may be determined by the electrochromic medium material. In this way, the electrochromic device 10 may also have two different color states, that is, the colored state and the transparent state. When the applied electric signal changes, the electrochromic device 10 may undergo a color change between the colored state and the transparent state. The light transmittance in the colored state, the light transmittance in the transparent state, the contrast, and the color-changing speed of the electrochromic device 10 may be important indexes for evaluating the performance of the electrochromic device 10, and may be closely associated with the thickness t of the receiving space 16.

More specifically, the electrochromic device 10 may include a first substrate 11, a first conductive layer 12, a second conductive layer 13, a second substrate 14, and a frame 15 that are successively stacked on one another. The first conductive layer 12 may be formed, coated or plated on the first substrate 11. The second conductive layer 13 may be formed, coated or plated on the second substrate 14. The frame 15 may be configured to bond the first substrate 11 and the second substrate 14. The first substrate 11 with the first conductive layer 12 and the second substrate 14 with the second conductive layer 13 may be configured as a base. The base and the frame 15 cooperatively define the receiving space 16. The electrochromic medium material may be filled in the receiving space 16. It should be noted that, the terms "first", "second", and "third" in some embodiments of the present disclosure are used herein for purposes of description, and are not intended to indicate or imply relative importance or significance or to imply the number of indicated technical features. Thus, the feature defined with "first", "second", and "third" may include one or more of such a feature.

time required for the electrochromic device 10 to change from the colored state to the transparent state.

| Example | Thickness t of receiving space 16 (μm) | Light transmittance in transparent state | Light transmittance in colored state | Contrast | Color-changing time (room temperature) s |
|---------|----------------------------------------|------------------------------------------|--------------------------------------|----------|------------------------------------------|
| 1 | 20 | 88.0 | 28.4 | 59.6 | 0.64 |
| 2 | 30 | 87.4 | 21.9 | 65.5 | 0.87 |
| 3 | 45 | 87.4 | 20.8 | 66.6 | 0.85 |
| 4 | 50 | 87.4 | 17.5 | 69.9 | 0.83 |
| 5 | 55 | 87.0 | 15.6 | 71.4 | 0.92 |
| 6 | 60 | 86.5 | 12.8 | 73.7 | 1.1 |
| 7 | 100 | 84.6 | 4.5 | 80.1 | 1.6 | cated technical features. Thus, the feature defined with "first", "second", and "third" may include one or more of such a feature.

The first substrate 11 and the second substrate 14 may be made of glass or a transparent resin material having certain hardness, and have a light transmittance of 85% or more. The first substrate 11 and the second substrate 14 may be configured to support other layers. For example, at least one of the first substrate 11 and the second substrate 14 may include polyethylene terephthalate (also referred as PET or PEIT for short, commonly known as polyester resin, which is a polycondensate of terephthalic acid and ethylene glycol), poly (methyl methacrylate) (referred to as PMMA, also known as acrylic or perspex), polyimide (PI), and the like. The first substrate 11 and the second substrate 14 may be made of other suitable materials, all these materials cover within the scope of understanding of those skilled in the art, and will not be listed and detailed here. Furthermore, the material of the second substrate 14 may be the same as or different from that of the first substrate 11.

The first conductive layer 12 and the second conductive layer 13 may be disposed or prepared by a physical vapor deposition (PVD) method. The PVD method may specifically include vacuum evaporation, sputtering, ion plating (hollow cathode ion plating, hot cathode ion plating, arc ion plating, active reaction ion plating, radio frequency ion plating, direct-current discharge ion plating), and the like.

A thickness of each of the first conductive layer 12 and the second conductive layer 13 may range from 100 nm to 300 nm. More specifically, the thickness of each of the first conductive layer 12 and the second conductive layer 13 may be 100 nm, 120 nm, 150 nm, 200 nm, 280 nm, 300 nm, and the like. At least one of the first conductive layer 12 and the second conductive layer 13 may be made of a transparent conductive material. The transparent conductive material may include indium tin oxide (ITO), zinc aluminum oxide (AZO), a graphene film, or the like.

The thickness t of the receiving space 16 may range from 20 μm to 100 μm. In some embodiments, the thickness t of the receiving space 16 may be 20 μm, 30 μm, 50 μm, 60 μm, or 100 μm.

In some embodiments, the solvent is dimethylacetamide, the anodic electroactive compound is the aniline compound, the cathodic electrochromic compound is the viologen compound, the amount-of-substance concentration of the solute of the electrochromic medium is 250 mmol/L, and the ratio of the amount-of-substance concentration of the anodic electroactive compound to the amount-of-substance concentration of the cathodic electrochromic compound is 3:2. In this case, the influence of thickness t of the receiving space 16 on the performance of the electrochromic device 10 may be shown in the following table. It should be noted that, in the following table, the color-changing time may refer to the As can be seen from the table above, in the Example 4, the thickness t of the receiving space 16 is 50 μm. In this case, the electrochromic device 10 may have a higher light transmittance in the transparent state, a lower light transmittance in the colored state, a greater contrast, and a shorter color-changing time, and may better take into account the color-changing speed, the light transmittance in the transparent state, the light transmittance in the colored state, and the contrast. Thus, the electrochromic device may have a better performance.

In the Examples 1, 2, and 3, the light transmittance in the colored state is higher, the contrast is lower, and the performance is worse than those in the Example 4.

In the Examples 5, 6, and 7, the color-changing speed is slower and the performance is worse than those in the Example 4.

By comparing the examples 1-7, it may be seen that, when the thickness t of the receiving space 16 ranges from 30 μm to 60 μm, the electrochromic device 10 may have a better performance. The color-changing speed, the light transmittance in the transparent state, the light transmittance in the colored state, and the contrast may be taken into consideration to a certain extent. When the thickness t of the receiving space 16 ranges from 45 μm to 55 μm, the electrochromic device 10 may have a still better performance, and the color-changing speed, the light transmittance in the transparent state, the light transmittance in the colored state, and the contrast may be taken into account. When the thickness t of the receiving space 16 is 50 μm, the electrochromic device 10 may have the optimum performance. In this case, the color-changing speed, the light transmittance in the transparent state, the light transmittance in the colored state, and the contrast may be better taken into account.

In some embodiments, the aniline may be used as the donor group, while the viologen may be used as the electron-withdrawing group. According to the foregoing formula, the higher the concentration of the material, the faster the color-changing speed. However, it is not true. If the donor group is higher in content, the electrochromic material will be less reliable and less stable since the aniline is easily deteriorated after absorbing the ultraviolet light. Therefore, the concentration of the aniline should not be too high. It may also be proved from the foregoing experimental data that, the electrochromic component may have the optimum performance when the concentration of the electrochromic material is within a certain range. In addition, by analyzing of the above experimental data, a ratio of the donor group to the electron-withdrawing group may match a preset range. The electrochromic device 10 provided in some embodiments may have a better performance. The index parameters such as the color-changing speed, the light transmittance in the transparent state, the light transmittance in the colored state, and the contrast may be taken into account to a certain extent.

Figure 2:
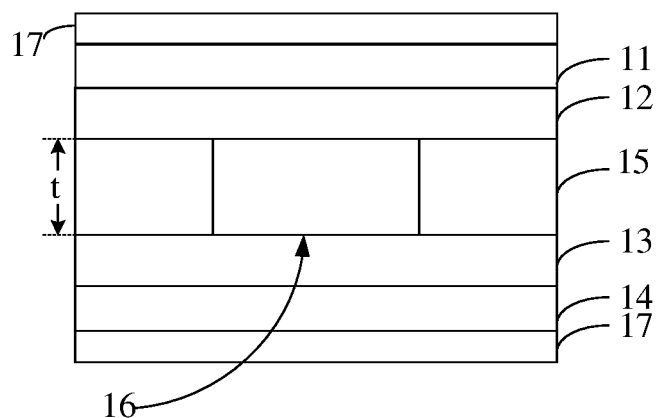
FIG. 2 is another schematic structural view of an electrochromic device according to some embodiments of the present disclosure.

Furthermore, the influence of the temperature T on the electrochromic device may be described. FIG. 2 is another schematic structural view of an electrochromic device 10 according to some embodiments of the present disclosure. As shown in FIG. 2, compared with the electrochromic device 10 shown in FIG. 1, the electrochromic device 10 in FIG. 2 may include a first substrate 11, a second substrate 14, a frame 15, an electrochromic medium material, and a heating layer 17. A first conductive layer 12 may be disposed at one side of the first substrate 11 facing towards or adjacent to the second substrate 14. A second conductive layer 13 may be disposed at one side of the second substrate 14 facing towards or adjacent to the first substrate 11. The frame 15 may be sandwiched between the first conductive layer 12 and the second conductive layer 13. The frame 15, the first conductive layer 12, and the second conductive layer 13 cooperatively define a receiving space 16. The electrochromic medium material may be filled into the receiving space 16. The heating layer 17 may be disposed on at least one of the following position: a surface of the first substrate 11 facing away from the first conductive layer 12, and a surface of the second substrate 14 facing away from the second conductive layer 13.

More specifically, the electrochromic device 10 may include the first substrate 11, the first conductive layer 12, the electrochromic medium material, the second conductive layer 13, and the second substrate 14 that are successively stacked on one another. The specific material composition of the first substrate 11, the first conductive layer 12, the electrochromic medium material, the second conductive layer 13, and the second substrate 14 may refer to detailed descriptions described before, and will not be repeated here anymore.

In some embodiments, as shown in FIG. 2, it is possible to provide two heating layers 17. One of the heating layers 17 may be disposed on the surface of the first substrate 11 facing away from the first conductive layer 12, and the other of the heating layers 17 may be disposed on the surface of the second substrate 14 facing away from the second conductive layer 13. That is to say, the first conductive layer 12 and one of the heating layers 17 are disposed at two opposite sides of the first substrate 11, and the second conductive layer 13 and the other of the heating layers 17 are disposed at two opposite sides of the second substrate 14. It may be understood that, it is also possible to provide one heating layer 17. The heating layer 17 may be disposed on the surface of the first substrate 11 facing away from the first conductive layer 12, or may be disposed on the surface of the second substrate 14 facing away from the second conductive layer 13. In some embodiments of the present disclosure, the heating layer 17 may be transparent. However, the specific material of the heating layer 17 will not be limited in some embodiments of the present disclosure. For example, the heating layer 17 may be a transparent graphene electric heating film.

The color-changing speed of the electrochromic medium material may also be associated with the temperature. An appropriate increase in temperature may facilitate accelerating the color changing of the electrochromic medium material. In some embodiments of the present disclosure, a heating layer 17 may be arranged on at least one of the surface of the first substrate 11 facing away from the first conductive layer 12 and the surface of the second substrate 14 facing away from the second conductive layer 13, thereby increasing the color-changing speed of the electrochromic medium material.

Figure 3:
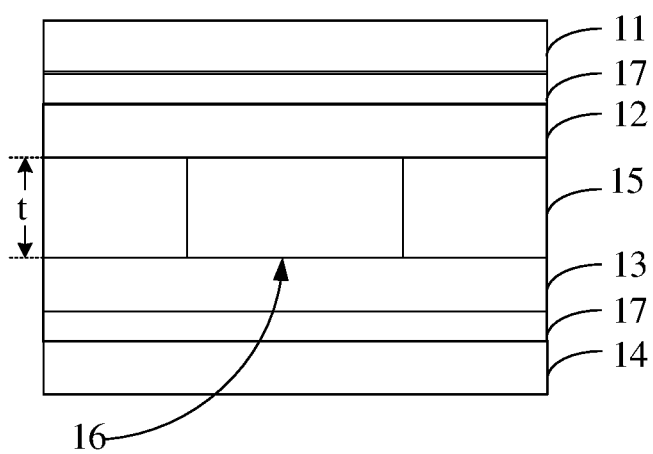
FIG. 3 is yet another schematic structural view of an electrochromic device according to some embodiments of the present disclosure.

FIG. 3 is yet another schematic structural view of an electrochromic device 10 according to some embodiments of the present disclosure. As shown in FIG. 3, compared with the electrochromic device 10 shown in FIG. 2, in the electrochromic device 10 shown in FIG. 3, the heating layer 17 may be disposed in at least one of the following position: between the first substrate 11 and the first conductive layer 12, and between the second substrate 14 and the second conductive layer 13.

In some embodiments, as shown in FIG. 3, it is possible to provide two heating layers 17. One of the heating layers 17 may be disposed between the first substrate 11 and the first conductive layer 12, and the other of the heating layers 17 may be disposed between the second substrate 14 and the second conductive layer 13. It may be understood that, it is also possible to provide one heating layer 17. The heating layer 17 may be disposed between the first substrate 11 and the first conductive layer 12, or may be disposed between the second substrate 14 and the second conductive layer 13. In some embodiments of the present disclosure, the heating layer 17 may be transparent. However, the specific material of the heating layer 17 will not be limited in some embodiments of the present disclosure. For example, the heating layer 17 may be a transparent graphene electric heating film.

Figure 4:
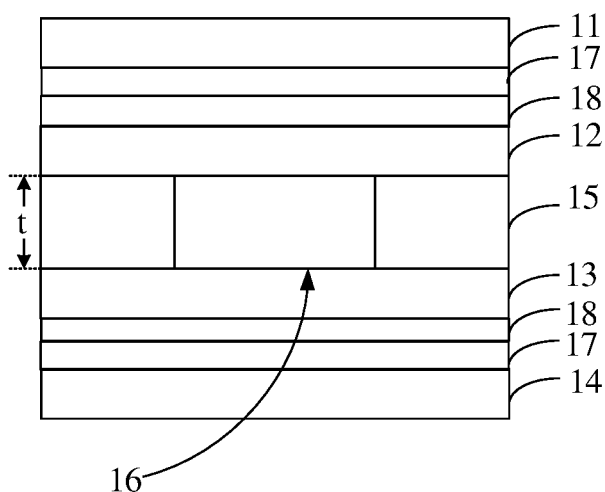
FIG. 4 is still another schematic structural view of an electrochromic device according to some embodiments of the present disclosure.

FIG. 4 is still another schematic structural view of an electrochromic device 10 according to some embodiments of the present disclosure. As shown in FIG. 4, compared with the electrochromic device 10 shown in FIG. 3, the electrochromic device 10 shown in FIG. 4 may further include an insulating layer 18. The insulating layer 18 may be disposed between the heating layer 17 and the conductive layers (including the first conductive layer 12 and the second conductive layer 13). By disposing the insulating layer 18, it is possible to facilitate the improvement of the stability of the electrochromic device 10.

Next, the light transmittance of the electrochromic device in the transparent state may be described in detail. The light transmittance of the electrochromic device in the related art may be analyzed in the following.

Light transmittance of the first substrate 11 having the first conductive layer 12 disposed thereon: the original light transmittance of the first substrate 11 without the first conductive layer 12 disposed thereon may be about 92%. After disposing the first conductive layer 12 having a square resistance about 20 ohms, the light transmittance of the first substrate 11 having the first conductive layer 12 disposed thereon may be about 86%. Besides, the light may be absorbed by the transmission material, and may be reflected. Considering the absorbing and reflection of light, the light transmittance of the first substrate 11 having the first conductive layer 12 disposed thereon may be about 85%.

Light transmittance of the second substrate 14 having the second conductive layer 13 disposed thereon: in this case, the reflection of the light may be not considered in the calculation, and only the absorption of the light will be considered. Therefore, the light transmittance of the second substrate 14 having the second conductive layer 13 disposed thereon may be considered to be 85%+7% (reflection)=92%.

Light transmittance of the electrochromic medium material: in this case, only the absorption of light will be considered. The absorptivity of the light may be varied according to the material formulations and the concentrations of the material. It is assumed that the absorptivity of the electrochromic medium material is 5%, which means the light transmittance may be about 95%.

The total light transmittance of the electrochromic device 10 may be calculated as follow: (the light transmittance of the first substrate 11 having the first conductive layer 12 disposed thereon)*the light transmittance of the electrochromic medium material*(the light transmittance of the second substrate 14 having the second conductive layer 13 disposed thereon)=86%*95%*92%=about 75.2%. Obviously, the light transmittance of the electrochromic device before the improvement cannot meet the requirement for the original light transmittance index (above 86%) described previously.

Thus, it is possible to increase the light transmittance of the electrochromic device from at least three aspects. 1. The light transmittance of the glass substrate (the first substrate 11 and the second substrate 14) may be increased. 2. The thickness of the transparent conductive layer (including the first conductive layer 12 and the second conductive layer 13) may be selected. The thickness of the transparent conductive layer may match with the thickness of the glass substrate, or to be thinner. 3. The formula of the electrolyte of the electrochromic medium material may be adjusted, in order to reduce the absorptivity of the material.

Figure 5:
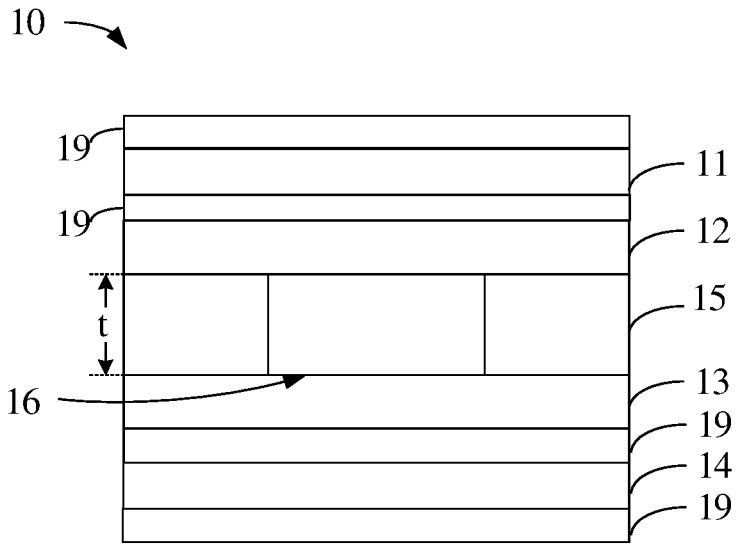
FIG. 5 is a further schematic structural view of an electrochromic device according to some embodiments of the present disclosure.

Firstly, how to increase the light transmittance of the glass substrate will be described. FIG. 5 is a further schematic structural view of an electrochromic device 10 according to some embodiments of the present disclosure. As shown in FIG. 5, compared with the electrochromic device 10 shown in FIG. 1, the electrochromic device 10 shown in FIG. 5 may further include an anti-reflection film (AR) 19. The anti-reflection film 19 may be disposed in at least one of the following positions: between the first substrate 11 and the first conductive layer 12, between the second conductive layer 13 and the second substrate 14, on the surface of the first substrate 11 facing away from the first conductive layer 12, and on the surface of the second substrate 14 facing away from the second conductive layer 13. The anti-reflection film 19 may further improve the light transmittance of the electrochromic device 10. It may be understood that, the anti-reflective film 19 can include multiple layers, and the multiple layers of anti-reflection film 19 may be configured to enhance transmittance of light rays with certain wavelengths, respectively, to further increase the light transmittance of the electrochromic device 10.

Figure 6:
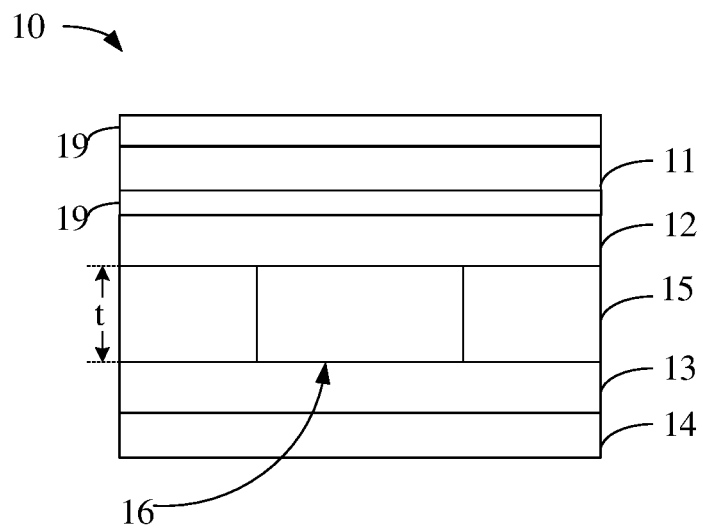
FIG. 6 is a still further schematic structural view of an electrochromic device according to some embodiments of the present disclosure.

As shown in FIG. 5, the electrochromic device 10 may include four layers of the anti-reflection films 19. The fourth layers of the anti-reflection films 19 may be respectively disposed between the first substrate 11 and the first conductive layer 12, disposed between the second conductive layer 13 and the second substrate 14, disposed on the surface of the first substrate 11 facing away from the first conductive layer 12, and disposed on the surface of the second substrate 14 facing away from the second conductive layer 13. In some embodiments, the electrochromic device 10 may also include two layers of the anti-reflection film 19. FIG. 6 is a still further schematic structural view of an electrochromic device 10 according to some embodiments of the present disclosure. As shown in FIG. 6, the two layers of anti-reflection films 19 may be respectively disposed between the first substrate 11 and the first conductive layer 12 and disposed on the surface of the first substrate 11 facing away from the first conductive layer 12.

It should be noted that, the embodiments of the present disclosure described with the figures are given only two arrangement ways of the anti-reflection film 19. However, in some embodiments of the present disclosure, the numbers of the anti-reflection films 19 and the specific disposing positions of the anti-reflection films 19 will not be limited. For example, it is possible to provide one layer of the anti-reflection film 19, and the one layer of the anti-reflection film 19 may be disposed in any one of the following positions: between the first substrate 11 and the first conductive layer 12, between the second conductive layer 13 and the second substrate 14, on the surface of the first substrate 11 facing away from the first conductive layer 12, and on the surface of the second substrate 14 facing away from the second conductive layer 13. In some embodiments, it is also possible to provide two layers of the anti-reflection films 19. The two layers of the anti-reflection films 19 may be disposed in any two positions selected from the group consisting of: between the first substrate 11 and the first conductive layer 12, between the second conductive layer 13 and the second substrate 14, on the surface of the first substrate 11 facing away from the first conductive layer 12, and on the surface of the second substrate 14 facing away from the second conductive layer 13.

Figure 7:
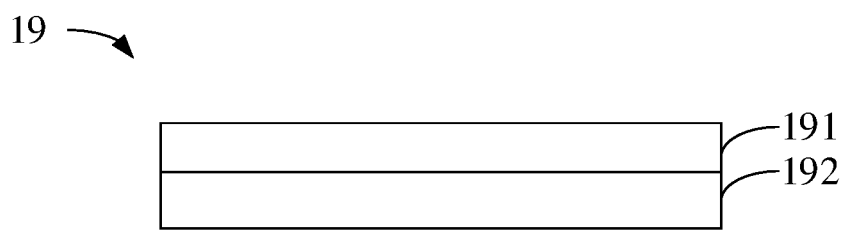
FIG. 7 is a schematic structural view of an anti-reflection film shown in FIG. 5.

FIG. 7 is a schematic structural view of the anti-reflection film 19 shown in FIG. 5. As shown in FIG. 7, the anti-reflection film 19 may include a niobium oxide layer 192 and a silicon oxide layer 191 that are successively stacked on one another. A thickness of the niobium oxide layer 192 and a thickness of the silicon oxide layer 191 may be shown in the following table.

| Glass substrate | Thickness |
| --- | --- |
| Transparent conductive layer | 120 nm |
| Si/O | 25 nm |
| Nb/O | 7 nm |

Figure 8:
FIG. 8 is another schematic structural view of the anti-reflection film shown in FIG. 5.

FIG. 8 is another schematic structural view of the anti-reflection film 19 shown in FIG. 5. In some embodiments, as shown in FIG. 8, the anti-reflection film 19 may include a plurality of niobium oxide layers 192 and a plurality of silicon oxide layers 191 that are alternately stacked on one another. The anti-reflection film 19 shown in FIG. 8 may include three layers of niobium oxide layers 192 and three layers of silicon oxide layers 191 alternately stacked on one another. Details of the thicknesses of the silicon oxide layers 191 and the niobium oxide layers 192 may be shown in the following table.

| Glass substrate | Thickness |
| --- | --- |
| Transparent conductive layer | 150 nm |
| Si/O | 45 nm |
| Nb/O | 30 nm |
| Si/O | 40 nm |
| Nb/O | 55 nm |
| Si/O | 35 nm |
| Nb/O | 20 nm |

As further shown in FIG. 5, each of an upper surface and a lower surface of the glass substrate (including the first substrate 11 and the second substrate 14) may be provided with the anti-reflection film 19. In this way, the reflectivity may be further reduced, and the light transmittance of the glass substrate (including the first substrate 11 and the second substrate 14) may be increased to more than 99%.

Furthermore, the thickness of the transparent conductive layer (the first conductive layer 12 and the second conductive layer 13) may be selected, and the thickness of the transparent conductive layer may match with the thickness of the anti-reflection film 19. In addition, the thickness of the transparent conductive layer may be made thinner. In this way, the light transmittance of the glass substrate having the transparent conductive layer arranged thereon may be increased to more than 95%. As to reducing the absorptivity of the electrolyte solution of the electrochromic medium material, for example, if the concentration of the electrolyte is reduced (this may also be considered in conjunction with the color-changing speed), the absorptivity of the electrochromic medium material may be reduced to 3%. In summary, the total light transmittance of the electrochromic device 10 may be calculated as follow: (the light transmittance of the first substrate 11 with the first conductive layer 12)*the light transmittance of the electrochromic medium material*(the light transmittance of the second substrate 14 with the second conductive layer 13)=95%*97%*95%=87.5%. If it needs to further increase the light transmittance of the electrochromic device 10, it can be achieved by reducing the absorptivity of the transparent conductive layer. For example, it is possible to improve the cleanliness of the transparent conductive layer and increase the operating temperature of the transparent conductive layer. In this way, the light transmittance of the glass substrate with the transparent conductive layer may be increased to 96%, and the total light transmittance of the electrochromic device 10 in the transparent state may be increased to about 90%.

In some embodiments, in order to further improve the light transmittance of the electrochromic device, it is possible to make a refractive index of the electrochromic medium material identical to or similar to refractive indexes of the first conductive layer 12 and the second conductive layer 13, respectively.

Figure 9:
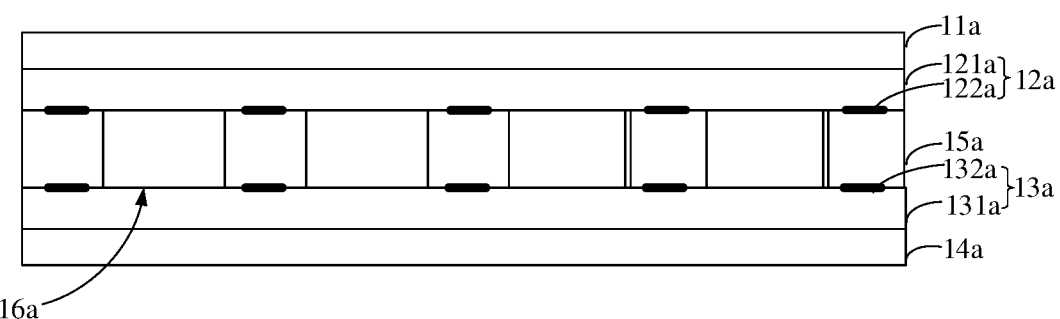
FIG. 9 is a further schematic structural view of an electrochromic device according to some embodiments of the present disclosure.

Then, the wiring design of the electrochromic device may be described in detail. FIG. 9 is a further schematic structural view of an electrochromic device 10a according to some embodiments of the present disclosure. As shown in FIG. 9, the electrochromic device 10a may include a first substrate 11a, a second substrate 14a, a frame 15a, and an electrochromic medium material. A first conductive structure 12a may be disposed on the first substrate 11a. The first conductive structure 12a may include a first conductive layer 121a and the first wiring 122a stacked on one another and electrically connected to each other. A second conductive structure 13a may be disposed on the second substrate 14a. The second conductive structure 13a may include a second conductive layer 131a and a second wiring 132a stacked on one another and electrically connected to each other. The frame 15a may be disposed between the first conductive structure 12a and the second conductive structure 13a. In some embodiments, a projection of a pattern of the frame 15a projected on the first substrate 11a or the second substrate 14a, a projection of a pattern of the first wiring 122a projected on the first substrate 11a or the second substrate 14a, and a projection of a pattern of the second wiring 132a projected on the first substrate 11a or the second substrate 14a may be at least partially overlapped with each other. Herein, the projections on the first substrate 11a or the second substrate 14a being at least partially overlapped with each other means that the patterns of the frame 15a, the first wiring 122a and the second wiring 132a may be completely or partially identical to each other, and the identical portions of the patterns of frame 15a, the first wiring 122a, and the second wiring 132a need to be disposed corresponding to each other. The frame 15a, the first conductive structure 12a, and the second conductive structure 13a may cooperatively define two or more receiving spaces 16a isolated from each other. The electrochromic medium material may be filled into the receiving spaces 16a, such that a plurality of electrochromic units spaced apart from each other may be formed. Driven by the first conductive structure 12a and the second conductive structure 13a, these electrochromic units may be switched between the colored state and the transparent state. It should be noted that, all directional indications (such as up, down, left, right, front, rear, and the like) in some embodiments of the present disclosure are only used to explain the relative positional relationships, the motion situation, and the like between various components in a specific posture (as shown in the figures). If the posture changes, the directional indication also changes accordingly.

The first wiring 122a and the second wiring 132a of the electrochromic device 10a may divide an electrochromic region into a plurality of minimum unit regions (which are illustrated as different electrochromic material units in aspect of the electrochromic material). Each electrochromic material unit may correspond to one of the minimum unit regions. The first wiring 122a and the second wiring 132a may be routed around the minimum unit region, and the electric field should be ensured to be as uniform as possible. Thus, the color-changing area may have a better design, thereby facilitating the improvement of the response speed of the electrochromic device 10a.

Figure 10:
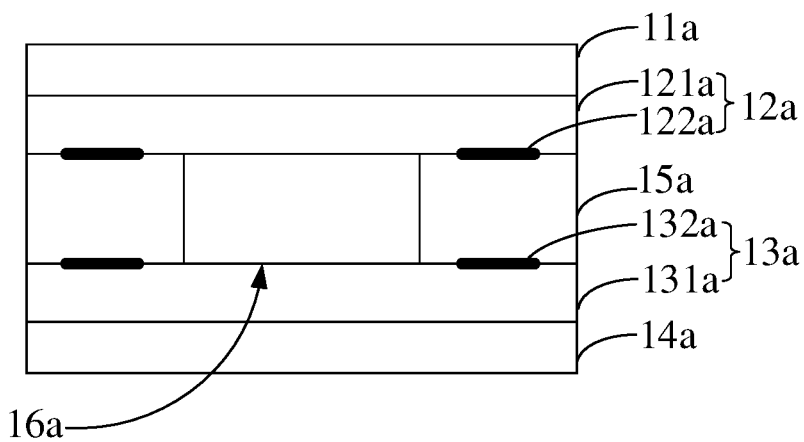
FIG. 10 is a further schematic structural view of an electrochromic device according to some embodiments of the present disclosure.
Figure 11:
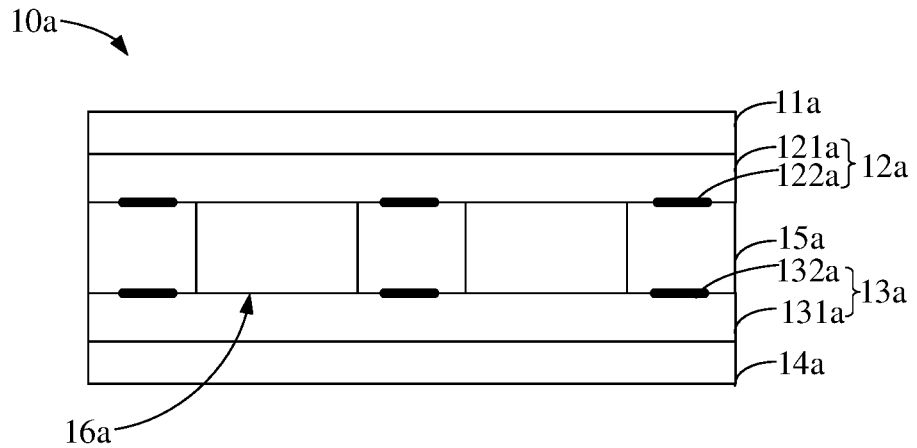
FIG. 11 is a further schematic structural view of an electrochromic device according to some embodiments of the present disclosure.
Figure 12:
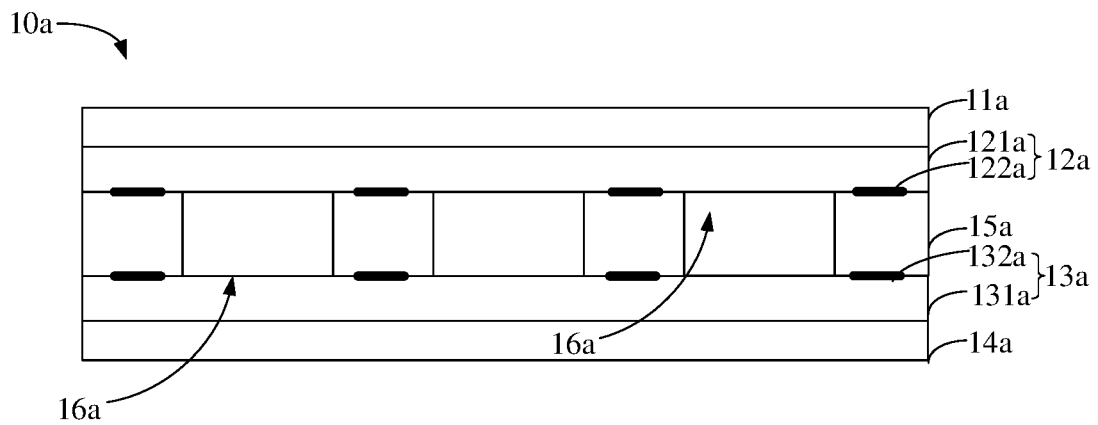
FIG. 12 is a further schematic structural view of an electrochromic device according to some embodiments of the present disclosure.

As shown in FIG. 9, in some embodiments, the first conductive structure 12a may be disposed on a surface of the first substrate 11a that is adjacent to or faces towards the frame 15a. The second conductive structure 13a may be disposed on a surface of the second substrate 14a that is adjacent to or faces towards the frame 15a. The frame 15a may be sandwiched between the first conductive structure 12a and the second conductive structure 13a. Furthermore, the frame 15a, the first conductive structure 12a, and the second conductive structure 13a may cooperatively define four receiving spaces 16a isolated from each other. It should be noted that, the number of the receiving spaces 16a may not be limited in some embodiments of the present disclosure. The number of the receiving spaces 16a may be less than four or more than four. FIG. 10 is a further schematic structural view of an electrochromic device 10a according to some embodiments of the present disclosure. For example, as shown in FIG. 10, it is possible to define one receiving space 16a. FIG. 11 is a further schematic structural view of an electrochromic device 10a according to some embodiments of the present disclosure. As shown in FIG. 11, a pair of receiving spaces 16a isolated from each other may be defined. FIG. 12 is a further schematic structural view of an electrochromic device 10a according to some embodiments of the present disclosure. As shown in FIG. 12, three receiving spaces 16a isolated from each other may be defined. In the figures of some embodiments of the present disclosure, only some arranging ways of the receiving spaces 16a are provided. However, the number of the receiving spaces 16a may also be five, six, or even more.

The electrochromic medium material may be filled by means of a vacuum infusion process or a one drop filling process (ODF). In some embodiments of the present disclosure, the vacuum infusion process may be utilized to fill the electrochromic medium material into the receiving space 16a. In some embodiments, a filling inlet 161a (also called as "perfusion inlet") may be defined in the frame 15. The filling inlet 161 may have a one-to-one correspondence with the receiving space 16a, and may communicate with the receiving space 16a. The electrochromic material may be filled into the receiving space 16a via the filling inlet 161a. The filling inlets 161a corresponding to the receiving spaces 16a may be defined separately or spaced apart from each other. The filling inlets 161a corresponding to two adjacent receiving spaces 16a may also be defined adjacent to each other. That is to say, two adjacent receiving spaces 16a may share one filling inlet 161a, or the filling inlets 161 corresponding to the two adjacent receiving spaces 16a communicate with each other. All the filling inlets 161a may be blocked or sealed by sealing member, such as encapsulant. The sealing member may separate or isolate two adjacent receiving spaces 16a.

Figure 13:
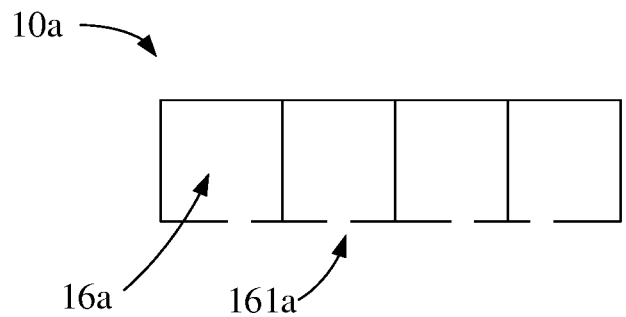
FIG. 13 is a schematic view illustrating a design of a filling inlet of the electrochromic device shown in FIG. 9.
Figure 14:
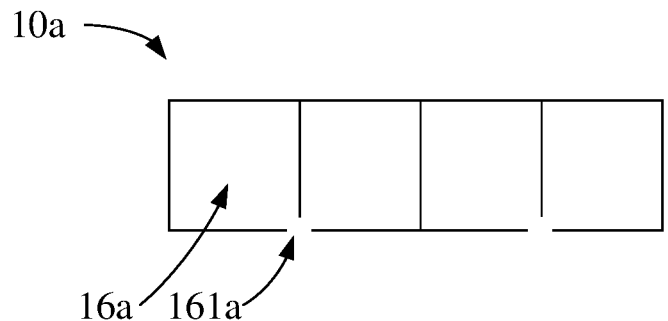
FIG. 14 is a schematic view illustrating another design of a filling inlet of the electrochromic device shown in FIG. 9.

FIG. 13 is a schematic view illustrating a design of a filling inlet 161a of the electrochromic device 10a shown in FIG. 9. As shown in FIG. 13, the electrochromic device 10a may include four receiving spaces 16a. In some embodiments, the frame 15a may define four filling inlets 161a. The filling inlets 161a have a one-to-one correspondence with the receiving spaces 16a. The filling inlets 161a corresponding to the receiving spaces 16a may be defined separately from each other. Thus, each receiving space 16a may be filled with electrochromic material independently. FIG. 14 is a schematic view illustrating another design of a filling inlet 161a of the electrochromic device 10a shown in FIG. 9. As shown in FIG. 14, the electrochromic device 10a may include four receiving spaces 16a. In some embodiments, the frame 15a may define four filling inlets 161a. The filling inlets 161a have a one-to-one correspondence with the receiving spaces 16a. The filling inlets 161a corresponding to two adjacent receiving spaces 16a are arranged adjacently to each other. That is to say, two adjacent receiving spaces 16a may share one filling inlet 161a, or the filling inlets 161 corresponding to the two adjacent receiving spaces 16a communicate with each other. The design of such a filling inlet 161a makes the packaging of the electrochromic device 10a less difficult and improve perfusion efficiency of the electrochromic material, which facilitates improving the stability of the electrochromic device 10a. It should be noted that, in the figures of some embodiments of the present disclosure, only some arranging ways of the filling inlet 161a are provided. However, the position of the filling inlet 161a will not be limited in some embodiments of the present disclosure.

Figure 15:
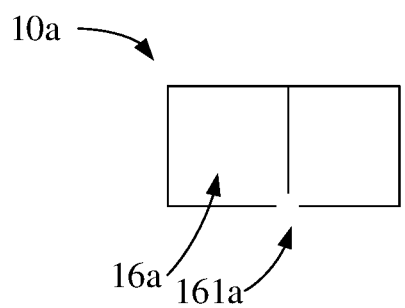
FIG. 15 is a schematic view illustrating a design of a filling inlet of the electrochromic device shown in FIG. 11.
Figure 16:
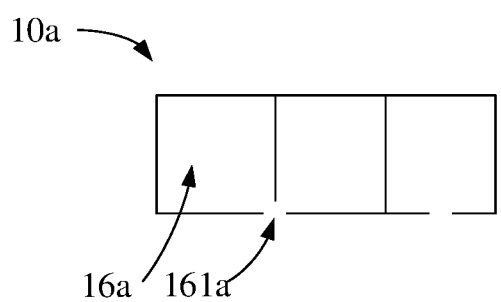
FIG. 16 is a schematic view illustrating a design of a filling inlet of the electrochromic device shown in FIG. 12.
Figure 17:
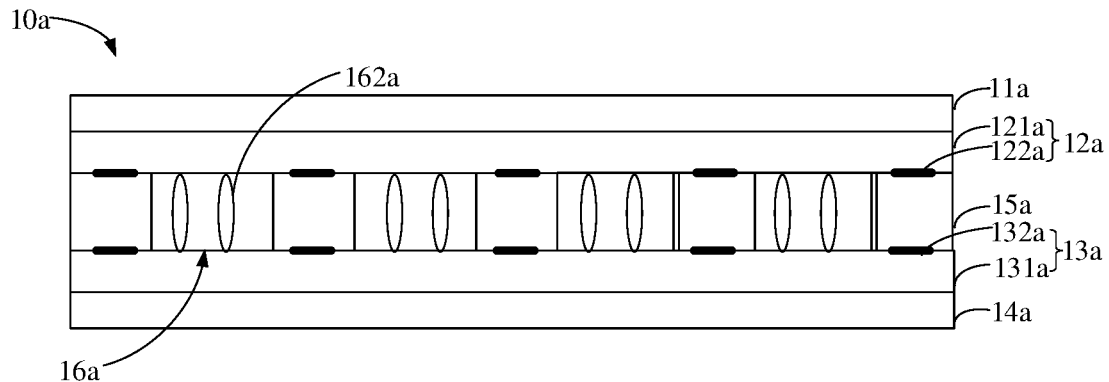
FIG. 17 is a further schematic structural view of an electrochromic device according to some embodiments of the present disclosure.

FIG. 15 is a schematic view illustrating a design of a filling inlet 161a of the electrochromic device 10a shown in FIG. 11. As shown in FIG. 15, two receiving spaces 16a are defined. In some embodiments, the frame 15a may define two filling inlets 161a. The filling inlets 161a have a one-to-one correspondence with the receiving spaces 16a. The filling inlets 161a corresponding to two receiving spaces 16a may be arranged adjacently to each other. That is to say, two adjacent receiving spaces 16a may share one filling inlet 161a, or the filling inlets 161 corresponding to the two adjacent receiving spaces 16a communicate with each other. The design of such a filling inlet 161a makes the packaging of the electrochromic device 10a less difficult and improves perfusion efficiency of the electrochromic material, which facilitates improving the stability of the electrochromic device 10a. FIG. 16 is a schematic view illustrating a design of a filling inlet 161a of the electrochromic device 10a shown in FIG. 12. As shown in FIG. 16, three receiving spaces 16a may be defined. In some embodiments, the frame 15a may define three filling inlets 161a. The filling inlets 161a have a one-to-one correspondence with the receiving spaces 16a. The filling inlets 161a corresponding to two adjacent receiving spaces 16a may be arranged adjacently to each other, and the filling inlet 161a corresponding to the remaining receiving space 16a is separated from the filling inlets 161a corresponding to the two adjacent receiving spaces 161a. The design of such a filling inlet 161a makes the packaging of the electrochromic device 10a less difficult and improves perfusion efficiency of the electrochromic material, which facilitates improving the stability of the electrochromic device 10a. It should be noted that, in the figures of some embodiments of the present disclosure, only some arranging ways of the filling inlet 161a are provided. However, the position of the filling inlet 161a may not be limited in some embodiments of the present disclosure. FIG. 17 is a further schematic structural view of an electrochromic device 10a according to some embodiments of the present disclosure. Compared with the electrochromic device 10a in FIG. 9, in the electrochromic device 10 shown in FIG. 17, a supporting spacer or a supporting element 162a may be further arranged inside at least one of the receiving spaces 16a. More specifically, the supporting spacer 162a may be implemented as a supporting micro-bead, and may be configured to provide a support in the receiving space 16a and further support the first substrate 11a and the second substrate 14a, so that the receiving spaces 16a remains stable in the process of vacuum pumping or vacuum forming, thereby preventing the receiving spaces 16a from collapsing. In order to ensure that the supporting spacer 162a has a certain compressibility, achieves a better hiding effect, and is not easy to be found visually, the supporting micro-bead may be made of transparent composite material. It should be noted that, the supporting spacer 162a shown in FIG. 17 are only for illustration, and the shape and the number of the supporting spacers 162a may not be limited in some embodiments of the present disclosure. In some embodiments, a supporting spacer 162a may abut against the first conductive layer 121a and the second conductive layer 131a. The supporting spacer 162a may be granular. It may be understood that, the layers, in the presence or absence of foreign objects therebetween, can be regarded as a stacked arrangement. For example, there may be no intermediate layer between the first substrate 11a and the first conductive layer 121a and between the second conductive layer 131a and the second substrate 14a, or other intermediate layers may be provided therebetween. These circumstances should be considered as structures with stacked arrangement.

Figure 18:
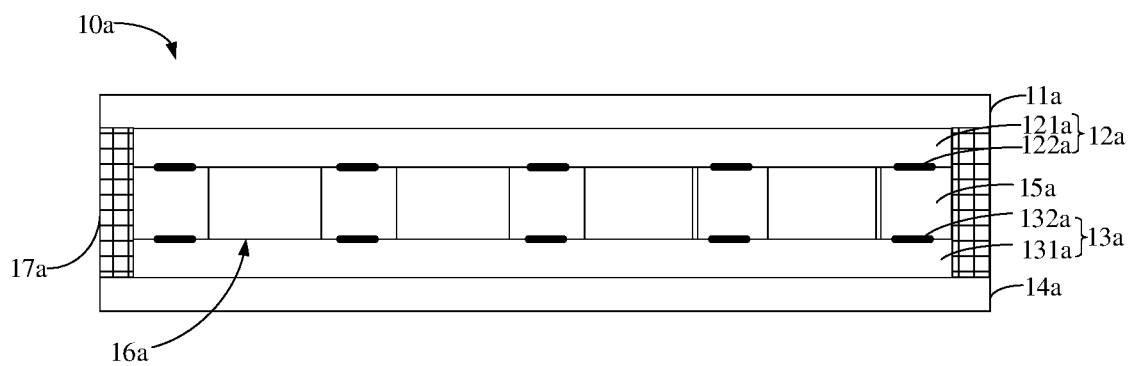
FIG. 18 is a further schematic structural view of an electrochromic device according to some embodiments of the present disclosure.

FIG. 18 is a further schematic structural view of an electrochromic device 10a according to some embodiments of the present disclosure. Compared with the electrochromic device 10a in FIG. 9, the electrochromic device 10 shown in FIG. 18 may further include an encapsulant 17a (also called as encapsulating adhesive or encapsulating glue). The encapsulant 17a may be coated between the first substrate 11a and the second substrate 14a and along edges of the first substrate 11a and the second substrate 14a, and further cover a periphery of a side edge of the first conductive layer 121a and a periphery of a side edge of the second conductive layer 131a. The encapsulant 17a may be configured to improve the reliability of the electrochromic device 10a.

In some embodiments, as further shown in FIG. 9, the first conductive layer 121a may be disposed between the first wiring 122a and the first substrate 11a. The second conductive layer 131a may be disposed between the second wiring 132a and the second substrate 14a. The frame 15a may be disposed between the first conductive layer 121a and the second conductive layer 131a. The first wiring 122a and the second wirings 132a may be buried or embedded in the frame 15a.

Figure 19:
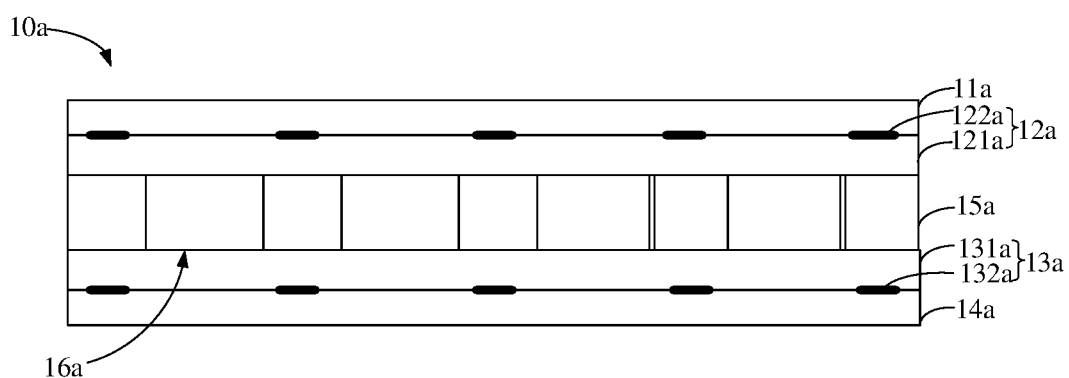
FIG. 19 is a further schematic structural view of an electrochromic device according to some embodiments of the present disclosure.

FIG. 19 is a further schematic structural view of an electrochromic device 10a according to some embodiments of the present disclosure. As shown in FIG. 19, it will be appreciated that, the first wiring 122a may be disposed between the first conductive layer 121a and the first substrate 11a. The second wiring 132a may be disposed between the second conductive layer 131a and the second substrate 14a. The frame 15a may be disposed between the first conductive layer 121a and the second conductive layer 131a.

Figure 20:
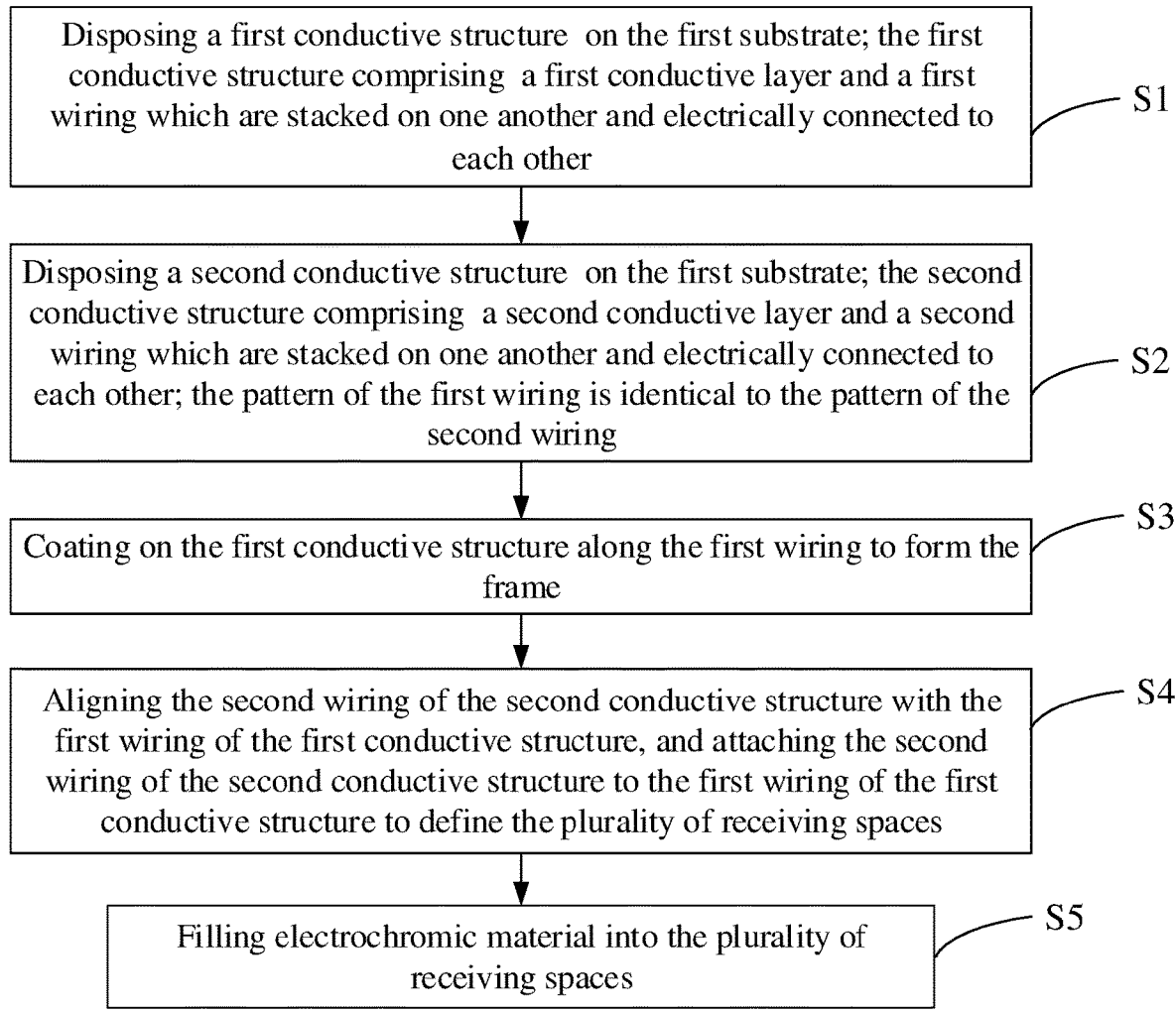
FIG. 20 is a flow chart of a method for manufacturing the electrochromic device shown in FIG. 9.

FIG. 20 is a flow chart of a method for manufacturing the electrochromic device 10a shown in FIG. 9. In some embodiments of the present disclosure, a method for manufacturing the electrochromic device 10a may be further provided. As shown in FIG. 20, the method may include operations executed by the following blocks.

At block S1, a first conductive structure 12a may be disposed or formed on the first substrate 11a. The first conductive structure 12a may include a first conductive layer 121a and a first wiring 122a which are stacked on one another and electrically connected to each other.

Figure 21:
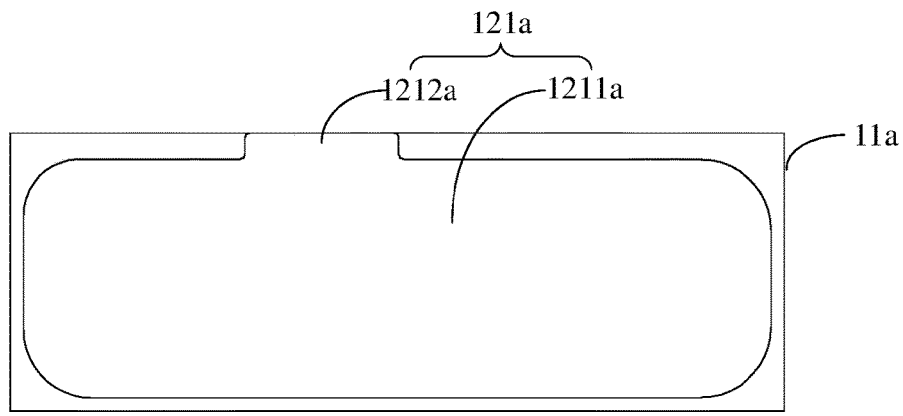
FIG. 21 is a schematic view of a first conductive layer shown in FIG. 9.

More specifically, at first, the first conductive structure 12a may be disposed or formed on the first substrate 11a. FIG. 21 is a schematic view of the first conductive layer 121a shown in FIG. 9. As shown in FIG. 21, the first conductive layer 121a may be an integrated whole-surface or solid ITO structure. The first conductive layer 121a may include a first conductive region 1211a corresponding to the receiving space 16a and a first lead-out region 1212a configured to be bound to an FPC. The first conductive region 1211a may be integrally connected to the first lead-out region 1212a.

More specifically, the first conductive layer 121a having a square resistance ranging from 10 ohms to 15 ohms may be disposed or formed on the first substrate 11a. In some embodiments, the first conductive layer 121a may be implemented as an ITO layer. Considering the light transmittance, the square resistance of the ITO layer may range from 12 ohms to 14 ohms, and the light transmittance may range from 80% to 90%. A thickness of the first conductive layer 121a may range from 50 nm to 200 nm. In some embodiments, the thickness of the first conductive layer 121a may range from 100 nm to 170 nm. In some embodiments, it is also possible to dispose an anti-reflection film on each of two opposite sides of the first substrate 11a, in order to further increase the light transmittance. In the case that the first substrate 11a is made of glass, considering the aspect of strength and subsequent thinning efficiency, the first substrate 11a may be implemented as an alkali-free glass having a thickness of 0.4 mm.

After the ITO layer is formed, parts of the ITO pattern which are not needed may be removed by exposing, developing, and etching processes with yellow light, and thus the desired ITO region may be reserved. It may be understood that, it is possible to simultaneously form a plurality of ITO patterns on a large-area substrate, and package or encapsulate the substrate. After the package, the substrate may be cut into a plurality of small and independent electrochromic modules. It should be noted that, in the figures of some embodiments of the present disclosure, the structure of only one electrochromic module is used for description.

Figure 22:
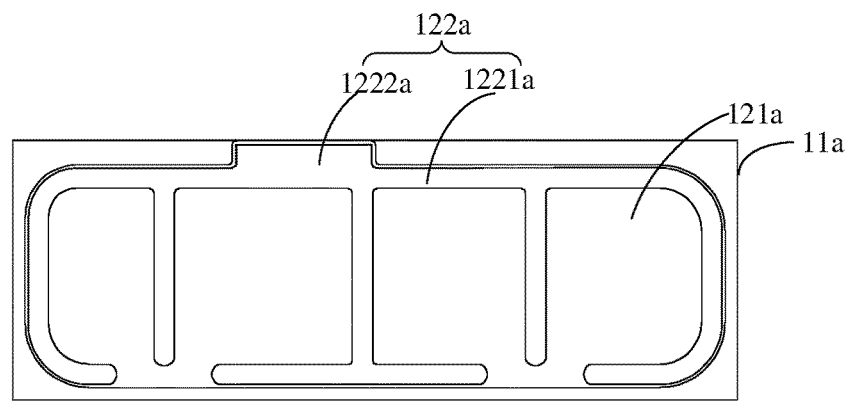
FIG. 22 is a schematic view of a first wiring shown in FIG. 9.

Furthermore, a first wiring 122a may be disposed or formed on the first conductive layer 121a. FIG. 22 is a schematic view of the first wiring 122a shown in FIG. 9. In some embodiments, as shown in FIG. 22, the first wiring 122a may have a continuous wiring structure, and may include a first driving portion 1221a and a first lead-out portion 1222a. The first driving portion 1221a may be configured to surround or enclose the receiving space 16a. The first lead-out portion 1222a may be connected to a side of the first driving portion 1221a.

In some embodiments, the first driving portion 1221a may be routed or arranged around a periphery of the first conductive region 1211a with an area as maximum as possible. The first driving portion 1221a may divide the first conductive region 1211a into four minimum unit regions. Besides, the first driving portion 1221a may be routed or arranged around a periphery of the minimum unit region, and the electric field should be ensured to be as uniform as possible, thereby increasing the respond speed of the electrochromic device 10a. The first driving portion 1221a may further define a first opening in a position in which a filling inlet 161a is defined. That is, the first driving portion 1221a may be disconnected at the filling inlet 161a. In this way, it is possible to reduce the risk of corrosion of the wiring which is caused by the electrochromic medium material contacting with the wiring pattern. In some embodiments, it is also possible that the first wiring 122a is closed. In some embodiments, the first lead-out portion 1222a may be arranged or routed around the first lead-out region 1212 with an area as maximum as possible.

In some embodiments of the present disclosure, the specific material of the first wiring 122a may not be limited. The first wiring 122a may be made of or include the silver for printing, silver for plating, MoAlMo (molybdenum-aluminum-molybdenum-coated glass), copper, gold, and other materials with relatively low conductivity. Of course, and the material having a smaller impedance may be better. In some embodiments of the present disclosure, the first wiring 122a may be made of MoAlMo, which has strong corrosion resistance. The first wiring 122a may have a wiring width less than or equal to 1.5 mm, for example, the width of the first wiring 122a may be of 0.5-1.5 mm or may be about 1 mm, and the impedance is less than or equal to $5\Psi$. In some embodiments of the present disclosure, the first wiring 122a may have the wiring width of about 1.0 mm, and have an impedance within 5 ohms. The first wiring 122a may be formed by disposing a metal film and then etching the metal film. Or the first wiring 122a may be formed by adopting a local metal plating method, that is, a metal plating layer may be disposed in a desired position where the wiring is required.

At block S2, a second conductive structure 13a may be disposed or formed on the second substrate 14a. The second conductive structure 13a may include a second conductive layer 131a and a second wiring 132a which are stacked on one another and electrically connected to each other. Likewise, the second wiring 132a may also have a continuous wiring structure. The pattern of the first wiring 122a may be identical to the pattern of the second wiring 132a. Or, a projection of the pattern of the first wiring 122a projected on the second substrate 14a may be partially overlapped with a projection of the pattern of the second wiring 132a projected on the second substrate 14a.

In some embodiments, the second conductive layer 131a and a second wiring 132a may be subjected to zoning processing to define at least two regions isolated from each other. The isolation manner may adopt a method of mechanically removing the material or removing the material by laser, and may also adopt a method of chemical etching. Of course, the first conductive layer 121a and the first wiring 122b may also be made to define at least two regions isolated from each other. It can be understood that, it is applicable that one of the first conductive layer 121a and the second conductive layer 131a satisfies the zoning design, and one of the first wiring 122a and the second wiring 132a a satisfies the zoning design and it is not required that both should satisfy the zoning design.

Likewise, a width of the second wiring 132a is less than or equal to 1.5 mm, for example, the width of the second wiring 132a may be about 1 mm, and the impedance is less than or equal to 5Ω. Since the material of the first wiring 122a and the second wiring 132a affects conductivity, and the widths thereof affect the impedance and volume, the above arrangements could balance requirements for both the color change rate of the electrochromic device 10 and miniaturization of the means, i.e., satisfy the miniaturized and thin design while increasing the color change rate.

Figure 23:
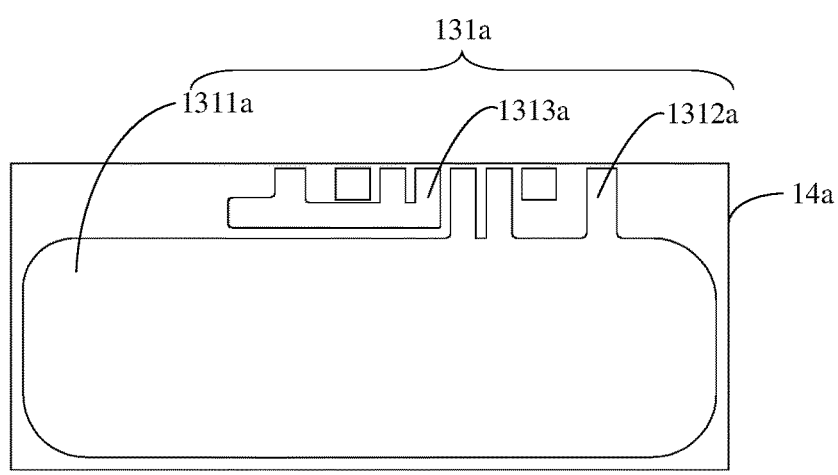
FIG. 23 is a schematic view of a second conductive layer shown in FIG. 9.

More specifically, at first, the second conductive layer 131a may be disposed or formed on the second substrate 14a. FIG. 23 is a schematic view of the second conductive layer 131a shown in FIG. 9. As shown in FIG. 23, the second conductive layer 131a may be disposed correspondingly to the first conductive layer 121a. In some embodiments, the second conductive layer 131a may include a second conductive region 1311a corresponding to the receiving space 16a, a second lead-out region 1312a configured to be bound to the FPC, and a third lead-out region 1313a configured to be bound to the FPC. In some embodiments, the first lead-out region 1212a, the second lead-out region 1312a, and the third lead-out region 1313a may be bound to the same FPC. However, in some embodiments, the first lead-out region 1212a, the second lead-out region 1312a, and the third lead-out region 1313a may be bound to different FPC. The second conductive region 1311a may be integrally connected to the second lead-out region 1312a. The second conductive region 1311a may be disposed adjacent to the third lead-out region 1313a and spaced apart from the third lead-out region 1313a. That is, the second conductive region 1311a does not communicate with the third lead-out region 1313a. The third lead-out region 1313a may be disposed corresponding to the first lead-out region 1212a. The material and the processing method of this operation may be similar to those recited in the block S1, and will not be repeated here.

Figure 24:
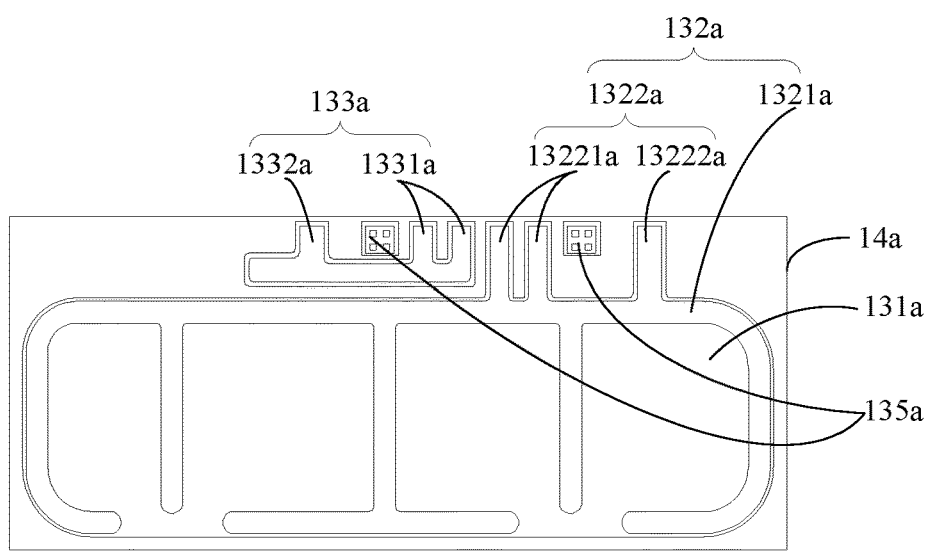
FIG. 24 is a schematic view of a second wiring shown in FIG. 9.

Furthermore, a second wiring 132a may be disposed or formed on the second conductive layer 131a. FIG. 24 is a schematic view of the second wiring 132a shown in FIG. 9. In some embodiments, as shown in FIG. 24, the second wiring 132a may include a second driving portion 1321a and a second lead-out portion 1322a. The second driving portion 1321a may be configured to surround or enclose the receiving space 16a. The second lead-out portion 1322a may be connected to a side of the second driving portion 1321a and configured as a connection terminal of the second conductive structure 13a. The electrochromic device further comprises a third wiring 133a. The third wiring 133a may be disposed on the second conductive layer 13a and spaced apart from the second driving portion 1321a of the second wiring 132a. The third wiring 133a may communicate with the first lead-out portion 1222a. The third wiring 133a and the first lead-out portion 1222a may be cooperatively configured as the connection terminal of the first conductive structure 12a. The material and the processing method of this operation may be similar to those recited in the block S1, and will not be repeated here.

In some embodiments, the second driving portion 1321a may be routed or arranged around a periphery of the second conductive region 1311a with an area as maximum as possible. The second driving portion 1321a may divide the second conductive region 1311a into four minimum unit regions. Besides, the second driving portion 1321a may be routed or arranged around a periphery of the minimum unit region, and the electric field should be ensured to be as uniform as possible, thereby increasing the respond speed of the electrochromic device 10a. The second driving portion 1321a may further define a second opening in a position in which a filling inlet 161a is defined. That is, the second driving portion 1321a may be disconnected at the filling inlet 161a. In this way, it is possible to reduce the risk of corrosion of the wiring which is caused by the electrochromic medium material contacting with the wiring pattern. In some embodiments, it is possible that only one of the first wiring 122a and the second wiring 132b is disconnected at the filling inlet 161a, or both are disconnected at the filling inlet 161a. For example, it is possible that, the first wiring 122a is disconnected while the second wiring 132a may also be closed. When the first wiring 122a and/or the second wiring 132b is disconnected at the filling inlet 161a, the sealing member may not need to cover the disconnected wiring. Such arrangement can save the material of the first wiring 122a and the second wiring 132a, and can prevent the electrochromic material from remaining on a face of the first wiring 122a or the second wiring 132a in the process of perfusion by the electrochromic material. In some embodiments, it is also possible that, the first wiring 122a and the second wiring 132b on the periphery of each of the electrochromic material units 16b are respectively closed. Such arrangement may simplify processing of the first wiring 122a and the second wiring 132b, and could prevent the electrochromic material from remaining on the first wiring 122a and the second wiring 132b in some manners. For example, it is applicable to coat or attach the face of the first wiring 122a or the second wiring 132b at the filling inlet 161a, with isolation material.

The second lead-out portion 1322a may be integrally connected to the second driving portion 1321a. The second lead-out portion 1322a may be arranged or routed around the second lead-out region 1312a with an area as maximum as possible. The second lead-out portion 1322a may include a first binding lead-out portion 13221a and a first testing lead-out portion 13222a. For reliable connection, at least two first binding lead-out portions 13221a may be provided. The first testing lead-out portion 13222a may be configured for detection or test.

In some embodiments, the third wiring 133a may be adjacent to the second driving portion 1321a and spaced from the second driving portion 1321a. The third wiring 133a may be arranged or routed around the third lead-out region 1312a with an area as maximum as possible. The third wiring 133a may include a second binding lead-out portion 1331a and a second testing lead-out portion 1332a. For reliable connection, at least two second binding lead-out portions 13231a may be provided. The second testing lead-out portion 1332a may be configured for detection or test.

Figure 25:
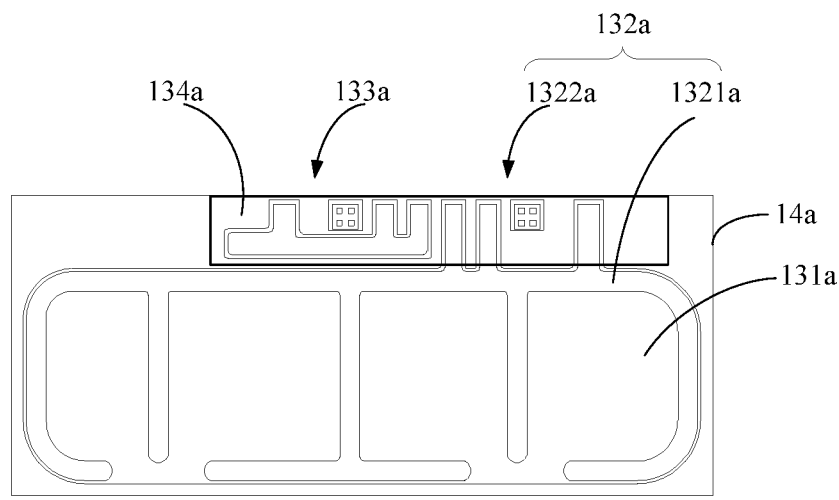
FIG. 25 is another schematic view of the second wiring shown in FIG. 9.

In some embodiments, the second wiring 132a may further include a mark identifier 135a. The mark identifier 135a may be arranged on the second substrate 14a and adjacent to the third wiring 133a and the second lead-out portion 1322a. The mark identifier 135a may be configured to facilitate subsequent connection. FIG. 25 is another schematic view of the second wiring 132a shown in FIG. 9. In some embodiments, as shown in FIG. 25, a surface of the third wiring 133a and a surface of the second lead-out portion 1322a may be both coated with protective glue 134a. The protective glue 134a may be UV glue. The protective glue 134a may be configured to protect the third wiring 133a and the second lead-out portion 1322a from being corroded.

At block S3, a frame 15 may be disposed on the first conductive structure 12a along the first wiring 122a. In some embodiments, the frame 15 may be disposed on the first conductive structure 12a by means of coating, and sealant may be coated on the first conductive structure 12a along the first wiring 122a to form the frame 15a.

Figure 26:
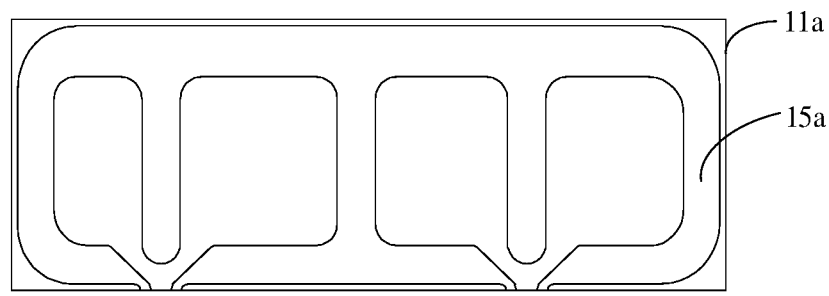
FIG. 26 is a schematic view of a frame shown in FIG. 9.

FIG. 26 is a schematic view of the frame 15a shown in FIG. 9. As shown in FIG. 26, in this block, the frame 15a may be disposed at one side of the first conductive structure 12a firstly, or may be disposed at one side of the second conductive structure 13a firstly. In some embodiments, the frame 15a may be disposed at one side of the first conductive structure 12a, and arranged to cover the first wiring 122a. In some embodiments, the frame 15a may completely cover the first wiring 122a (the first wiring 122a may be embedded in the frame 15a), thereby reducing the risk of the corrosion of the first wiring 122a and the electrochromic medium material caused by contacting with air. The frame 15a may define four receiving spaces 16a, and further define openings in positions in which the filling inlets 161a are reserved. The openings may have a width of 1-2 mm. In some embodiments, the frame 15a may have a width of 1.5-2.0 mm. Since a part of the frame 15a may be adhered to the first wiring 122a and the first wiring 122a may be adhered to the first conductive substrate 121a, a width of a portion of the frame 15a contacting with the first conductive substrate 121a may be greater than 1.0 mm in order to ensure the adhesion.

In order to improve the dispensing efficiency, a fluidity of the sealant may range from 30,000 mPa·s to 45,000 mPa·s. It is possible to use a pneumatic dispenser, which has a small deviation in accuracy. In addition, if a glue-spraying machine is used, since the supporting member of 0.5/0.1 mm is added, a nozzle with a diameter of at least 0.2 mm may be used in order to reduce the wear of the nozzle. For the frame having different thicknesses, the supporting member in different sizes may be added into the frame 15a. If a gap or the thickness of the frame is 0.05 mm, a support ball or a micro-bead having a diameter of 0.05 mm may be added. However, if the gap or the thickness of the frame has a width of 0.1 mm, a support ball or a micro-bead having a diameter of 0.1 mm may be added. In order to ensure the stability of the gap, a glass ball, a ball made of composite resin or other material may be used. However, when using the composite resin, a hardness of the composite material needs to be greater than 50% of that of the glass. A mass ratio of the supporting member and the glue may range from 0.2% to 1%.

At block S4, the second wiring 132a of the second conductive structure 13a may be aligned with and further adhered to the first wiring 122a of the first wiring structure to form at least two receiving spaces 16a.

Figure 27:
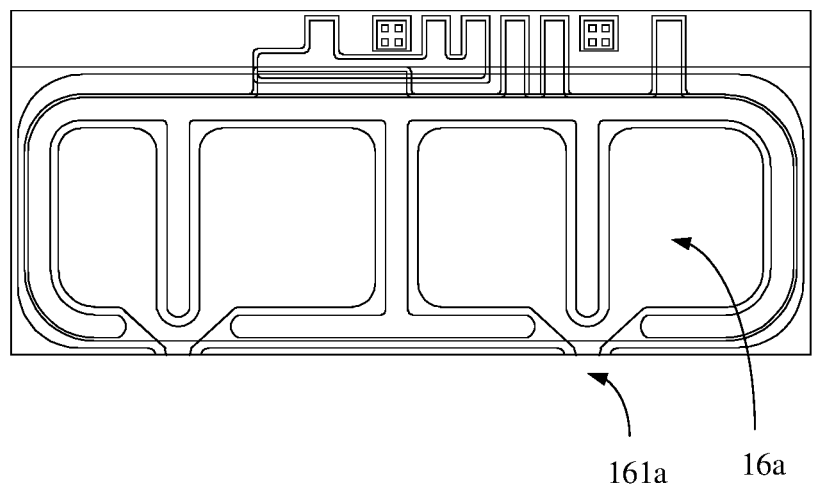
FIG. 27 is a structural view illustrating parts of components of the electrochromic device shown in FIG. 9.

FIG. 27 is a structural view illustrating parts of components of the electrochromic device 10a shown in FIG. 9. More specifically, as shown in FIG. 27, in some embodiments of the present disclosure, the frame 15a may define a plurality of filling inlets 161a. The plurality of filling inlets 161a have a one-to-one correspondence with the plurality of receiving spaces 16a. The electrochromic material may be filled into the receiving spaces 16a via the filling inlet 161a. The filling inlets 161a corresponding to the receiving spaces 16a may be defined separately or spaced apart from each other. However, it is also possible that, the filling inlets 161a corresponding to two adjacent receiving spaces 16a may be defined adjacent to each other. That is to say, two adjacent receiving spaces 16a may share one filling inlet 161a, or the filling inlets 161 corresponding to the two adjacent receiving spaces 16a communicate with each other. In some embodiments, the filling inlets 161a corresponding to two adjacent receiving spaces 16a may be defined adjacent to each other, thereby reducing the difficulty of packaging and improving the stability of the electrochromic device 10a.

In this operation, the components of the electrochromic device 10a may be grabbed and assembled by an automatic apparatus. In order to spread out the sealant (forming the frame 15a), a certain pressure may be utilized for pre-pressing, and baking may be performed with a preset pressure. In some embodiments, the "aligned with and adhered to" mentioned here means that a portion of the first wiring 122a having a shape identical or similar to a shape of a portion of the second wiring 132a may be disposed right opposite to or corresponding to the corresponding portion of the second wiring 132a.

More specifically, after the second wiring 132a of the second conductive structure 13a is aligned with and adhered to the first wiring 122a of the first wiring structure 12a, the first wiring 122a and the second wiring 132a may be both wrapped in the sealant. In this way, it is possible to reduce the risk of corrosion of the first wiring 122a and the second wiring 132a due to contacting with the electrochromic medium material or the air. In some embodiments, an outer edge of the first conductive layer 121a and an outer edge of the second conductive layer 131a may also need to be wrapped in the sealant, in order to reduce the risk that the first conductive layer 121a and the second conductive layer 131a contacting with impurities such as dust. The first conductive layer 121a and the second conductive layer 131a may be short-circuited and electrically connected to each other by using a lead-out wiring.

At block S5, an electrochromic medium material may be filled into the receiving spaces 16a.

In this block, the receiving spaces 16a may be vacuumized, and then the electrochromic medium material may be filled into the receiving space 16a via the corresponding filling inlets 161a.

In some embodiments, before the block S4, the method may further include the operations executed by the following blocks.

At block S31, a supporting spacer or supporting member 162a may be arranged in at least one of the receiving spaces 16a.

Figure 28:
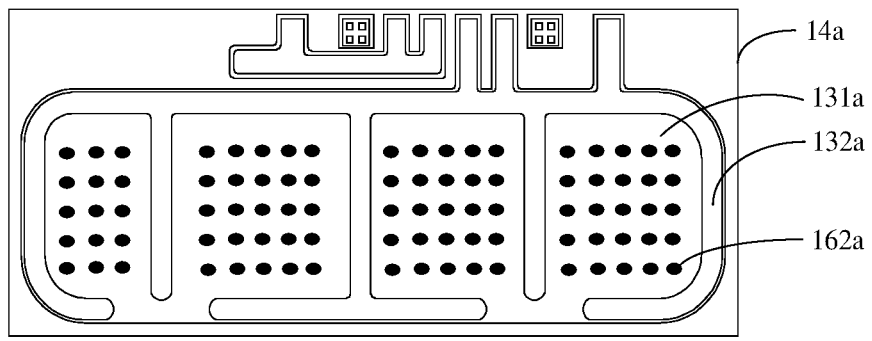
FIG. 28 is another schematic view of the second conductive layer shown in FIG. 9.

This block may specifically include the following operations: firstly a glue spot may be disposed or formed on the first conductive layer 121a or the second conductive layer 131a. More specifically, the glue spot may be formed at one side of the first wiring 122a or the second wiring 132a. In some embodiments, the glue spot may be formed on the second conductive layer 131a. In some embodiments, the glue spot may have a diameter of 0.03-0.05 mm. In some embodiments, at least two supporting spacers 162 may be disposed in the receiving space 16a, and at least two glue spots may be formed correspondingly. A distance between two adjacent glue spots may be 1-3 mm. In some embodiments, UV glue may be used for forming the glue spot. If the gap or distance of the frame is maintained at 0.05 mm, then a size of the UV glue spot may be 0.03 mm. However, if the gap or distance of the frame is maintained at 0.1 mm, the size of the glue spot may be 0.05 mm. For good printing performance, the fluidity of the UV glue for forming the glue spot may range from 5000 mPa·s to 1000 mPa·s. Then the supporting spacers 162a may be adhered on the glue spots, and further subjected to UV curing, so that the supporting spacers 162a are reliably fixed in the receiving space 161a, as shown in FIG. 28, FIG. 28 is another schematic view of the second conductive layer 131a shown in FIG. 9. In some embodiments of the present disclosure, the types of the supporting spacers 162a may not be limited. In some embodiments, the supporting spacer 162a may be implemented as a support micro-bead. In order to ensure that the supporting spacer 162a may have a certain compressibility, achieve a better hiding effect, and is not easy to find visually, the support micro-bead may be made of transparent composite material.

In some embodiments, before the block S5, the method may further include the operations executed by the following blocks.

At block S41, an encapsulant or encapsulating adhesive 17a may be coated between the first substrate 11a and the second substrate 14a and along edges of the first substrate 11a and the second substrate 14a. In some embodiments, the encapsulant 17a may cover a periphery of a side edge of the first conductive layer 121a and a periphery of a side edge of the second conductive layer 131a. As shown in FIG. 18, the encapsulant 17a may be configured to improve the reliability of the electrochromic device 10a.

In some embodiments, after the block S5, the method may further include the operations executed by the following blocks.

At block S51, all the filling inlets 161a may be blocked or sealed by sealing member, such as encapsulant.

Figure 29:
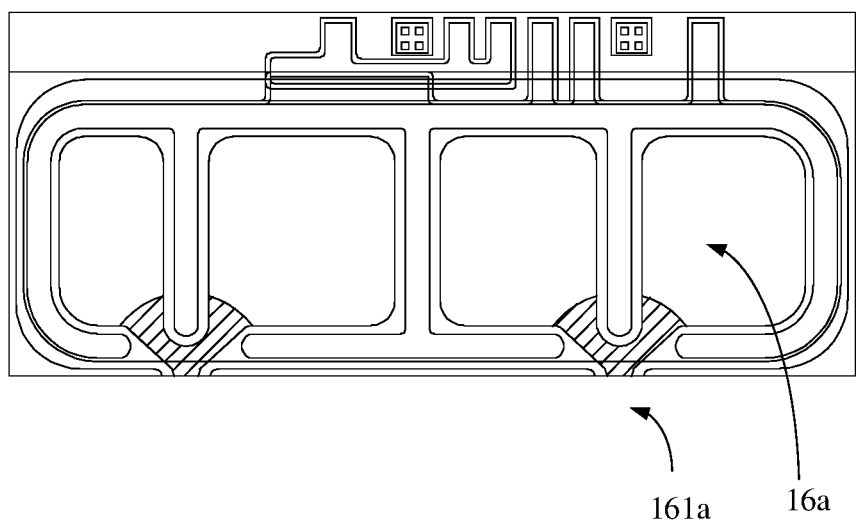
FIG. 29 is another schematic view of the electrochromic device shown in FIG. 9.

More specifically, FIG. 29 is another schematic view of the electrochromic device 10a shown in FIG. 9. As shown in FIG. 29, an encapsulating depth of the filling inlet 161a may be greater than 1.5 mm. The fluidity of the encapsulant (the UV glue) may range from 2000 mPa·s to 5000 mPa·s. The curing may be carried out at a radiation intensity of 200-400 mW/c$^{m2}$ for about 20 s.

In the above embodiments, the filling inlets 161a are defined for filling the electrochromic material. However, in some embodiments, the frame 15a may be integrally formed without the filing inlet 161a. In this embodiment, at least one of the first wiring 122a and the second wiring 132a on a periphery of each of the electrochromic material units 16b is closed. For example, the first wiring 122a or the second wiring 132a on the periphery of each of the electrochromic material units 16b may be closed, that is the pattern of the first wiring 122a or the second wiring 132a may have a closed-ring structure. Such arrangement can simplify processing of the first wiring 122a or the second wiring 132a. In this embodiment, the electrochromic device 10 can be made by using an ODF (One Drop Filling) process. For example, the electrochromic material may be dripped into the space formed by the first substrate 11a and the frame 15a, and thereafter, the first substrate 11a and the second substrate 14a may be bonded and cured, so that the spacer 162a supports the first substrate and the second substrate. This operation may also be accomplished in a vacuum environment.

It will be appreciated that, compared with the method for manufacturing the electrochromic device 10a shown in FIG. 9, in the method for manufacturing the electrochromic device 10a shown in FIG. 19, disposing the first conductive structure 12a on the first substrate 11a may include the following operations: disposing the first wiring 122a on the first substrate 11a, and disposing the first conductive layer 121a on the first wiring 122a. Disposing the second conductive structure 13a on the first substrate 11a may include the following operations: disposing the second wiring 132a on the second substrate 14a, and disposing the second conductive layer 131a on the second wiring 132a. Besides, in the operation of disposing the frame 15a on the first conductive structure 12a along the first wiring 122a may include: disposing the frame 15a on the first conductive layer 121a.

Figure 30:
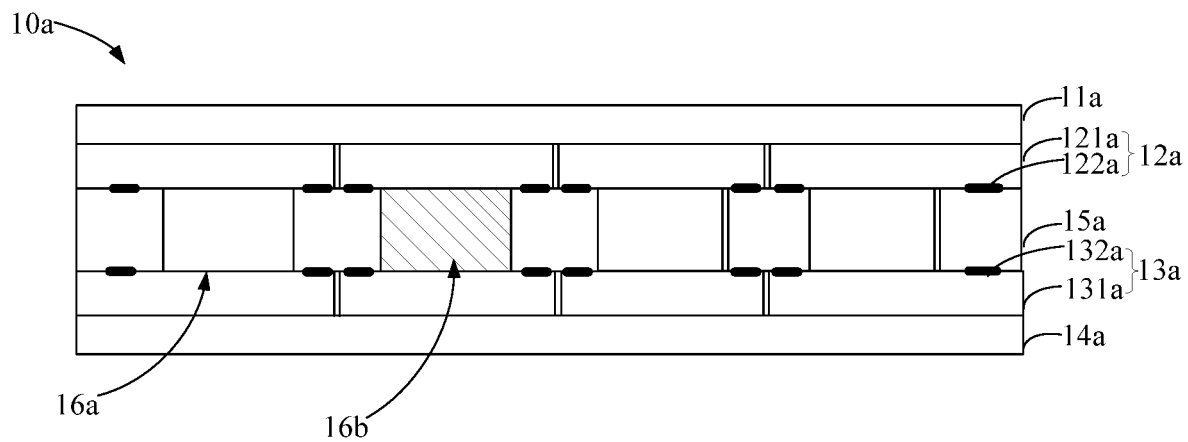
FIG. 30 is a further schematic structural view of an electrochromic device according to some embodiments of the present disclosure.

Next, the zoning control of the electrochromic device may be described in detail. FIG. 30 is a further schematic structural view of an electrochromic device 10a according to some embodiments of the present disclosure. As shown in FIG. 30, the electrochromic device 10a may include a first substrate 11a, a second substrate 14a, a frame 15a, and an electrochromic medium material. A plurality of first conductive structures 12a spaced apart from each other may be disposed on a same side surface of the first substrate 11a. Each of the plurality of first conductive structures 12a may include a first conductive layer 121a and a first wiring 122a which are stacked on one another and electrically connected to each other. In other words, the first conductive layer 121a may include a plurality of first conductive sub-layers 121b spaced apart or isolated from each other, and the first wiring 122a may include a plurality of first sub-wirings 122b. A plurality of second conductive structures 13a spaced from each other may be disposed on a same side surface of the second substrate 14a. Each of the plurality of second conductive structures 13a may include a second conductive layer 131a and a second wiring 132a which are stacked on one another and electrically connected to each other. In other words, the second conductive layer 131a may include a plurality of second conductive sub-layers 131b spaced apart or isolated from each other, and the second wiring 132a may include a plurality of second sub-wirings 132b. The frame 15a may be sandwiched between the plurality of first conductive structures 12a and the plurality of second conductive structures 13a. A projection of a pattern of the frame 15a on the first substrate 11a or the second substrate 14a, a projection of a pattern of the first wiring 122a on the first substrate 11a or the second substrate 14a, and a projection of a pattern of the second wiring 132a on the first substrate 11a or the second substrate 14a may be at least partially overlapped with each other. The first conductive structure 12a (the first conductive sub-layer 121b and the first sub-wiring 122b) and the second conductive structure 13a (the second conductive sub-layer 131b and the second sub-wiring 132b) may be disposed opposite to each other. The first conductive structure 12a, the second conductive structure 13a, and the frame 15a cooperatively define a plurality of receiving spaces 16a. The electrochromic material in the plurality of receiving spaces 16a may be independently driven and controlled by the corresponding conductive structures. It should be noted that, in the description of some embodiments of the present disclosure, the term "a plurality of" means two or more, such as two, three, and the like, unless specified otherwise.

The electrochromic medium material may be dispersedly disposed in the plurality of receiving spaces 16a and forming a plurality of electrochromic material units 16b spaced apart from each other. The plurality of electrochromic material units 16b may have a one-to-one correspondence with the plurality of receiving spaces 16a, that is, each of the electrochromic material units 16b may be disposed in a corresponding receiving space 16a. In some embodiments, the plurality of receiving spaces 16a are arranged along a direction perpendicular to an stacking direction of the first conductive layer 121a, the frame 15a, and the second conductive layer 131a; the plurality of receiving spaces 16a may be isolated by a part of the frame 15a. In FIG. 30, only one electrochromic material unit 16b is shown for description, however, it should be noted that, each of the receiving spaces 16a are filled with the electrochromic material unit 16b.

Each of the plurality of electrochromic material units 16b may be independently switchable between the colored state and the transparent state when driven by an external voltage or when driven by an internal controlling member. The plurality of first conductive sub-layers 121b may have a one-to-one correspondence with the plurality of electrochromic material units 16b. The plurality of second conductive sub-layers 131b may have a one-to-one correspondence with the plurality of electrochromic material units 16b. The plurality of first conductive sub-layers 121b or the second conductive sub-layers 131b may be configured to independently control the plurality of electrochromic material units 16b to switch between the colored state and the transparent state.

Of course, in some embodiments, the plurality of first conductive sub-layers 121b may not be isolated from each other, or the plurality of second conductive sub-layers 131b may not be isolated from each other. That is to say, one of the first conductive sub-layers 121b and the second conductive sub-layers 131b may be an integral, and it is applicable to conduct zoning control of the other of the first conductive sub-layers 121b and the second conductive sub-layers 131b.

Figure 54:
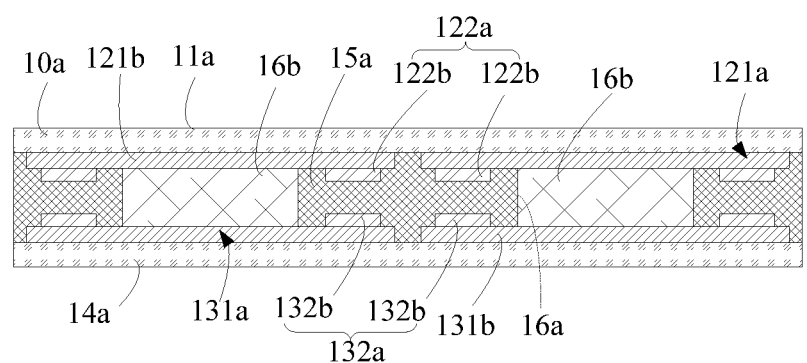
FIG. 54 is a cross-sectional view of an electrochromic device according to some embodiments of the present disclosure.

In some embodiments, as further shown in FIG. 54, the frame 15a may cover edges of the first conductive sub-layers 121b and the second conductive sub-layers 131b. Specifically, for one first conductive sub-layer 121b, the circumferential edge thereof is covered by the frame 15a. For two first conductive sub-layers 121b isolated from each other, the circumferential edge of each of the two first conductive sub-layers 121b may be covered by the frame 15a. It is a similar case for the manner of configuring the edges of the second conductive sub-layers 131b to be covered, which is not repeated herein. Such arrangement may prevent the first conductive sub-layers 121b and the second conductive sub-layers 131b from being exposed to contact foreign matter like an ash, or water vapor, etc., thereby preventing the first conductive sub-layers 121b and the second conductive sub-layers 131b from being conducting with each other and causing a short circuit.

As further shown in FIG. 54, each first wiring 122a is disposed between the first conductive sub-layers 121b and the frame 15a, and the frame 15a covers the first wiring 122a. The second wiring 132a is disposed between the second conductive sub-layers 131b and the frame 15a, and the frame 15a covers the second wiring 132a. A periphery of opposite sides of each of the electrochromic material units 16b is provided with the first wiring 122a and the second wiring 132a respectively. That is, the first wiring 122a may be provided on a periphery of a side of each of the electrochromic material units 16b, and the second wiring 132a may be provided on a periphery of an opposite side of each of the electrochromic material units 16b. The first wiring 122a and the second wiring 132a are configured to lead control lines out to be further electrically connected to the circuit board of the electronic apparatus, so that the electronic apparatus can apply voltage on the two opposite sides of the electrochromic material units 16b through the first wiring 122a and the first conductive sub-layers 121b, and the second wiring 132a and the second conductive sub-layers 131b, thereby to switch the electrochromic material units 16b between a transparent state and a colored state.

Furthermore, the plurality of first sub-wirings 122b may have one-to-one correspondence with the electrochromic material units 16b, and the first sub-wirings 122b may be isolated from each other. The plurality of second sub-wirings 132b have a one-to-one correspondence with the electrochromic material units 16b, and the second sub-wirings 132b may be isolated from each other. For example, when the number of the first sub-wirings 122b is two, and the number of the second sub-wirings 132b is two, the two electrochromic material units 16b configured to be controlled independently may respectively correspond to two first sub-wirings 122b, and the two first sub-wirings 122b are isolated from each other. In some embodiments, the two electrochromic material units 16b configured to be controlled independently may respectively correspond to the two second sub-wirings 132b, and the two second sub-wirings 132b are isolated from each other. Specifically, in case that two electrochromic material units 16b are included, the two first sub-wirings 122b corresponding to the two electrochromic material units 16b may be isolated from each other, and the two second sub-wirings 132b corresponding to the two electrochromic material units 16b may be isolated from each other. It can be understood that, the second sub-wirings 132b corresponding to the two electrochromic material units 16b may also not be isolated, that is, the second sub-wirings 132b may be an integral, and it is applicable to conduct zoning control of the first sub-wirings 122b. In some other embodiments, the second sub-wirings 132b corresponding to the two electrochromic material units 16b are isolated from each other, and the first sub-wirings 122b corresponding to the two electrochromic material units 16b may be isolated or non-isolated, which can likewise achieve separate control of the two electrochromic material units 16b. Furthermore, on a side of the electrochromic material unit 16b, two first conductive sub-layers 121b and two first sub-wirings 122b corresponding respectively to the two electrochromic material units 16b each controllable independently are isolated from each other. Alternatively, on the other side of the electrochromic material unit 16b, two second conductive sub-layers 131b and two second sub-wirings 132b corresponding respectively to the two electrochromic material units 16b each controllable independently are isolated from each other. That is, on the two opposite sides of the electrochromic material unit 16b for loading voltage, the sub-wirings and the conductive sub-layers on any side being zoned simultaneously could make it possible to achieve zoning control of the electrochromic material units 16b; and the sub-wirings and the conductive sub-layers on the other side could be zoned or not be zoned. When the number of electrochromic material units 16b each controllable independently is three or more, it is possible to make design with reference to the above arrangement method, which is not repeated herein.

With the design of the first wiring pattern 12a and the second wiring pattern 13a of the electrochromic device 10a, the electrochromic material in each receiving space 16a of the electrochromic device 10a may be controlled independently. As shown in FIG. 30, in some embodiments of the present disclosure, the first conductive structure 12a may include four first conductive sub-structures. Each first conductive sub-structure may include a first conductive sub-layer and a first sub-wiring, respectively. The second conductive structure 13a may include four second conductive sub-structures. Each second conductive sub-structure may include a second conductive sub-layer and a second sub-wiring, respectively. Four receiving spaces 16a may be defined. Each of the receiving spaces 16a may be isolated from each other. Each pair of conductive sub-structures may be independently driven and controlled. For example, when the electrochromic device 10a has four receiving spaces 16a, it is possible to control the electrochromic medium material in one of the receiving spaces 16a to be in the transparent state, and control the electrochromic medium material in the other three receiving spaces 16a to be in the colored state. It is also possible to control the electrochromic medium material in any two of the receiving spaces 16a to be in the transparent state, and control the electrochromic medium material in the remaining two of the receiving spaces 16a to be in the colored state. It should be noted that, the above only lists several control methods of the electrochromic device 10a. In some embodiments of the present disclosure, the number of the receiving spaces 16a and the control method of each of the receiving spaces will not be limited.

In the following, some embodiments of the present disclosure will be described in junction with the usage scenarios. A mobile phone may be taken as an example. The mobile phone may have four optical devices. The four optical devices may include three cameras and a flash. The flash and the cameras may be used at different frequencies and have different requirements for the light transmittances and the transmission speeds. Each of the cameras and the flash may be disposed corresponding to one receiving space 16a. For example, assuming that the user only needs to use the flash, the user may control the region corresponding to the flash to be in the transparent state, and the regions corresponding to the remaining three cameras to be in the colored state. For another example, when the user takes pictures in a scene with strong light, only two cameras need to be turned on, thus, it is possible to control the regions corresponding to the two cameras (which need to be turned on) to be in the transparent state, and to control the regions corresponding to the remaining camera and the flash to be in the colored state. The zoning control may enable different regions of the electrochromic device 10a to be controlled independently, which further improves the user experience.

Figure 31:
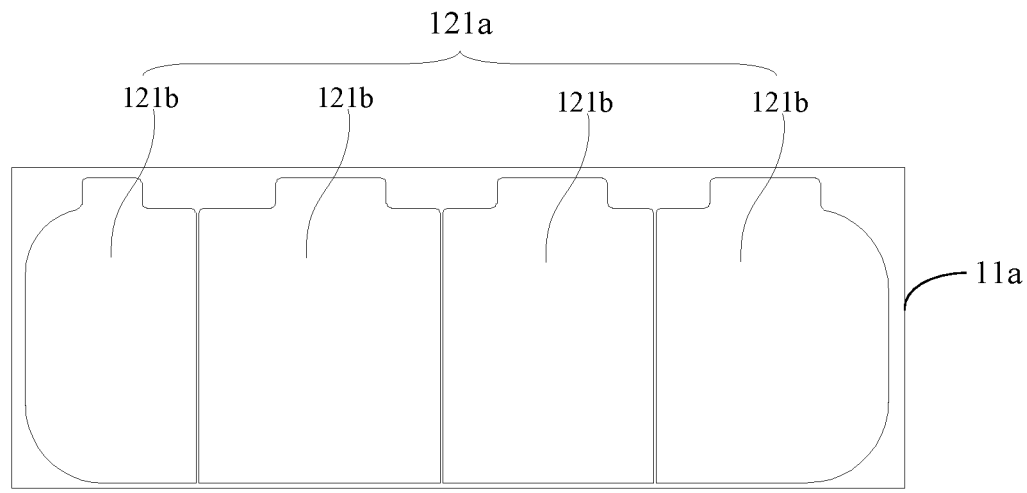
FIG. 31 is a schematic view of a first conductive layer shown in FIG. 30.
Figure 32:
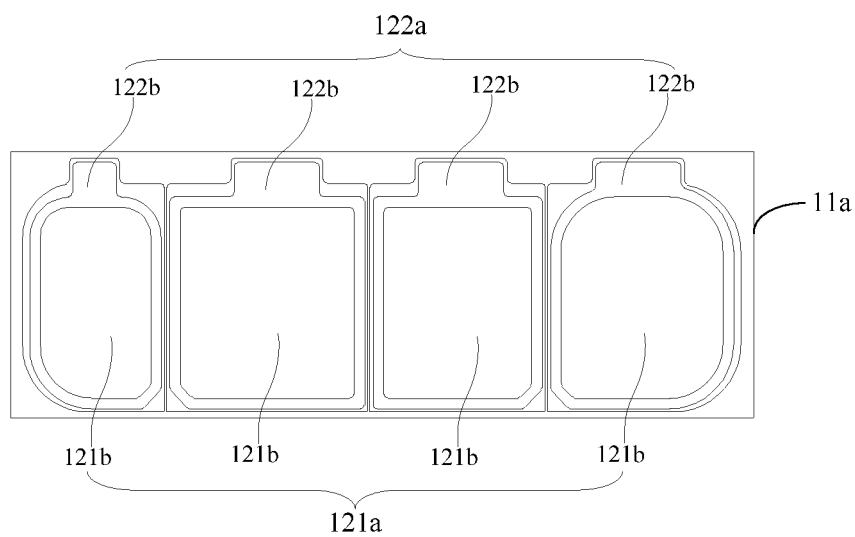
FIG. 32 is a schematic view of a first wiring shown in FIG. 30.

With respect to the specific shape of the first conductive structure 12a, please refer to FIGS. 31 and 32. FIG. 31 is a schematic view of the first conductive layer 121a shown in FIG. 30, and FIG. 32 is a schematic view of the first wiring 122a shown in FIG. 30. The first conductive layers 121a may be spaced apart from each other. The first wirings 122a may be arranged or routed around the periphery of the first conductive region 1211a with an area as large as possible.

Figure 33:
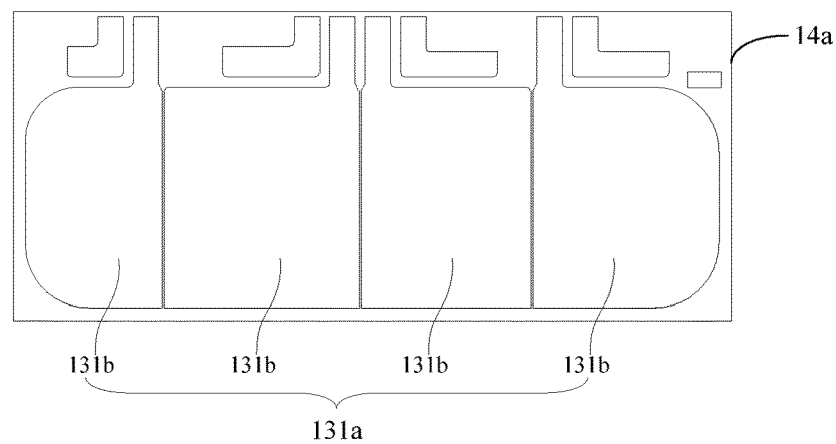
FIG. 33 is a schematic view of a second conductive layer shown in FIG. 30.
Figure 34:
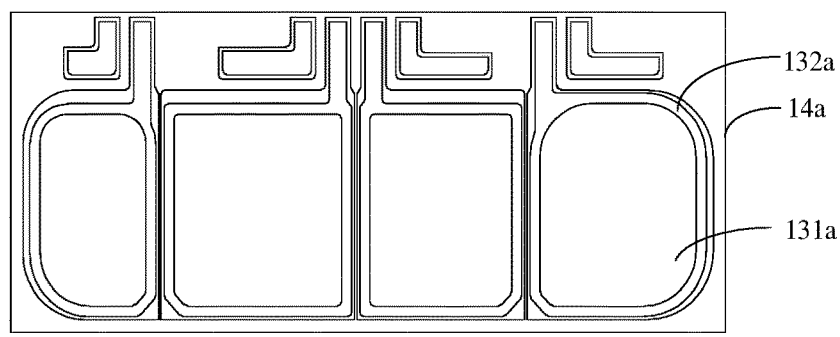
FIG. 34 is a schematic view of a second wiring shown in FIG. 30.

With respect to the specific shape of the second conductive structure 13a, please refer to FIGS. 33 and 34. FIG. 33 is a schematic view of the second conductive layer 131a shown in FIG. 30, and FIG. 34 is a schematic view of the second wiring 132a shown in FIG. 30. The second conductive layers 131a may be spaced apart from each other. The second wirings 132a may be arranged or routed around the periphery of the second conductive region 1311a with an area as large as possible.

Figure 35:
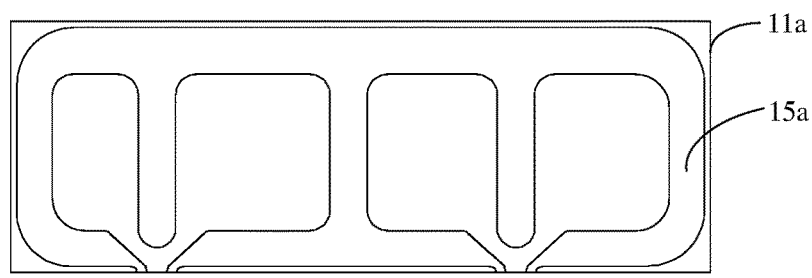
FIG. 35 is a schematic view of a frame shown in FIG. 30.

With respect to the specific shape of the frame 15a, please refer to FIG. 35. FIG. 35 is a schematic view of the frame 15a shown in FIG. 30. The frame 15a may be an integrated frame 15a. Or, the frame 15a may include a plurality of sub-frames disposed separately from each other. In some embodiments of the present disclosure, the frame 15a may be the integrated frame 15a. It should be noted that, when the receiving spaces 16a of the electrochromic device 10a are spaced apart from each other with a large distance, the frame 15a may include a plurality of sub-frames 15a disposed separately from each other. Each sub-frame, the corresponding first conductive structure 12a and the corresponding second conductive structure 13a may cooperatively define a receiving space 16a.

It should be noted that, the solutions of the response speed of the electrochromic device, the light transmittance of the electrochromic device in the transparent state, the wiring design of the electrochromic device, and the zoning control of the electrochromic device described above may be combined with each other as required. In addition, in the above embodiments, two arrangement ways of the conductive structures are provided. One arrangement way is to arrange an integrated first conductive structure (the first conductive layer and the first wiring are continuous structures) and an integrated second conductive structure (the second conductive layer and the second wiring are also continuous structures). With this arrangement, it is possible to simultaneously control the plurality of electrochromic material units, the wirings may enclose to form the electrochromic material unit of a small area, and thus it is possible to achieve fast response. Another arrangement way is to design a plurality of independent conductive sub-structures between two substrates (each conductive sub-structure may enclose an electrochromic material unit). Each conductive sub-structure may be controlled independently. Thus, the plurality of electrochromic material units may be controlled independently. It should be noted that, in some other embodiments, each conductive sub-structure may also enclose a plurality of electrochromic material units. The detailed structural features of this part are similar to those of the previous embodiments, and will not be described in detail here.

Figure 36:
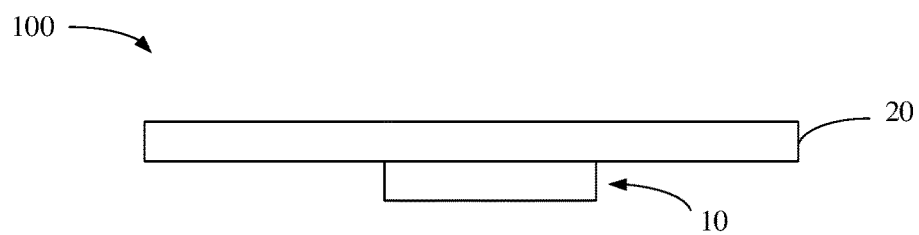
FIG. 36 is a schematic structural view of a housing assembly according to some embodiments of the present disclosure.
Figure 37:
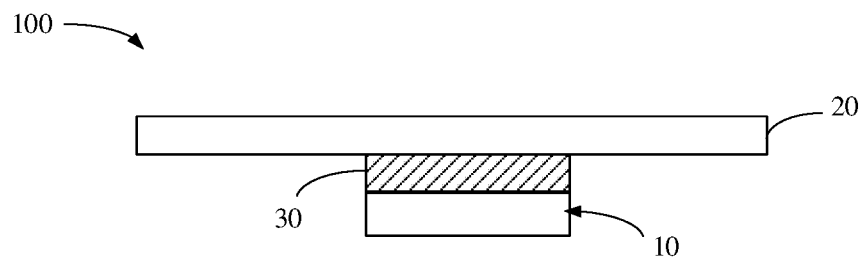
FIG. 37 is another schematic structural view of a housing assembly according to some embodiments of the present disclosure.
Figure 38:
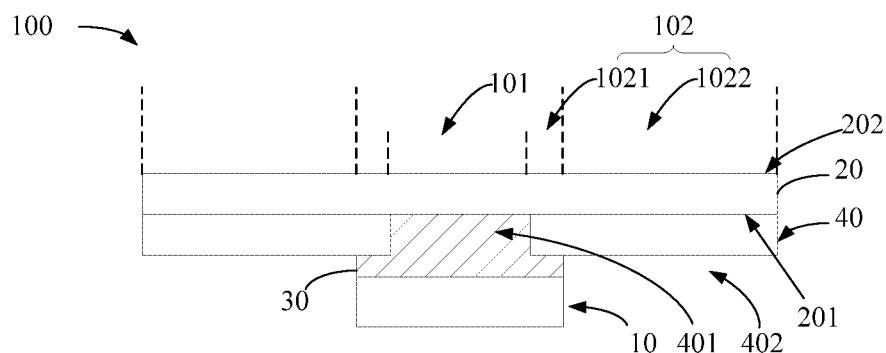
FIG. 38 is yet another schematic structural view of a housing assembly according to some embodiments of the present disclosure.
Figure 39:
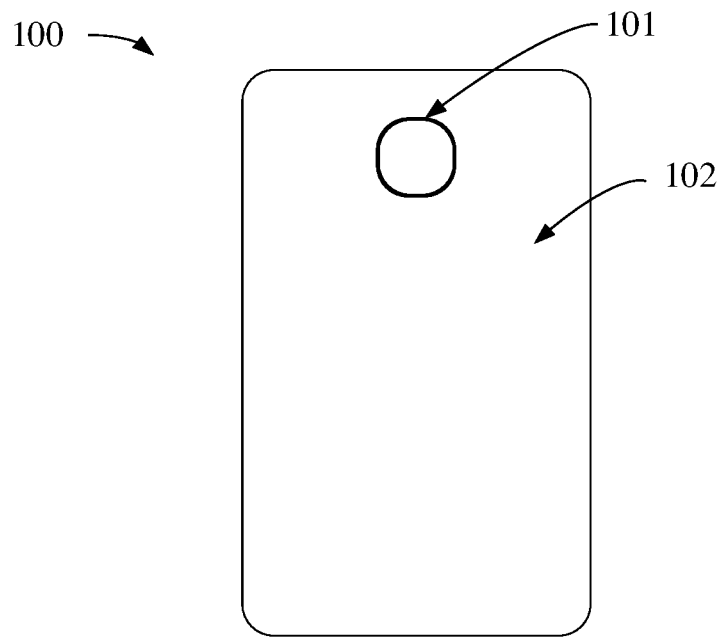
FIG. 39 is a top view of the housing assembly shown in FIG. 38.

Finally, the design of a structure of the housing of the electronic apparatus may be described in detail. FIG. 36 is a schematic structural view of a housing assembly 100 according to some embodiments of the present disclosure. As shown in FIG. 36, in some embodiments of the present disclosure, a housing assembly 100 may be further provided. The housing assembly 100 may include a cover plate 20 and an electrochromic device 10 attached to the cover plate 20. The electrochromic device may be any electrochromic device (including the electrochromic device 10 and the electrochromic device 10a) as previously described. For the convenience of description, in the following, the electrochromic device 10 will be used as an example. More specifically, the cover plate 20 may be a transparent glass plate or a plastic plate. The electrochromic device 10 may be attached to a portion of the cover plate 20. In some embodiments, the cover plate 20 may be adhered to the electrochromic device 10 via an optical adhesive 30, as shown in FIG. 37, wherein FIG. 37 is another schematic structural view of the housing assembly 100 according to some embodiments of the present disclosure. The optical adhesive 30 may not only provide an adhesion, but also provide a buffer. The optical adhesive 30 may be further configured to reduce the risk of damaging the electrochromic device 10 due to the dropping of the electrochromic device 10. The optical adhesive 30 may be implemented as an optical clear resin (OCR, also called as liquid optical adhesive) 30. The adhesive of this type may have a high light transmittance, a low water vapor light transmittance, and a low ion concentration. In some embodiments, the first substrate 11 or the second substrate 14 of the electrochromic device 10 may be attached to the cover plate 20. FIG. 38 is yet another schematic structural view of a housing assembly 100 according to some embodiments of the present disclosure. FIG. 39 is a top view of the housing assembly 100 shown in FIG. 38. As shown in FIGS. 38 and 39, in some embodiments of the present disclosure, another housing assembly 100 may be further provided. The housing assembly 100 may include an appearance-affecting film layer 40 sandwiched between the cover plate 20 and the electrochromic device 10. The appearance-affecting film layer 40 may be visible from the outer side of the electronic apparatus, and may affect the appearance of the electronic apparatus.

The cover plate 20 may include a visible region 101 (also called as light-transmission region) and an invisible region 102. The visible region 101 may be configured for light transmission of an optical device. The cover plate 20 may further have an inner face 201 and an outer face 202 opposite to the inner face 201. The inner face 201 may be closer to the optical device than the outer face 202. The electrochromic device 10 may be attached to the inner face 201 of the cover plate, disposed corresponding to the visible region 101, and further cover the visible region 101. The invisible region 102 may further include a wiring region 1021 and a non-wiring region 1022. The wiring region 1021 may be configured to arrange wirings. The visible region 101 may be located in the invisible region 102, that is to say, the visible region 101 may be surrounded by the invisible region 102. The wiring region 1021 may be arranged around the visible region 101. The visible region 101 may be shielded by the electrochromic device 10 when the plurality of electrochromic material units 16b (shown in FIG. 30) are in the colored state, and may be visible via the electrochromic device 16b when the plurality of electrochromic material units 16b are in the transparent state.

Figure 40:
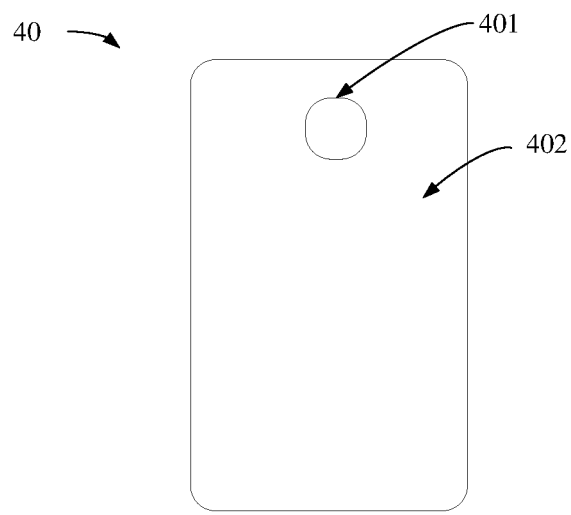
FIG. 40 is a top view of an appearance-affecting film layer shown in FIG. 38.

FIG. 40 is a top view of the appearance-affecting film layer 40 shown in FIG. 38. As shown in FIG. 40, the appearance-affecting film layer 40 may further include a transparent region 401 and a colored region 402. The transparent region 401 may be disposed corresponding to the visible region 101. The colored region 402 may be disposed corresponding to the invisible region 102. In some embodiments, the electrochromic device 10 may be disposed corresponding to the transparent region 401. In some embodiments of the present disclosure, a shape of the transparent region 401 may not be specifically limited. For example, the transparent region 401 may be in shape of a square or a circle.

Figure 41:
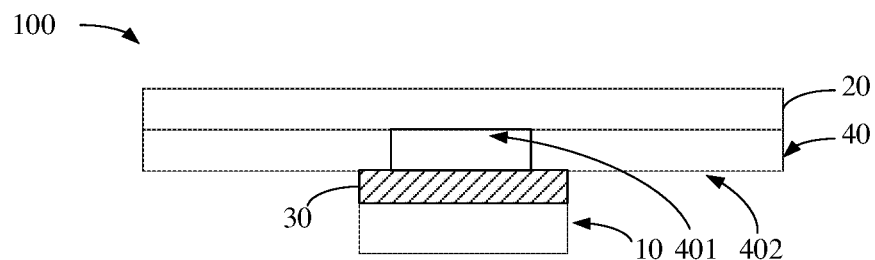
FIG. 41 is a further schematic structural view of a housing assembly according to some embodiments of the present disclosure.

As further shown in FIG. 38, in some embodiments, the transparent region 401 may be implemented as a through hole, and the electrochromic device 10 may cover the through hole 401. Furthermore, the optical adhesive 30 may be filled into the through hole 401, and the electrochromic device 10 may be adhered to the appearance-affecting film layer 40 via the optical adhesive 30. In some embodiments, however, the electrochromic device 10 may also be received in the through hole 401, as long as the electrochromic device 10 may cover the corresponding optical devices. FIG. 41 is a further schematic structural view of a housing assembly 100 according to some embodiments of the present disclosure. It may be understood that, the transparent region 401 may also be a transparent region with a substrate, and the appearance-affecting film layer 40 may be adhered to the electrochromic device 10 via the optical adhesive 30, as shown in FIG. 41. The optical adhesive 30 may not only provide an adhesion, but also provide a buffer. The optical adhesive 30 may be further configured to reduce the risk of damaging the electrochromic device 10 due to the dropping of the electrochromic device 10. The optical adhesive 30 may be implemented as an optical clear resin (OCR) 30. The adhesive of this type may have a high light transmittance, a low water vapor light transmittance, and a low ion concentration.

Figure 42:
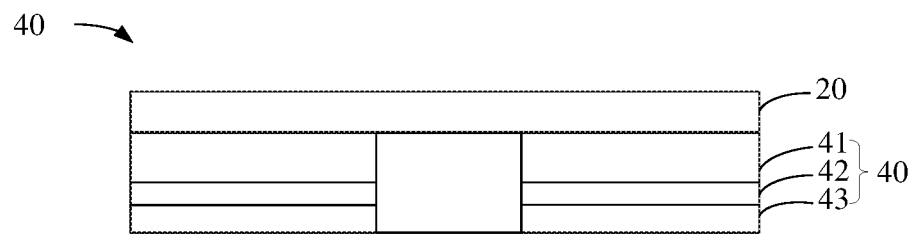
FIG. 42 is a schematic structural view of the appearance-affecting film layer shown in FIG. 38.
Figure 43:
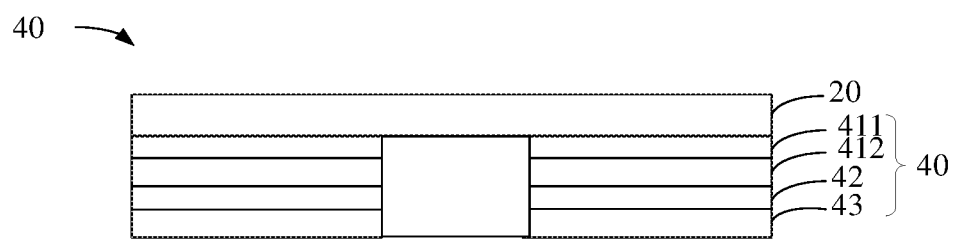
FIG. 43 is a schematic structural view of the appearance-affecting film layer shown in FIG. 38.

FIG. 42 is a schematic structural view of the appearance-affecting film layer 40 shown in FIG. 38. In some embodiments, as shown in FIG. 42, the appearance-affecting film layer 40 may include a plurality of coating film layers laminated on the cover plate 20. For example, the appearance-affecting film layer 40 may include an optical coating layer 41, an ink layer 42, and an anti-explosion film layer 43 that are stacked on the cover plate 20. In some embodiments, the optical coating layer 41 may include at least one of one or more anti-reflection film layers having optical anti-reflection effect, a UV pattern transfer layer for forming a specific optical texture, a resin film layer having a protective effect, a non-conductive vacuum metalizing (NCVM) layer having an insulating effect, and a functional film layer for increasing a connection between layers; these layers may be formed by a physical vapor deposition method. The ink layer 42 (also called as a decorative layer) may be formed by spraying or dyeing. The anti-explosion layer 43 may be configured to block glass fragments generated by the breakage of the cover plate 20 due to accidental breakage. FIG. 43 is a schematic structural view of the appearance-affecting film layer 40 shown in FIG. 38. In some embodiments, as shown in FIG. 43, the optical coating layer 41 may include an NCVM layer 411 having an insulation function and a resin film layer 412 having a protection function. In some embodiments, the NCVM layer 411 may be a film layer with a metallic appearance without affecting the wireless communication transmission effect because of a mutually-discontinuous characteristic, which is obtained by a through a manner of plating a metal thin film, an insulating compound thin film and the like. The anti-explosion layer 43 may be made by OC0 (an anti-shattering process by spraying resin liquid) process.

Figure 44:
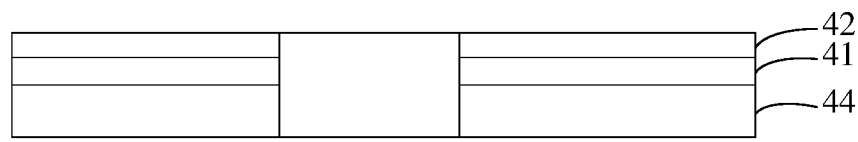
FIG. 44 is a schematic structural view of the appearance-affecting film layer shown in FIG. 38.

FIG. 44 is a schematic structural view of the appearance-affecting film layer 40 shown in FIG. 38. In some embodiments, as shown in FIG. 44, the appearance-affecting film layer 40 may be an independent appearance-affecting film. The appearance-affecting film may include a bearing plate 44 and at least one of an ink layer 42 and an optical coating layer 41 laminated on the bearing plate 44. In some embodiments, the appearance-affecting film may include the bearing plate 44, the optical coating layer 41, and the ink layer 42.

The bearing plate 44 may be made of glass or a transparent resin material having certain hardness. The optical coating layer 41 may include at least one of one or more anti-reflection film layers having optical anti-reflection effect, a UV pattern transfer layer for forming a specific optical texture, a resin film having a protective effect, a non-conductive vacuum metalizing (NCVM) layer having an insulating effect, and a functional film layer for increasing a connection between layers; these layers may be formed by the physical vapor deposition method. The ink layer 42 may be formed by spraying or dyeing.

Figure 45:
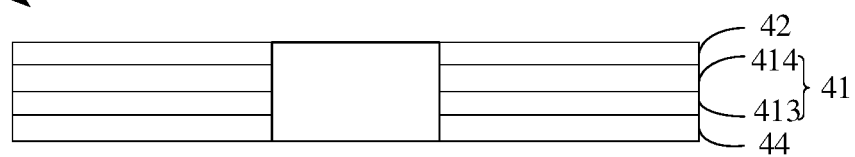
FIG. 45 is a schematic structural view of the appearance-affecting film layer shown in FIG. 38.

FIG. 45 is a schematic structural view of the appearance-affecting film layer 40 shown in FIG. 38. As shown in FIG. 45, the appearance-affecting film layer may include a bearing plate 44, a UV transfer layer 413, an optical film layer 414, and an ink layer 42. The UV transfer layer 413, the optical film layer 414, and the ink layer 42 may be successively disposed on the bearing plate 44.

Figure 46:
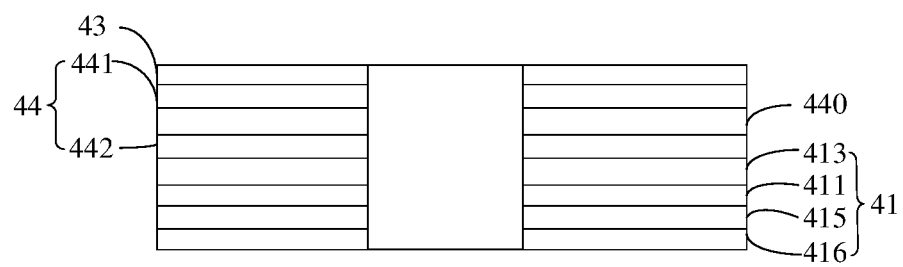
FIG. 46 is a schematic structural view of the appearance-affecting film layer shown in FIG. 38.

Furthermore, FIG. 46 is a schematic structural view of the appearance-affecting film layer 40 shown in FIG. 38. As shown in FIG. 46, the appearance-affecting film layer may include a pair of supporting plates 44 (a first supporting plate 441 and a second supporting plate 442). More specifically, the first bearing plate 441 may be adhered to the second bearing plate 442 via an adhesive layer 440. In some embodiments, an ink layer 42 may be disposed at one side of the first bearing plate 441 that is away from the second bearing plate 442. A UV transfer layer 413, an NCVM layer 411 (the NCVM layer 411 may be configured to form a special optical effect, and made of metal or alloy, and the like), a gradient color layer 415 (which may be formed by inkjet printing), and a varnish protective layer 416 may be successively stacked at one side of the second bearing plate 442 that is away from the first bearing plate 441.

Compared with FIG. 45, the appearance-affecting film layer in FIG. 46 includes the first bearing plate 441 and the second bearing plate 442, and further adds different layers having different appearance effects on the two bearing plates. In this way, the appearance-affecting film layer may exhibit a rich appearance, for example, the appearance-affecting film layer may exhibit a gradient appearance, may display different colors when viewed from different sides, and the like. Besides, the influence of the manufacturing processes between different functional layers may be further reduced.

It should be noted that, in the figures of some embodiment of the present disclosure, only the laminated structure of the appearance-affecting film layers are disclosed. However, in some other modified embodiments, the appearance-affecting film layer may include only the optical coating layer 41 disposed on the bearing plate 44. It is also possible that the appearance-affecting film layer 40 may include only the ink layer 42 disposed on the bearing plate 44, or the ink layer 42 may be disposed between the optical coating layer 41 and the bearing plate 44. It is also possible that, the ink layer 42 and the optical coating layer 41 are disposed at two opposite sides of the bearing plate 44. In some embodiments, the optical coating layer 41 may further include other optical functional layers and the like.

Figure 47:
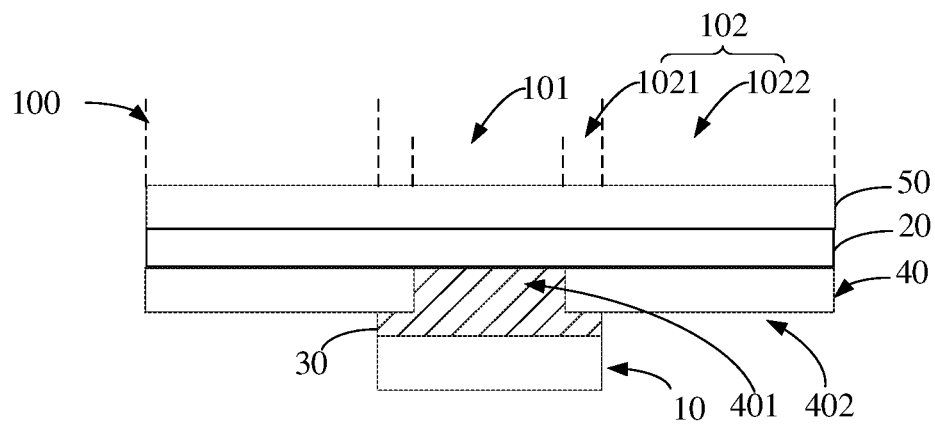
FIG. 47 is a further schematic structural view of a housing assembly according to some embodiments of the present disclosure.

FIG. 47 is a further schematic structural view of a housing assembly 100 according to some embodiments of the present disclosure. Compared with the housing assembly 100 in FIG. 38, the housing assembly 100 in FIG. 47 may further include an anti-fingerprint film 50. The anti-fingerprint film 50 may be disposed at one side of the cover plate 20 facing away from the appearance-affecting film layer 40. The anti-fingerprint film 50 may be configured to dilute and decompose the visibility of fingerprint grease and configured for anti-fingerprint by utilizing the process characteristics of the anti-fingerprint film 50. In some embodiments of the present disclosure, the specific type of the anti-fingerprint film may not be limited. For example, the anti-fingerprint film 50 may be a matte anti-fingerprint protective film and a high-light transmittance AF anti-fingerprint protective film.

Figure 48:
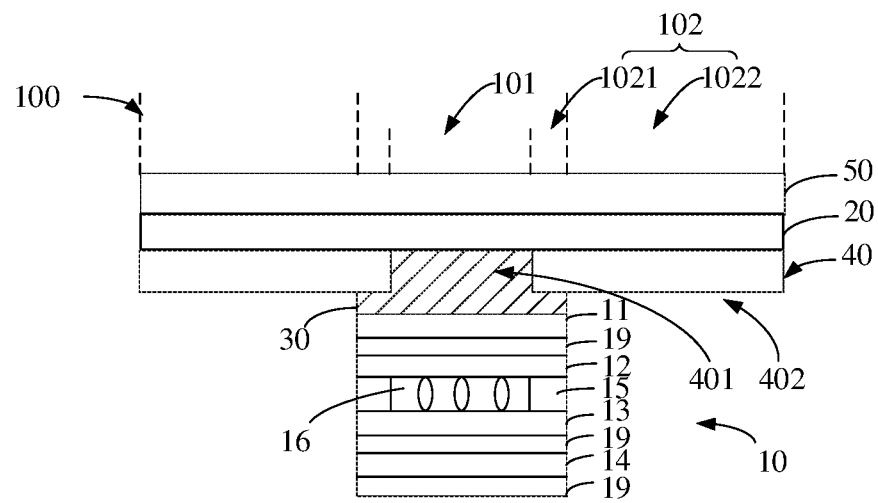
FIG. 48 is a further schematic structural view of a housing assembly according to some embodiments of the present disclosure.

FIG. 48 is a further schematic structural view of a housing assembly 100 according to some embodiments of the present disclosure. As shown in FIG. 48, the housing assembly may include a cover plate 20, an appearance-affecting film layer 40, and an electrochromic device 10 which are successively stacked on one another. The appearance-affecting film layer 40 may define a through hole 401. The electrochromic device 10 may be arranged to cover the through hole 401. Furthermore, an optical adhesive 30 may be filled into the through hole 401. The electrochromic device 10 may be adhered the appearance-affecting film layer 40 via the optical adhesive 30. Of course, in some embodiments, the electrochromic device 10 may also be received in the through hole 401, as long as the electrochromic device 10 may cover the corresponding optical devices.

In some embodiments, the appearance-affecting film layer 40 may be an independent appearance-affecting film layer. The specific structure of the appearance-affecting film layer has been described in detail previously, and will not be repeated here. The electrochromic device 10 may include a first substrate 11, a first anti-reflection film 19a, a first conductive layer 12, a second conductive layer 13, a second anti-reflection film 19b, a second substrate 14, and a third anti-reflection film 19c which are successively stacked on one another. The electrochromic device 10 may further include a frame 15. The frame 15 may be sandwiched between the first conductive layer 12 and the second conductive layer 13. The frame 15, the first conductive layer 12, and the second conductive layer 13 may cooperatively define a receiving space 16. Electrochromic medium material may be filled into receiving space 16.

More details of the housing assembly in FIG. 48 may be shown in the following table.

| Layers | Requirements | Thickness | Refractive index |
| --- | --- | --- | --- |
| Anti-fingerprint film 50 | | | 1.48-1.52 |
| Cover plate 20 | Toughened glass | | 1.48-1.52 |
| Appearance-affecting film layer 40 | Appearance-affecting membrane | 0.1-0.2 mm | / |
| Optical adhesive 30 | Having a light transmittance greater than 99%, and made of adhesive material having a refractive index comparable to that of the glass | 20-100 μm | 1.48-1.52 |
| First substrate 11 | Made of alkali-free glass forming the TFT (thin film transistor) | 0.15 mm | 1.48-1.52 |
| First anti-reflection film 19 | Including a plurality of niobium oxide layers and a plurality of silicon oxide layer stacked on one another | 300 nm | 1.69 in average |
| First conductive layer 12 | Having a resistance of 10-15 ohms | 150 nm | 1.9-2.3 |
| Electrochromic medium material | Having a refractive index similar to that of ITO | 50 μm | 1.425 |
| Second anti-reflection film 19 | Including a plurality of niobium oxide layers and a plurality of silicon oxide layer stacked on one another | 300 nm | 1.69 in average |
| Second substrate 14 | Made of alkali-free glass forming the TFT (thin film transistor) | 0.15 mm | 1.48-1.52 |
| Third anti-reflection film 19 | Including a plurality of niobium oxide layers and a plurality of silicon oxide layer stacked on one another | 300 nm | 1.23 in average |

Figure 49:
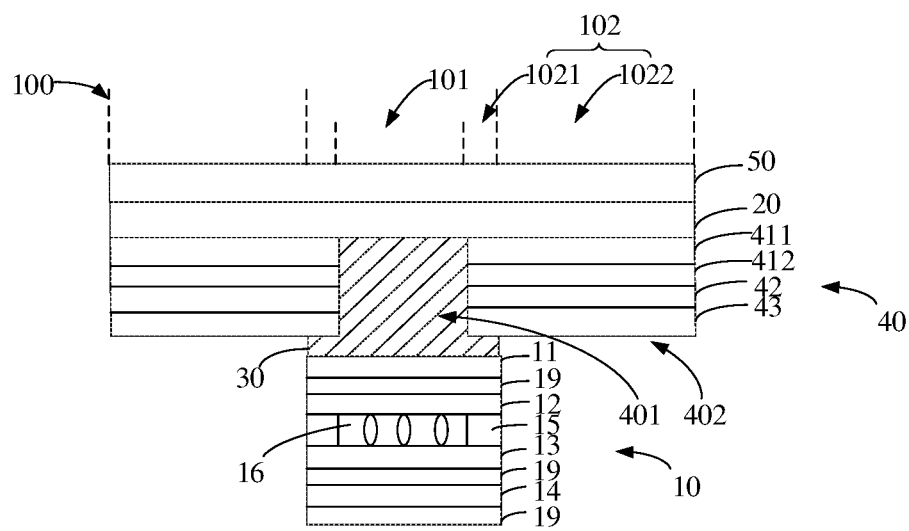
FIG. 49 is a further schematic structural view of a housing assembly according to some embodiments of the present disclosure.

FIG. 49 is a further schematic structural view of a housing assembly according to some embodiments of the present disclosure. As shown in FIG. 49, compared with the housing assembly shown in FIG. 48, in the housing assembly shown in FIG. 49, the appearance-affecting film layer may include a plurality of coating film layers laminated or stacked on the cover plate 20. More details of the housing assembly in FIG. 49 may be shown in the following table.

film layer 40, and the electrochromic device 10 that are successively stacked on one another. The appearance-affecting film layer 40 may define a through hole 401. The electrochromic device 10 may be arranged to cover the through hole 401. The electrochromic device 10 may be disposed between the optical device 200 and the appearance-affecting film layer 40, and disposed corresponding to the through hole 401 and further cover the through hole 401.

| Layers | Parameters | Thickness | Refractive index |
|---|---|---|---|
| Anti-fingerprint film 50 | | | 1.48-1.52 |
| Cover plate 20 | Toughened glass | | 1.48-1.52 |
| NCVM layer 411 having an insulation function | | 20-100 nm | / |
| Resin film layer 412 having a protection function | Solving the low reliablity of the coating layer on the glass, and may be implemented as an OC0 (an anti-shattering process by spraying resin liquid) film layer | 1-5 μm | / |
| Ink layer 42 | Primer printing layer cooperating with the NVCM | 10-20 μm | / |
| Anti-explosion film layer 43 | Preventing the glass fragments from piercing the battery | 50-100 μm | / |
| Optical adhesive 30 | Having a light transmittance over 99%, and made of adhesive material having a refractive index comparable to that of the glass | 20-100 μm | 1.48-1.52 |
| First substrate 11 | Made of alkali-free glass forming the TFT (thin film transistor) | 0.15 mm | 1.48-1.52 |
| First anti-reflection film 19 | Including a plurality of niobium oxide layers and a plurality of silicon oxide layer stacked on one another | 300 nm | 1.69 in average |
| First conductive layer 12 | Having a resistance of 10-15 ohms | 150 nm | 1.9-2.3 |
| Electrochromic medium material | Having a refractive index similar to that of ITO | 50 μm | 1.425 |
| Second anti-reflection film 19 | Specific number of layers is not limited | 300 nm | 1.69 in average |
| Second substrate 14 | Made of alkali-free glass forming the TFT (thin film transistor) | 0.15 mm | 1.48-1.52 |
| Third anti-reflection film 19 | Including a plurality of niobium oxide layers and a plurality of silicon oxide layer stacked on one another | 300 nm | 1.23 in average |

As further shown in FIG. 49, the optical adhesive 30 may extend to a face of the anti-explosion film layer 43, and the electrochromic device 10 is entirely located on a side of the anti-explosion film layer 43. However, such arrangement is not necessary. For example, a volume of the through hole 401 may be larger. After the optical adhesive 30 is provided within the through hole 401, at least a part of the first substrate 11 may be accommodated within the through hole 401. Such arrangement could reduce a thickness of the housing assembly 100, thereby improving the light transmittance of the light-transmissive region.

Figure 50:
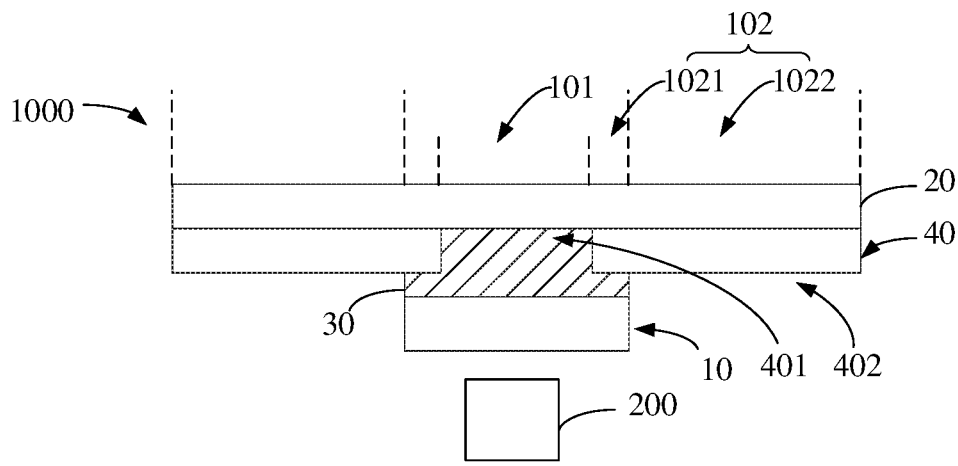
FIG. 50 is a schematic structural view of an electronic apparatus according to some embodiments of the present disclosure.

FIG. 50 is a schematic structural view of an electronic apparatus 1000 according to some embodiments of the present disclosure. In some embodiments of the present disclosure, an electronic apparatus 1000 may be further provided. As shown in FIG. 50, the electronic apparatus 1000 may include an optical device 200 and the housing assembly 100 described above. The electrochromic device 10 may be disposed between the optical device 200 and the cover plate 20. The electrochromic device 10 may be configured to shield the optical device 200 from one side of the cover plate 20. It should be noted that, in some embodiments of the present disclosure, the electronic apparatus 1000 may be the electronic apparatus 1000 including a mobile phone, a tablet computer, a laptop, a wearable electronic apparatus, and the like.

As shown in FIG. 50, the housing assembly 100 may further include the cover plate 20, the appearance-affecting The electrochromic device 10 may be configured to block (also called as disable or shield) or enable light transmission of a light path between the optical device 200 and the through hole 401. Furthermore, an optical adhesive 30 may be filled in the through hole 401. The electrochromic device 10 may be adhered to the appearance-affecting film layer 40 via the optical adhesive 30. More details of the housing assembly 100 have been described in detail in the foregoing, and will not be repeated here.

The optical device 200 may include at least one of a camera, a flash, and an optical sensor. More specifically, the optical device 200 and the optical adhesive 30 may be respectively disposed on two opposite sides of the electrochromic device 10, and may be disposed corresponding to the through hole 401.

The optical device 200 may have two working states, that is, a turning-on state and a turning-off state. When the optical device 200 is in the turning-on state, the electrochromic device 10 is switched to the transparent state to facilitate the light transmitting through the electrochromic device, and the optical device 200 may perform its function. When the optical device 200 is in the turning-off state, the electrochromic device 10 is switched to the colored state, such that the optical device 200 may be shielded. In this way, the electronic apparatus 1000 may exhibit an integrated appearance.

During the use of the electronic apparatus 1000, when the optical device 200 is in the turning-on state, the electrochromic device 10 is switched to the transparent state. In this case, the electrochromic device 10 may have a high light transmittance in the transparent state, such that the light may smoothly pass through the electrochromic device 10, and the optical device 200 may better realize its function. When the optical device 200 is in the turning-off state, the electrochromic device 10 is switched to the colored state. Besides, the electrochromic device 10 may have a low light transmittance in the colored state, which may better block the optical device 200. In this way, the electronic apparatus 1000 may exhibit an integrated appearance. When the optical device 200 is switched from the turning-on state to the turning-off state or from the turning-off state to the turning-on state, the electrochromic device 10 may be quickly switched between the transparent state and the colored state.

Figure 51:
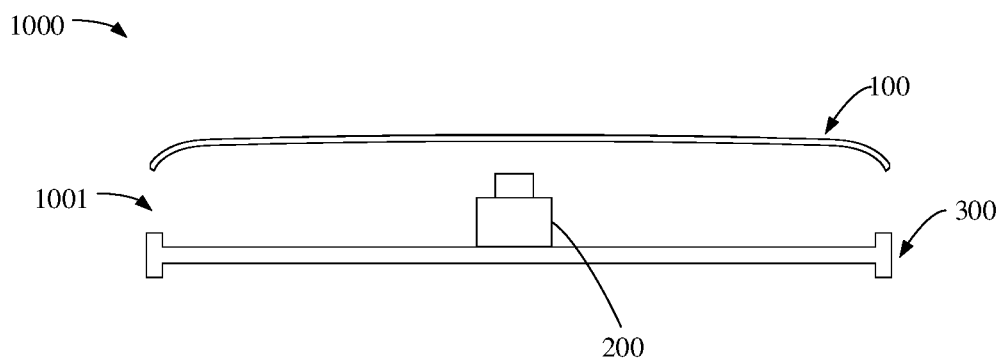
FIG. 51 is another schematic structural view of an electronic apparatus according to some embodiments of the present disclosure.

FIG. 51 is another schematic structural view of an electronic apparatus 1000 according to some embodiments of the present disclosure. Compared with the electronic apparatus shown in FIG. 50, the electronic apparatus 1000 in FIG. 51 may further include a shell 300. The housing assembly 100 may be the rear cover 100 of the electronic apparatus. The optical device 200 may be a rear camera 200 of the electronic apparatus.

As shown in FIG. 50 and FIG. 51, the electronic apparatus 1000 may include the shell 300, the rear camera 200, and the rear cover 100. The rear cover 100 may be connected to the shell 300. The rear cover 100 may include the cover plate 20, the appearance-affecting film layer 40, and the electrochromic device 10 successively stacked on one another. The first substrate 11 of the electrochromic device 10 may be connected to the cover plate 20, and the second substrate 11 may be disposed at one side of the first substrate 11 facing away from the cover plate 20. For example, the first substrate 11 may be adhered to the cover plate 20 by an optical adhesive 30. In this manner, the electrochromic device 10 could be made into a module with high versatility, to facilitate assembly of the electrochromic device 10 and the cover plate 20. The appearance-affecting film layer 40 may define a through hole 401. The electrochromic device 10 may be arranged to cover the through hole 401. The electrochromic device 10 may be disposed between the rear camera 200 and the appearance-affecting film layer 40, and disposed corresponding to the through hole 401 and further cover the through hole 401. The electrochromic device 10 may be configured to block the optical path between the rear camera 200 and the through hole 401.

In some embodiments, the cover plate (such as a cover plate having a portion of the cover plate corresponding to the electrochromic device 10 is transparent) made of metal material including aluminum alloy, magnesium alloy, stainless steel, or the like, may be used. The cover plate may also be made of non-metal material such as glass, ceramic, plastic, or the like.

In some embodiments, the electrochromic material units are provided in a region of the cover plate 20 corresponding to the optical device. Other region of the cover plate 20 may not need to be provided with the electrochromic material units, and may be may be colored with ink, or decorated in other manners.

Furthermore, in some embodiments, the cover plate 20 may be used as a rear cover and may be made of metal material, an outer face of the cover plate 20 may be subjected to several face treatment processes including anodic oxidation and electroplating, so that an outer face of the cover plate 20 made of metal material takes on a required color. When the cover plate 20 is made of metal material or non-metal material with a relatively low light transmittance, the cover plate 20 defines a light-transmissive hole used as a light-transmissive region or visible region 101, for light exit or entrance of the optical device. In some other embodiments, the cover plate 20 is made of glass or other material with a high light transmittance, and does not need to define a light-transmissive hole for light exit or entrance of the optical device.

The shell 300 may be a component such as a middle frame, a bearing plate, or a front cover of the electronic apparatus 1000. The rear camera 200 may be located in an enclosed space 1001 (also called as "mounting space") defined by the rear cover 100 and the shell 300. The rear camera 200 may capture images through the rear cover 100.

The rear camera 200 may have two working states, that is, the turning-on state and the turning-off state. When the rear camera 200 is in the turning-on state, the electrochromic device 10 is switched to the transparent state, such that the rear camera 200 may capture images. When the rear camera 200 in the turning-off state, the electrochromic device 10 is switched to the colored state, such that the optical device 200 may be shielded. In this way, the electronic apparatus 1000 may exhibit an integrated appearance.

During the use of the electronic apparatus 1000, when the rear camera 200 is in the turning-on state, the electrochromic device 10 is switched to the transparent state. In this case, the electrochromic device 10 may have a high light transmittance in the transparent state, such that the light may smoothly pass through the electrochromic device 10, and the rear camera 200 is able to capture a clearer image. When the rear camera 200 is in the turning-off state, the electrochromic device 10 is switched to the colored state. Besides, the electrochromic device 10 may have a low light transmittance in the colored state, which may better block the rear camera 200. In this way, the electronic apparatus 1000 may exhibit an integrated appearance. When the rear camera 200 is switched from the turning-on state to the turning-off state or from the turning-off state to the turning-on state, the electrochromic device 10 may be quickly switched between the transparent state and the colored state.

In the above embodiments shown in FIGS. 50-51, the electrochromic device 10 is disposed outside the through hole 401. However, it is also possible that at least a portion of the electrochromic device 10 is disposed inside the through hole 401. For example, in some embodiments, the cover plate 20 may be also used as the first substrate 11. That is, when the electrochromic device 10 is processed, an area of the first substrate 11 can be made larger than that of the second substrate 14, and the first substrate 11 is used as the cover plate 20. Such arrangement is beneficial to reduce a thickness of the cover plate 20 and the electrochromic device 10 after being assembled, so as to facilitate a lightweight and thin design of the electronic apparatus 1000. The first substrate 11 used as the cover plate 20 is configured to cover the battery, so that the first substrate 11 and the shell 300 define mounting space.

Figure 52:
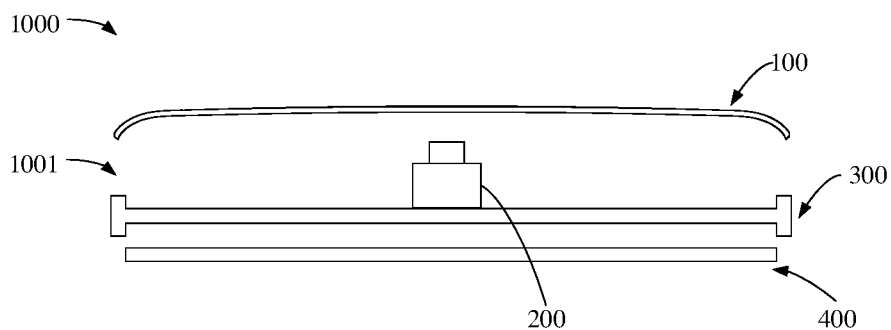
FIG. 52 is a further schematic structural view of an electronic apparatus according to some embodiments of the present disclosure.

FIG. 52 is a further schematic structural view of an electronic apparatus 1000 according to some embodiments of the present disclosure. Compared with the electronic apparatus shown in FIG. 50, the electronic apparatus 1000 in FIG. 52 may further include a shell 300 and a screen 400. The housing assembly 100 may be the rear cover 100 of the electronic apparatus. The optical device 200 may be a camera 200 of the electronic apparatus.

As shown in FIG. 50 and FIG. 52, the electronic apparatus 1000 may include the shell 300, the screen 400, the rear cover 100, and the camera 200. The screen 400 and the rear cover 100 may be connected to opposite sides of the shell 300, respectively. The rear cover 100 may include the cover plate 20, the appearance-affecting film layer 40, and the electrochromic device 10 stacked on one another. The appearance-affecting film layer 40 may define a through hole 401. The electrochromic device 10 may be arranged to cover the through hole 401. The electrochromic device 10 may be disposed between the camera 200 and the appearance-affecting film layer 40, and disposed corresponding to the through hole 401. The electrochromic device 10 may be configured to block the optical path between the camera 200 and the through hole 401.

In some embodiments, the shell 300 may be a component such as a middle frame, a bearing plate, or a front cover of the electronic apparatus 1000, and may be made of aluminum alloy, stainless steel, or the like. The screen 400 and the rear cover 100 may be respectively connected to two opposite sides of the shell 300. The camera 200 may be located in an enclosed space 101 defined by the rear cover 100 and the shell 300. The rear camera 200 may capture images through the rear cover 100.

During the use of the electronic apparatus 1000, when the camera 200 is in the turning-on state, the electrochromic device 10 is switched to the transparent state. In this case, the electrochromic device 10 may have a high light transmittance in the transparent state, such that the light may smoothly pass through the electrochromic device 10, and the camera 200 may capture a clearer image. When the camera 200 is in the turning-off state, the electrochromic device 10 is switched to the colored state. Besides, the electrochromic device 10 may have a low light transmittance in the colored state, which may better block the camera 200. In this way, the electronic apparatus 1000 may exhibit an integrated appearance. When the camera 200 is switched from the turning-on state to the turning-off state or from the turning-off state to the turning-on state, the electrochromic device 10 may be quickly switched between the transparent state and the colored state.

As further shown in FIG. 50, the housing assembly 100 may be the rear cover 100 of the electronic apparatus, and the optical device 200 may be the camera 200 of the electronic apparatus. The electronic apparatus 1000 may include the rear cover 100 and the camera 200. The rear cover 100 may include the cover plate 20, the appearance-affecting film layer 40, and the electrochromic device 10 stacked on one another. The appearance-affecting film layer 40 may define a through hole 401. The electrochromic device 10 may be arranged to cover the through hole 401. The electrochromic device 10 may be disposed between the camera 200 and the appearance-affecting film layer 40, and disposed corresponding to the through hole 401. The electrochromic device 10 may be switched between a first state and a second state, such that the camera 200 may acquire optical signals via the rear cover 100. In some embodiments, the first state is a non-transparent state or a semi-transparent state (also called as translucent state), and the second state is the transparent state.

The camera 200 may have two working states, that is, the turning-on state and the turning-off state. When the camera 200 is in the turning-on state, the electrochromic device 10 is switched to the second state (the transparent state), such that the camera 200 may acquire images. When the camera 200 is in the turning-off state, the electrochromic device 10 is switched to the first State (the colored state), such that the optical device 200 may be shielded. In this way, the electronic apparatus 1000 may exhibit an integrated appearance.

During the use of the electronic apparatus 1000, when the camera 200 is in the turning-on state, the electrochromic device 10 is switched to in the second state. In this case, the electrochromic device 10 may have a high light transmittance in the second state, such that the light may smoothly pass through the electrochromic device 10, and the camera 200 may capture a clearer image. When the camera 200 is in the turning-off state, the electrochromic device 10 is switched to the first state. In this case, the electrochromic device 10 may have a low light transmittance in the first state, which may better block the camera 200. In this way, the electronic apparatus 1000 may exhibit an integrated appearance. When the is camera 200 switched from the turning-on state to the turning-off state or from the turning-off state to the turning-on state, the electrochromic device 10 may be quickly switched between the first state and the second state.

Figure 53:
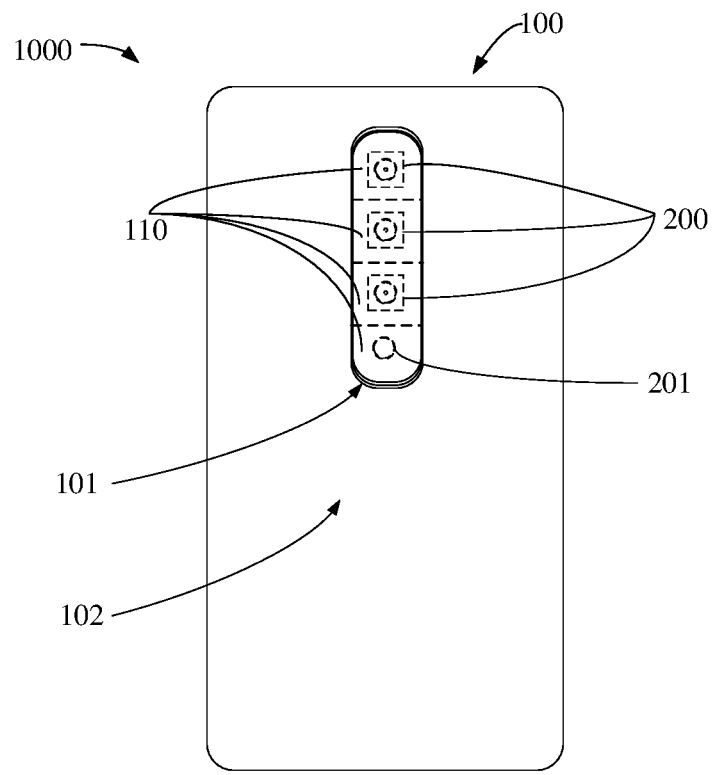
FIG. 53 is a top view of the electronic apparatus shown in FIG. 50.

FIG. 53 is a top view of the electronic apparatus shown in FIG. 50. As shown in FIG. 53, in some embodiments, the electrochromic device 10 may include a plurality of color-changing control regions 110 which are independently controlled. The electronic apparatus 1000 may further include a flash 201. The camera 200 and the flash 201 may be respectively disposed corresponding to different color-changing control regions 110.

Taking FIG. 53 as an example for description, the electrochromic device 10 may include four color-changing control regions 110 (each color-changing control region 110 corresponds to one receiving space) controlled independently from each other. The electronic apparatus 1000 may have three cameras 200 (for example, a conventional camera, a wide-angle camera, and a telephoto camera) and one flash 202. Each camera 200 and the flash 202 may be respectively disposed corresponding to one color-changing control region 110. It may be understood that, the number of the color-changing control regions 110 included in the electrochromic device may not be limited in some embodiments of the present disclosure. The number of the color-changing control regions 110 may be two, three, five, six, and the like.

The electronic apparatus 1000 may independently control each of the cameras 200 and the flash 202 to be in a blocked state (the corresponding color-changing control region 110 is in the colored state) or in an exposed state (the corresponding color-changing control region 110 is in the transparent state).

For example, when the cameras 200 are in the turning-off state and the flash 201 is in the turning-on state, the color-changing control regions 110 corresponding to the cameras 200 may be controlled to be in the colored state, such that the cameras 200 may be blocked. Meanwhile, the color-changing control region 110 corresponding to the flash 201 may be controlled to be in the transparent state, such that light emitted by the flash 201 may be emitted out through the rear cover 100. When one of the cameras 200 and the flash 201 are in the turning-on state and the remaining two of the cameras 200 in the turning-on state, the color-changing control regions 110 corresponding to the camera 200 which is turned on and the flash 201 may be controlled to be in the transparent state, such that the camera 200 which is turned on and the flash 201 may cooperate with each other to capture images via the rear cover 100. Meanwhile, the color-changing control regions 110 corresponding to the cameras 200 which are turned off may be controlled to be in the colored state, such that the cameras 200 which are turned off may be blocked.

In the embodiments shown in FIGS. 51-52, the housing assembly 100 is the rear cover, the shell 300 is the front cover, and the optical device 200 is a rear camera. However, in some other embodiments, the housing assembly 100 may be the front cover, the shell 300 may be the rear cover, and the optical device 200 may be a front camera. When the housing assembly 100 is the rear cover, the cover plate 20.

Furthermore, in some embodiments, the electronic apparatus 1000 may further include a processor and a battery. The battery may power the elecrochomic device 10 through a circuit board, and the processor may control the elecrochomic device 10. For example, the processor may control magnitude of electric current flowing through the elecrochomic device 10 and magnitude and phase of voltage loaded on the elecrochomic device 10, and other parameters, so that the elecrochomic device 10 can switch between a colored state and a transparent state. For example, in some embodiments, the elecrochomic device 10 is in the colored state when it is in a power-off state. When a user needs to use the optical device, a controller may control the control circuit of the elecrochomic device 10 to be in a power-on state, so as to switch the elecrochomic device 10 to the transparent state, so that the user may perform corresponding operations through the optical device.

In some embodiments, after the user's operations are completed, the controller may disconnect the control circuit of the elecrochomic device 10, so that the electrochomic device 10 gradually changes to the colored state. In some embodiments, after the user's operations are completed, the controller can load the elecrochomic device 10 with an instantaneous reverse voltage through the control circuit, so as to switch the control circuit to a short-circuit state, so that the elecrochomic device 10 can quickly switch to the colored state. Specifically, in an embodiment, a duration of the reverse voltage may be 0.2 s to 0.5 s; and then the control circuit is quickly switched to a short-circuit mode, and is further switched to a disconnected mode after the elecrochomic device 10 changes to the colored state.

The above control manner can shorten time of the elecrochimic device 10 switching from the transparent state to the colored state. For example, the time of the electrochomic device 10 switching from the transparent state to the colored state can be controlled within a range of 0.3 s to 0.5 s, which facilitates improving the user's experience. Of course, the above control manner may also be employed to shorten time of the elecrochomic device 10 switching from the colored state to the transparent state. In some embodiments, the electrical medium material may include nano-conductive particles configured to improve electrical conductivity thereof, thereby increasing the rate of the color change and shortening the time of switching from the colored state to the transparent state or the time of switching from the transparent state to the colored state.

Figure 55:
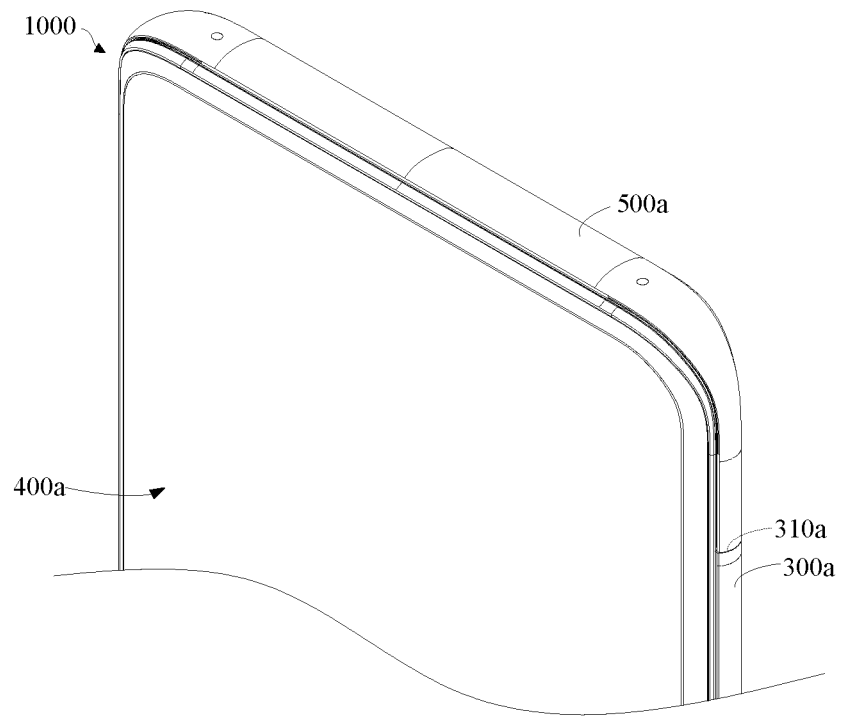
FIG. 55 is a perspective view of a mounting base of an electronic apparatus in a first position in other embodiments.
Figure 56:
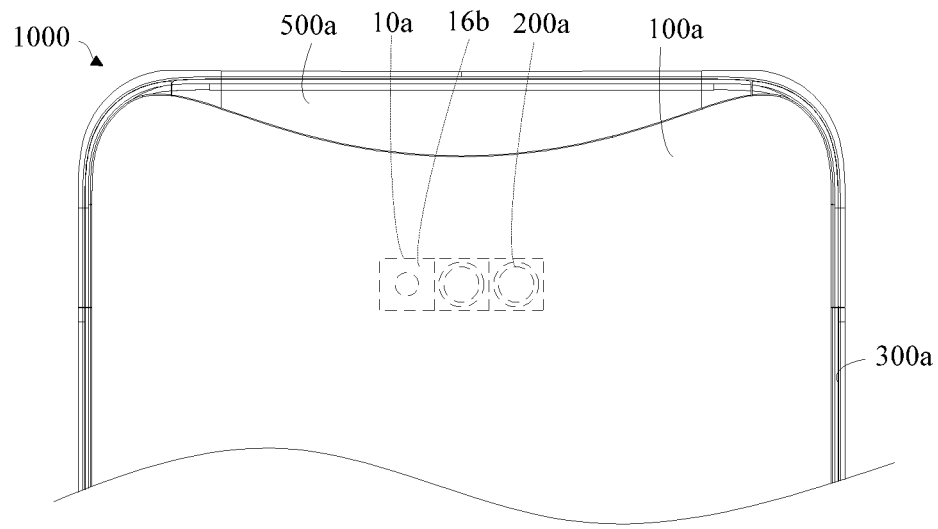
FIG. 56 is a rear view of the electronic apparatus shown in FIG. 55.

FIGS. 55-58 show another electronic apparatus 1000 according to some embodiments of the present disclosure. As shown in FIG. 55 and FIG. 56, the electronic apparatus 1000 may include a screen 400a, a shell 300a, a rear cover 100a, and a mounting base 500a. The screen 400a may be disposed at a side of the shell 300a. The rear cover 100a may be disposed on at opposite side of the shell 300a and, together with the shell 300a, defines a mounting space 500a. The electrochromic device 10a may be disposed at a side of the rear cover 100a facing the screen 400a. The shell 300a may be a frame enclosing a periphery of the screen 400a, and material of the shell 300a may be aluminum alloy, stainless steel, or the like. The shell 300a may further extend to the interior of the electronic apparatus 1000 to form a medium plate. The medium plate may be configured to mount components such as a circuit board and a battery of the electronic apparatus 1000.

Figure 57:
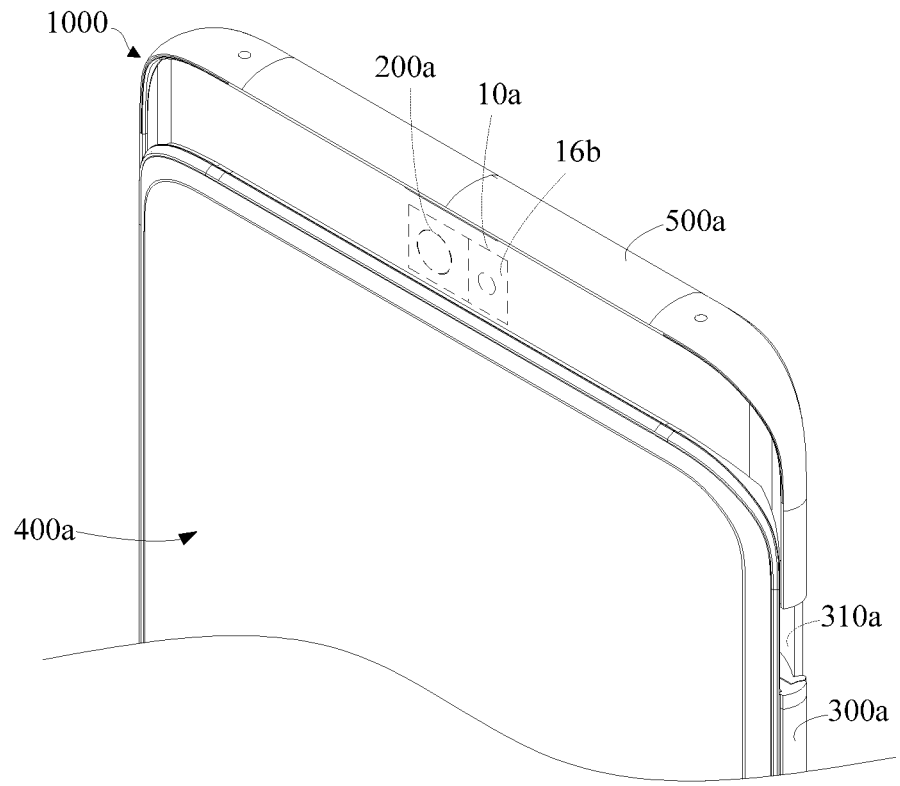
FIG. 57 is a perspective view of the mounting base of the electronic apparatus shown in FIG. 55 in a second position.
Figure 58:
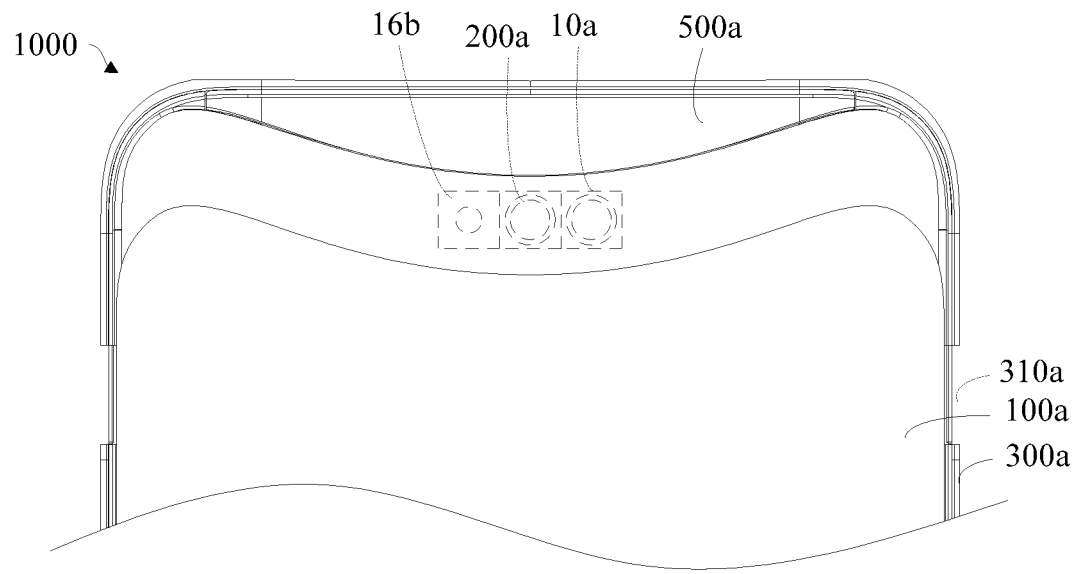
FIG. 58 is a rear view of the electronic apparatus shown in FIG. 57.
Figure 59:
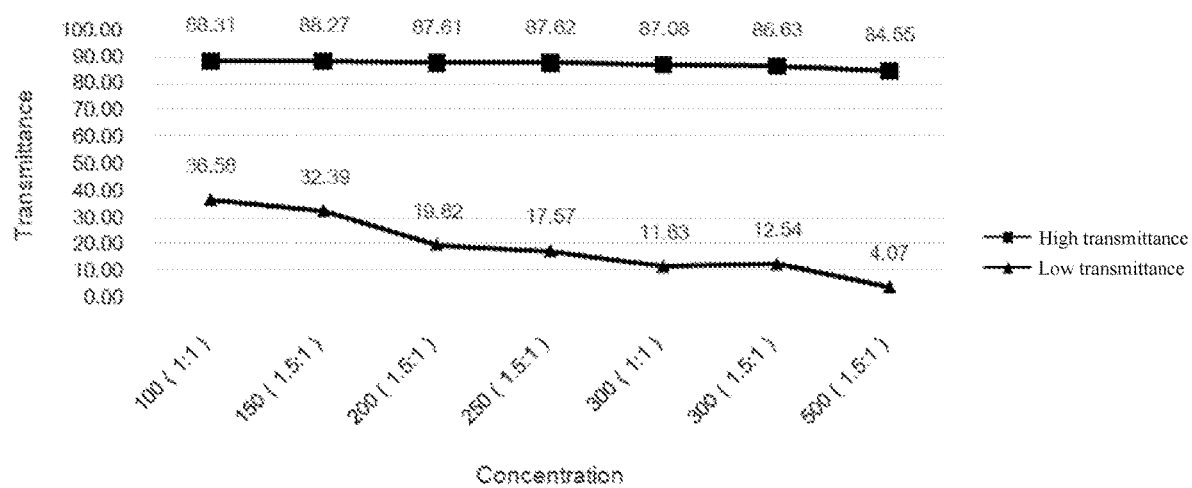
FIG. 59 shows transmittance of devices configured with various molarity concentrations of solutes.

As shown in FIG. 57 and FIG. 58, a mounting slot 310a may be defined between the screen 400a and the rear cover 100a, and the mounting slot 310a may be considered as a part of the mounting space 500a. The mounting base 500a may be disposed in the mounting slot 310a and include optical devices 200a. The mounting base 500a can move to a first position and a second position in the mounting slot 310a relative to the shell 300a.

As shown in FIG. 55 and FIG. 56, when in the first position, the mounting base 500a is accommodated in the mounting slot 310a. The optical devices 200a with light entrance or exit from a side where the rear cover 100a lies are covered by electrochromic material units 16b, and each of the electrochromic material units 16b may cover at least one optical device 200a. When the electrochromic material units 16b are in the transparent state, the optical devices 200a can be made visible from a side away from the screen 400a. As shown in FIG. 57 and FIG. 78, when in the second position, the mounting base 500a may extend out of the mounting slot 310a, so that the optical devices 200a extend out of the shell 300a.

In this embodiment, the optical devices 200a may include one or more of a front camera, a fill light, an ambient light sensor, a structure light module, a face recognition module, etc. may also be provided on a side of the mounting base 500a facing the screen 400a. When in the second position, the optical devices 200a can be used normally. The optical devices 200a may be covered the electrochromic material units 16b, that is, the mounting base 500a can be provided with the electrochromic device 10a to shield or make the optical devices 200a visible when the electrochromic material units 16b are in the second position, thereby adapting to a plurality of application scenarios of the electronic apparatus while improving the appearance characteristics. In this embodiment, the electrochromic device 10a on the mounting base 500a may be a zoning control design or a design without zoning control.

In the electronic apparatus 1000 with such structure, when the mounting base 500a is in the first position, the optical devices 200a with light entrance or exit from a side of the screen 400a do not occupy an area of the screen 400a, a screen ratio of the electronic apparatus 10000 may be improved. For example, the screen ration of the electronic apparatus 10000, when the mounting base 500a is in the first position, could be 90% or more. In addition, since the optical devices 200a, when the mounting base 500a is in the first position, are covered by the electrochromic material units 16b and the optical devices 200a, when the mounting base 500a is in the second position, are exposed, and the rear cover 100a does not need to define a light-transmissive hole, a side of the rear cover 100a may have a greater appearance integrity. In this embodiment, the first substrate 11 can be also used as the rear cover 100a, that is, an area of the first substrate 11 is made larger. The first substrate 11 is connected to the shell 300a and covers the battery and circuit board within the electronic apparatus 1000, such that the first substrate 11 is used as the rear cover 100a. The first substrate 11 and the shell 300a define mounting space.

Further, as shown in FIG. 56, when the mounting base 500a is in the first position, the rear cover 100a corresponding to a mounting region of the optical devices 200a may be provided with electrochromic material units 16b. When the mounting base 500a is in the first position, the electrochromic material units 16b may be in the colored state. The optical devices 200a are shielded by the electrochromic material units 16b, and the electrochromic device 10a exhibits a predetermined color. The electrochromic device 10a corresponding to the mounting region of the optical devices 200*a* may, together with other parts of the electronic apparatus 1000, exhibits an integrated appearance. When the mounting base 500*a* is in the first position, the electrochromic material units 16*b* are made to be in a transparent state, so that the optical devices 200*a* can normally allow for light exit or entrance. When the mounting base 500*a* is in the first position, and the electrochromic material units 16*b* are in the transparent state, the electrochromic device 10*a* may have a higher light transmittance. For example, a light transmittance of the electrochromic device 10*a* may be 80% or more. Thus, the optical devices 200*a* can be used normally when the mounting base 500*a* is in the first position. Such arrangement can not only ensure the appearance integrity of a side of the rear cover 100*a* of the electronic apparatus 1000 but also facilitate convenient use of the optical devices 200*a*. Of course, it can be understood that, in this embodiment, a part of the rear cover 100*a* corresponding to the mounting region of the optical devices 200*a* when the mounting base 500*a* is in the first position may be provided with the electrochromic material units 16*b*, while other parts of the rear cover 100*a* than the mounting region of the optical devices 200*a* may not need to be provided with the electrochromic material units 16*b*. For example, the rear cover 100*a* other than the corresponding mounting region of the optical devices 200*a* may be colored with ink, or may be decorated in other manners. In this embodiment, the part other than the mounting region of the optical devices 200*a* may be regarded as a light-shielding region. When the electrochromic material units 16*b* are in the transparent state, a light transmittance of the light-transmissive region is significantly different from that of the light-shielding region. For example, the light transmittance of the light-transmissive region may be greater than or equal to 80%, and the light transmittance of the light-shielding region may be less than or equal to 20%. When the electrochromic material units 16*b* are in the colored state, the light-transmissive region is shielded by the electrochromic material units 16*b* so that the light transmittance of the light-transmissive region is substantially the same as that of the light-shielding region.

It should be noted that, in some embodiments of the present disclosure, the solutions of the response speed of the electrochromic device, the light transmittance of the electrochromic device in the transparent state, the wiring design of the electrochromic device, the zoning control of the electrochromic device, and the structure of the housing of the electronic apparatus may be combined with each other. In addition, the above is only part of the embodiments of the present disclosure, and does not limit the scope of protection of the present disclosure. Any equivalent apparatus or equivalent process transformation made by using the description and drawings of the application, or directly or indirectly used in other related technical fields are included in the protection scope of the present disclosure.

What is claimed is:

1. An electrochromic device, comprising:
 a first substrate;
 a second substrate; and
 a plurality of electrochromic material units, disposed between the first substrate and the second substrate and spaced apart from each other, wherein each of the plurality of electrochromic material units is switchable between a colored state and a transparent state;
 a first conductive structure, disposed on a surface of the first substrate adjacent to the second substrate, wherein the first conductive structure comprises a first conductive layer and a first wiring which are stacked on one another and electrically connected to each other;
 a second conductive structure, disposed on a surface of the second substrate adjacent to the first substrate, wherein the second conductive structure comprises a second conductive layer and a second wiring which are stacked on one another and electrically connected to each other; and
 a frame, disposed between the first conductive structure and the second conductive structure; wherein the frame, the first conductive structure, and the second conductive structure cooperatively define a plurality of receiving spaces, and each of the plurality of electrochromic material units are disposed in a corresponding one of the plurality of receiving spaces;
 wherein the frame defines a plurality of filling inlets, and the plurality of filling inlets have a one-to-one correspondence with the plurality of receiving spaces; the first wiring is interrupted at the plurality of filling inlets, the second wiring is interrupted at the plurality of filling inlets, and the frame is interrupted at the plurality of filling inlets, and the plurality of filling inlets are sealed by a sealing member.

2. The electrochromic device as claimed in claim 1, wherein
 the first conductive layer comprises a plurality of first conductive sub-layers spaced apart from each other, and the plurality of first conductive sub-layers have a one-to-one correspondence with the plurality of electrochromic material units;
 the first wiring comprises a plurality of first sub-wirings spaced apart from each other;
 the second conductive layer comprises a plurality of second conductive sub-layers spaced apart from each other, and the plurality of second conductive sub-layers have a one-to-one correspondence with the plurality of electrochromic material units;
 the plurality of first conductive sub-layers or the second conductive sub-layers are configured to independently control the plurality of electrochromic material units to switch between the colored state and the transparent state; and
 the second wiring comprises a plurality of second sub-wirings spaced apart from each other.

3. The electrochromic device as claimed in claim 1, further comprising a third wiring, wherein the third wiring is disposed on the second conductive layer, spaced apart from the second wiring, and electrically connected to the first wiring.

4. The electrochromic device as claimed in claim 3, wherein the first wiring comprises a first driving portion and a first lead-out portion, the first driving portion is disposed around the plurality of receiving spaces, and the first lead-out portion is connected to the first driving portion;
 the second wiring comprises a second driving portion and a second lead-out portion, the second driving portion is disposed around the plurality of receiving spaces, and the second lead-out portion is connected to the second driving portion and configured as a connection terminal of the second conductive structure; and
 the third wiring is spaced apart from the second driving portion and communicates with the first lead-out portion, and the third wiring is configured as a connection terminal of the first conductive structure.

5. The electrochromic device as claimed in claim 1, wherein the frame covers at least one of an edge of the first conductive layer or an edge of the second conductive layer.

6. The electrochromic device as claimed in claim 1, wherein
- a transmittance of the electrochromic device in the transparent state is greater than or equal to 80%, and a transmittance of the electrochromic device in the colored state is less than or equal to 20%; or
- a width of the first wiring is less than or equal to 1.5 mm, and an impedance of the first wiring is less than or equal to 5 Ω; or
- a width of the second wiring is less than or equal to 1.5 mm, and an impedance of the second wiring is less than or equal to 5 Ω.

7. The electrochromic device as claimed in claim 1, wherein the first wiring is disposed between the first conductive layer and the first substrate, the second wiring is disposed between the second conductive layer and the second substrate, and the frame is disposed between the first conductive layer and the second conductive layer; or
- the first conductive layer is disposed between the first wiring and the first substrate, the second conductive layer is disposed between the second wiring and the second substrate, the frame is disposed between the first conductive layer and the second conductive layer, and the first wiring and the second wiring are both embedded in the frame.

8. The electrochromic device as claimed in claim 1, wherein at least one of the first wiring or the second wiring is closed.

9. The electrochromic device as claimed in claim 1, wherein the filling inlets corresponding to two adjacent receiving spaces communicate with each other.

10. The electrochromic device as claimed in claim 1, further comprising an encapsulant, wherein the encapsulant is coated between the first substrate and the second substrate and along edges of the first substrate and the second substrate, and the encapsulant further covers a periphery of a side edge of the first conductive layer and a periphery of a side edge of the second conductive layer.

11. The electrochromic device as claimed in claim 1, wherein a supporting spacer is disposed in at least one of the plurality of receiving spaces.

12. The electrochromic device as claimed in claim 1, further comprising a heating layer, wherein the heating layer is disposed in at least one position selected from the group consisting of:
- between the first substrate and the first conductive structure;
- between the second substrate and the second conductive structure;
- on a surface of the first substrate facing away from the first conductive structure; or
- on a surface of the second substrate facing away from the second conductive structure.

13. An electronic apparatus, comprising:
- a front cover;
- a rear cover, cooperatively defining a mounting space with the front cover; one of the front cover and the rear cover defining a light-transmission region;
- an electrochromic device, disposed in the mounting space, covering the light-transmission region, and comprising:
  - a first substrate;
  - a second substrate; and
  - a plurality of electrochromic material units, disposed between the first substrate and the second substrate and spaced apart from each other; wherein each of the plurality of electrochromic material units is switchable between a colored state and a transparent state; and
- a plurality of optical devices, received in the mounting space;
  - a first conductive structure, disposed on a surface of the first substrate adjacent to the second substrate, wherein the first conductive structure comprises a first conductive layer and a first wiring which are stacked on one another and electrically connected to each other;
  - a second conductive structure, disposed on a surface of the second substrate adjacent to the first substrate, wherein the second conductive structure comprises a second conductive layer and a second wiring which are stacked on one another and electrically connected to each other; and
  - a frame, disposed between the first conductive structure and the second conductive structure; wherein the frame, the first conductive structure, and the second conductive structure cooperatively define a plurality of receiving spaces, and each of the plurality of electrochromic material units are disposed in a corresponding one of the plurality of receiving spaces;
  - wherein the frame defines a plurality of filling inlets, and the plurality of filling inlets have a one-to-one correspondence with the plurality of receiving spaces; the first wiring is interrupted at the plurality of filling inlets, the second wiring is interrupted at the plurality of filling inlets, and the frame is interrupted at the plurality of filling inlets, and the plurality of filling inlets are sealed by a sealing member;
  - wherein at least one of the plurality of optical devices is disposed to a corresponding one of the plurality of electrochromic material units, such that the at least one of the plurality of optical devices is visible from the light-transmission region in response to the corresponding one of the plurality of electrochromic material units being in the transparent state, and capable of being shielded by the corresponding one of the plurality of electrochromic material units in response to the corresponding one of the plurality of electrochromic material units being in the colored state.

14. The electronic apparatus as claimed in claim 13, wherein the electrochromic device comprises:
- a plurality of first conductive sub-layers spaced apart from each other, wherein the plurality of first conductive sub-layers have a one-to-one correspondence with the plurality of electrochromic material units; and
- a plurality of second conductive sub-layers spaced apart from each other, wherein the plurality of second conductive sub-layers have a one-to-one correspondence with the plurality of electrochromic material units, and the plurality of first conductive sub-layers or the second conductive sub-layers are configured to independently control the plurality of electrochromic material units to switch between the colored state and the transparent state.

15. The electronic apparatus as claimed in claim 14, wherein the first wiring is stacked on the plurality of first conductive sub-layers and electrically connected to the plurality of first conductive sub-layers;
- the second wiring is stacked on the plurality of second conductive sub-layers and electrically connected to the plurality of second conductive sub-layers; and the electronic apparatus further comprises a third wiring, disposed on the second conductive sub-layers, spaced apart from the second wiring, and electrically connected to the first wiring.

16. The electronic apparatus as claimed in claim 15, wherein the first wiring comprises a first driving portion and a first lead-out portion, the first driving portion is disposed around the plurality of receiving spaces, and the first lead-out portion is connected to the first driving portion;

the second wiring comprises a second driving portion and a second lead-out portion, the second driving portion is disposed around the plurality of receiving spaces, and the second lead-out portion is connected to the second driving portion; and the third wiring is spaced apart from the second driving portion and communicates with the first lead-out portion.

17. The electronic apparatus as claimed in claim 13, further comprising a screen, wherein an area of the first substrate is larger than an area of the second substrate, and the first substrate is configured to engage with the screen.

* * * * *